(12) United States Patent
Takayama et al.

(10) Patent No.: US 6,182,565 B1
(45) Date of Patent: Feb. 6, 2001

(54) LABEL PRINTER

(75) Inventors: Masayuki Takayama, Hata-machi; Masao Akaiwa, Shiojiri; Shigekazu Yanagisawa; Hideki Sakano, both of Matsumoto, all of (JP)

(73) Assignee: Seiko Epson Corporation, Tokyo (JP)

( * ) Notice: Under 35 U.S.C. 154(b), the term of this patent shall be extended for 0 days.

(21) Appl. No.: 09/254,509

(22) PCT Filed: Jul. 6, 1998

(86) PCT No.: PCT/JP98/03032

§ 371 Date: Mar. 5, 1999

§ 102(e) Date: Mar. 5, 1999

(87) PCT Pub. No.: WO99/03102

PCT Pub. Date: Jan. 21, 1999

(30) Foreign Application Priority Data

Jul. 8, 1997 (JP) .................................................... 9-182411
Jul. 8, 1997 (JP) .................................................... 9-182412

(51) Int. Cl.$^7$ .................................................... B41F 17/00
(52) U.S. Cl. ............................... 101/35; 400/76; 400/70; 400/61
(58) Field of Search ........................... 101/35; 400/615.2, 400/6.1, 70, 76

(56) References Cited

U.S. PATENT DOCUMENTS 5,475,835 * 12/1995 Hickey .................................. 395/600
5,518,325 * 5/1996 Kahle ....................................... 400/70
5,815,297 * 9/1998 Ciciora .................................. 359/146
5,868,504 * 2/1999 Nunokawa et al. ..................... 400/61

FOREIGN PATENT DOCUMENTS

| 4-117654 | * 9/1990 | (JP) . | |
|---|---|---|---|
| 5-166289 | * 7/1993 | (JP) . | |
| 05307870 | * 11/1993 | (JP) . | |
| 06150145 | 5/1994 | (JP) | ............... G07F/17/26 |
| 06309846 | 11/1994 | (JP) | ............... G11B/27/10 |
| 06325547 | 11/1994 | (JP) | ............... G11B/27/00 |
| 08036868 | 2/1996 | (JP) | ............... G11B/27/10 |
| 09326185 | 12/1997 | (JP) | ............... G11B/23/38 |
| 10044517 | 2/1998 | (JP) | ............... B41J/3/36 |
| 10069758 | 3/1998 | (JP) | ............... G11B/27/034 |
| 10149664 | 6/1998 | (JP) | ............... G11B/23/38 |
| 10312170 | 11/1998 | (JP) | ............... G09F/13/04 |

OTHER PUBLICATIONS

Product Catalogue by Kenwood, Products Name: Cyber Titler, 1997 Kenwood Corporation.

* cited by examiner

Primary Examiner—John S. Hilten
Assistant Examiner—Charles H. Nolan, Jr.
(74) Attorney, Agent, or Firm—Hogan & Hartson, LLP

(57) ABSTRACT

This invention relates to provide a label printer which prints by using data recorded in a recordable/reproducible disc and forms a label for the disc. The printer is capable of creating labels to affixed to various portions of the disc and a disc cartridge of the disc by easy operations, and at a time. Further, irrespective of the size of contents of the disc, the printer can create a label from which contents of the disc are grasped at a glance.

46 Claims, 31 Drawing Sheets

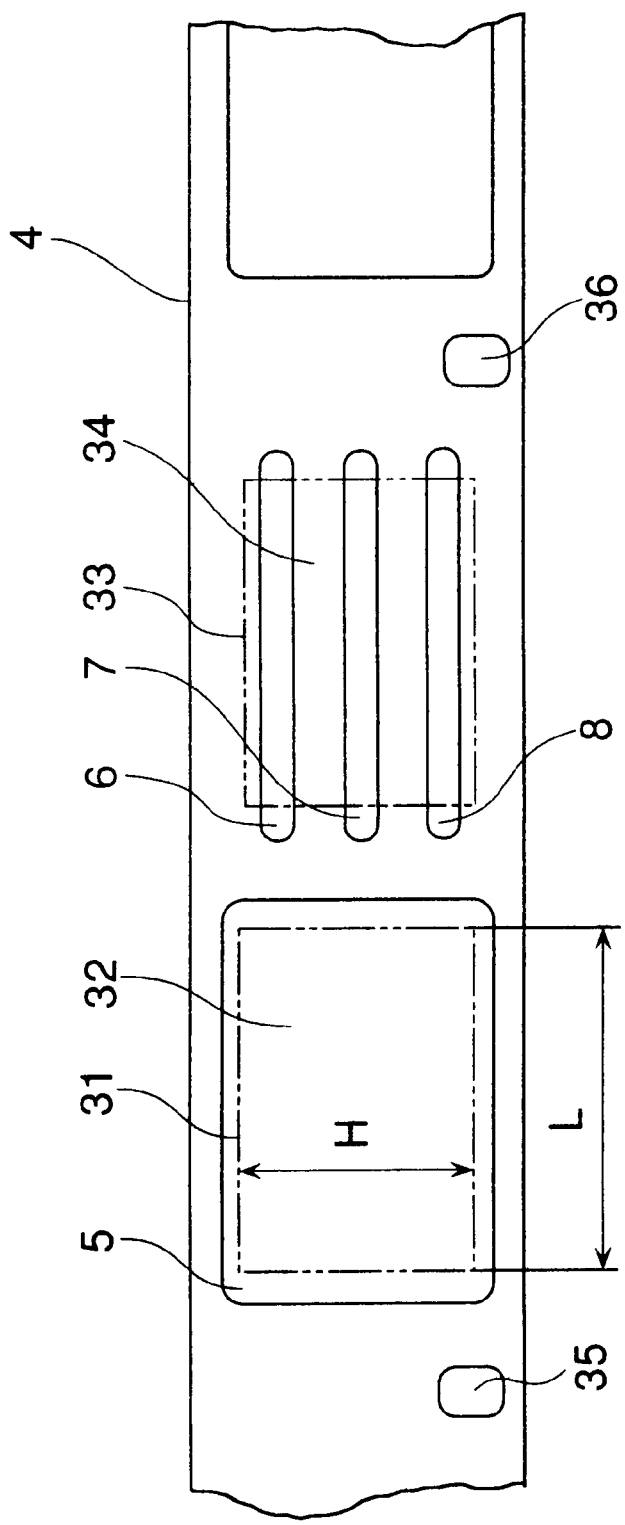

FIG. 9

| 101 | 102 | 103 | 104 | 105 | 106 | 107 | 108 | 109 | 110 |
|---|---|---|---|---|---|---|---|---|---|
| TOTAL NUMBER OF MUSIC PIECES | DISC TITLE | TOTAL PLAY TIME | DISC TITLE RECORDING DATE | MUSIC NUMBER 1 | MUSIC TITLE 1 | PLAY TIME 1 | RECORDING DATE 1 | MUSIC NUMBER 2 | MUSIC TITLE 2 |

| 111 | 112 | | |
|---|---|---|---|
| PLAY TIME 2 | RECORDING DATE 2 | MUSIC NUMBER 3 | MUSIC TITLE 3 | ........

F I G. 1 6
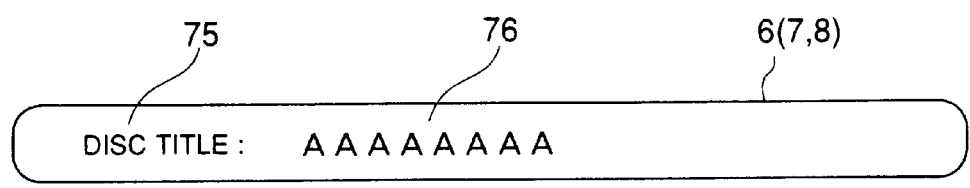

F I G. 1 8
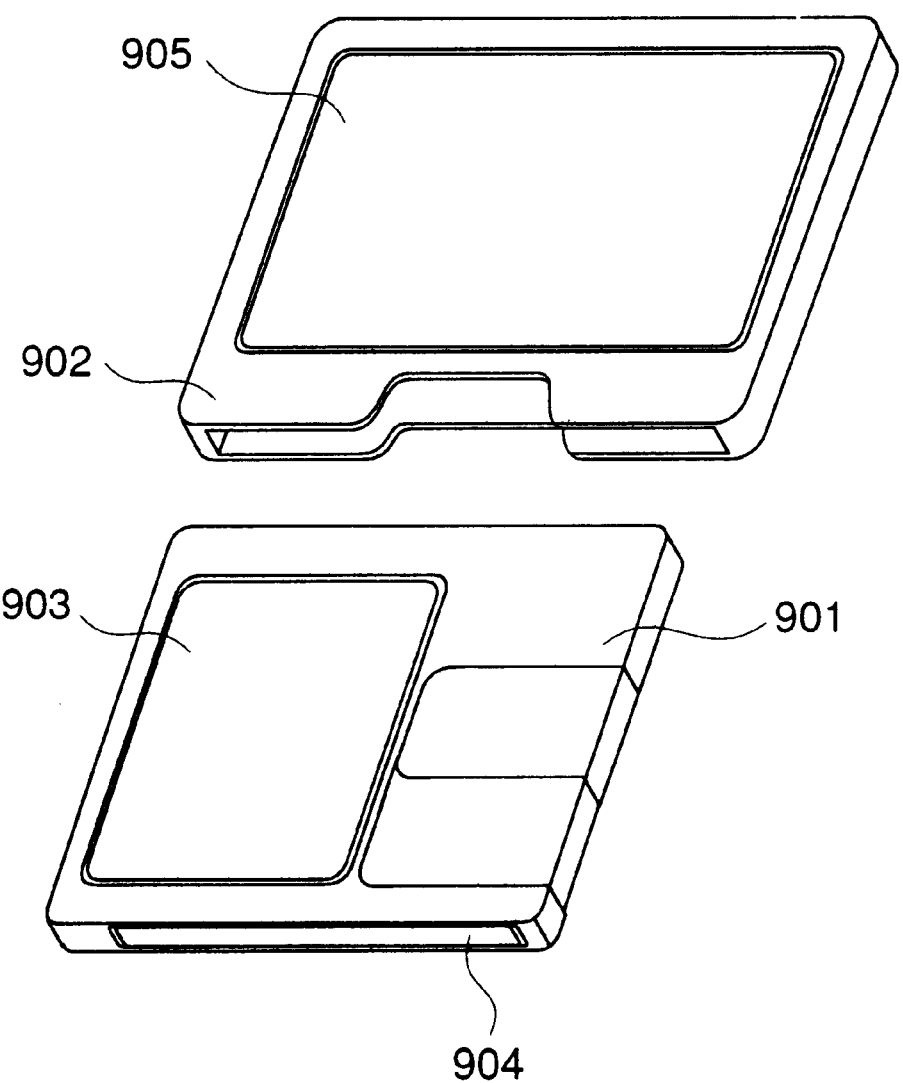

F I G. 3 1
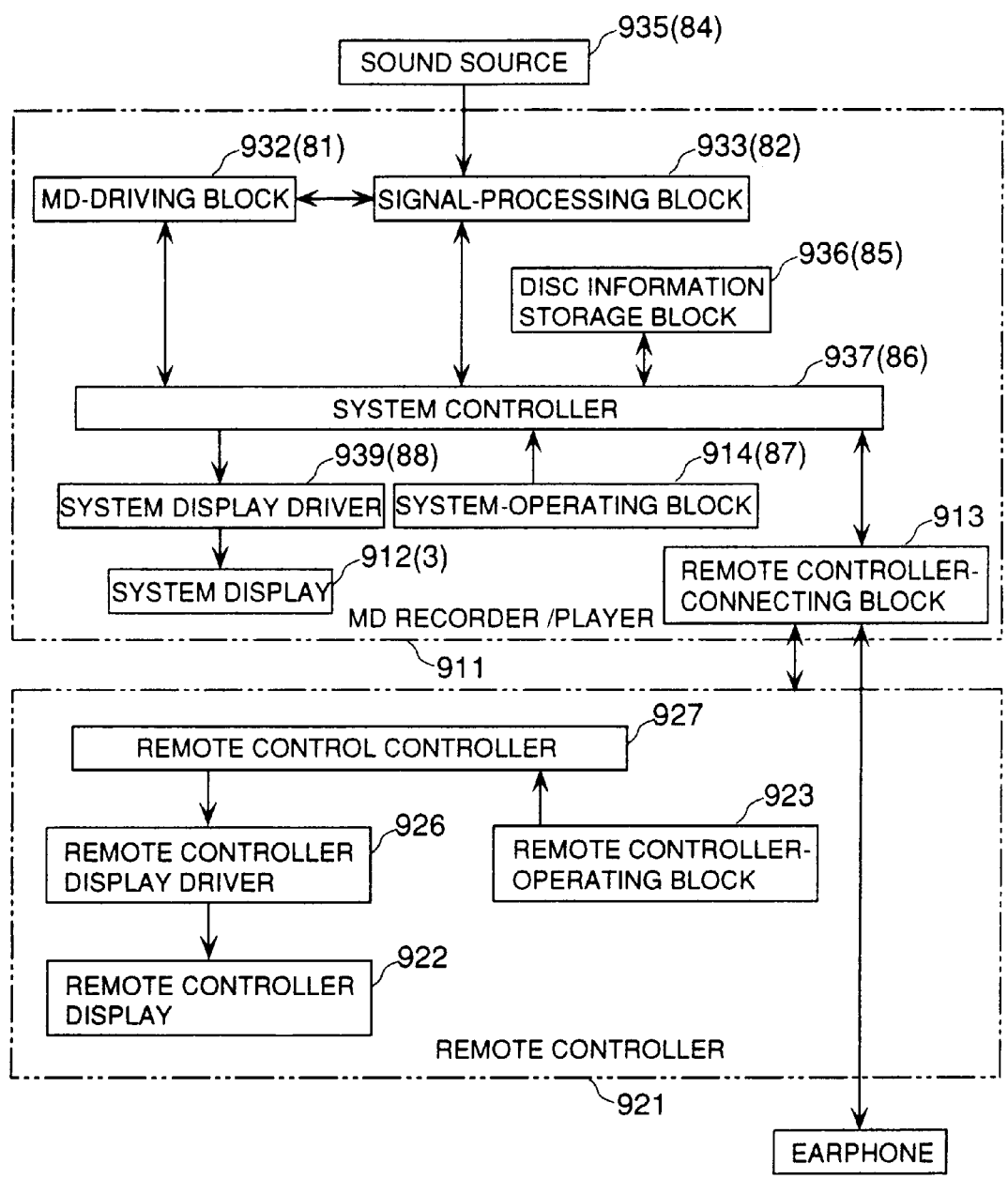

LABEL PRINTER

TECHNICAL FIELD

This invention relates to a label printer which prints by using data recorded in a recordable/reproducible disc and forms a label to be affixed to a cartridge of the disc.

BACKGROUND ART

Recently, recordable/reproducible disc systems have become commercially available one after another which store and reproduce main information stored therein and attribute information concerning the main information (which is formed of text data, and includes management information corresponding to the main information, a disc title entered by the user, and a main information title corresponding to the main information).

The disc system of this kind includes a magneto-optical (MO) disc for mainly storing and reproducing music/voice signals as the main information, a rewritable CD (CD-R, etc.) system, and a DVD system for mainly recording and reproducing movie data as the main information, and a mini disc (minidisc) (hereinafter referred to as "MD") available from Sony Corporation as an applied system of the MO disc is a commercial product drawing attention of users.

Hereinafter, the recordable/reproducible disc system will be described by taking the MD system as an example. The MD records pieces of music or music information as the main information. Further, as the management information, when a music piece is recorded, a music number and a starting address of the music piece as well as an ending address and a date of recording of the music piece are automatically recorded, and when a disc title is recorded, a date of recording the disc title is automatically recorded. The disc title and the music title entered by the user are stored as text information. The MD system is disclosed e.g. in Japanese Laid-Open Patent Publication (Kokai) Nos. 6-325547 and 8-36868.

FIG. 18 shows an appearance of the mini disc (MD). Reference numeral 901 designates an MD cartridge accommodating a recordable/reproducible magneto-optical mini disc having a diameter of 64 mm (2.5 inches). To the front face of the MD cartridge, a main label 903 can be affixed, and to a side surface thereof, a side label 904 can be affixed. Reference numeral 902 designates an MD case for storing the MD cartridge 901 therein, and a case label 905 can be affixed thereto. The main label 903 to be affixed to the front face includes various types different in size, including the largest type having a size of approximately 36 mm×52 mm, and the smallest type having a size of approximately 36 mm×18 mm. The side label 904 has a size of approximately 4 mm×60 mm. Further, the case label 905 has a size of approximately 52 mm×72 mm. The side label 904 is also used by affixing the same to the side surface of the MD case 902.

These labels are provided as accessories of each recordable/reproducible MD, and each user manually writes on these labels with reference to a disc title, music numbers, music titles, play times, recording dates, etc. displayed on a display block of a playback system when the MD is played back by the system, and then affix them to respective proper portions of the MD cartridge and the MD case.

As is clear from the above example of the conventional recordable/reproducible MD, in the case of the recordable/reproducible disc system, it is presupposed that the confirmation of contents of the disc is carried out by checking the disc title, the main information titles, etc. displayed on the display block of each playback system when the disc system is played back by the playback system. Therefore, to make labels to be affixed to the disc cartridge for use, the user takes the trouble of manually writing the disc title, the main information titles, etc. displayed on the display block of the playback system on various labels and then affixing them to the respective portions of the disc cartridge. The procedure of making labels is very troublesome, as described above, and it is almost impossible to manually write lots of letters within a small-sized label. What is more, to make several types of labels has the problem that it demands much patience.

In view of the above circumstances, it is an object of the invention to provide a label printer which automatically prints on labels to be affixed to a disc cartridge of a recordable/reproducible disc by using a disc title and main information titles written in the disc, and what is more, makes several kinds of labels at a time.

DISCLOSURE OF INVENTION

A label printer according to the invention as claimed in claim 1 is characterized by comprising attribute information request means that, to a control block of a disc playback system which reads main information stored in a disc in response to a main information readout request generated by external operating means, and reads attribute information concerning the main information in response to an attribute information readout request generated by said external operating means, the attribute information being formed of text data and stored in a predetermined area in the disc or a main unit of the system, makes the attribute information readout request in place of the external operating means or in combination with the external operating means; print means for printing on a label to be affixed to a disc cartridge accommodating the disc: and print control means for causing the attribute information read out in response to the attribute information readout request made by the attribute information request means to be converted to dot pattern data for print and causing the print means to print the dot pattern data. According to this construction of the label printer, to the control block of the disc playback system which reads attribute information in response to a attribute information readout request made by the external operating means, the attribute information request means makes an attribute information readout request in place of or in combination of the external operating means, and the attribute information read in response thereto is converted to dot pattern data and printed. In this case, the reading function which the disc playback system originally has is utilized, and therefore, without additionally providing a new function, the attribute information can be read from the disc. Further, since the read information can be printed on a label after the conversion, it is no longer necessary to manually write data on the label. Therefore, according to the label printer, labels to be affixed to disc cartridges can be easily produced, and what is more, as beautiful labels.

Preferably, the external operating means includes a remote controller for externally operating the disc playback system, and the disc playback system includes remote control communication means for outputting attribute information in response to an attribute information readout request from the remote controller, to the remote controller, the attribute information request means transmitting the attribute information readout request via the remote control communication means, and the print control means converting the attribute information received via the remote control communication means to the dot pattern data. According to this construction of a preferred embodiment, the disc playback system has remote control communication means for outputting attribute information in response to the attribute information readout request made by the remote controller, and the system transmits the attribute information readout request via the remote control communication means and receives attribute information responsive thereto. That is, the printer makes use of the remote control communication means which the disc playback system originally has, and hence without additionally providing a new reading capability, the attribute information can be read and printed on a label, whereby a label to be affixed to a disc cartridge can be made with ease, and what is more, as a beautiful label.

Preferably, the remote control communication means comprises means for communicating with the remote controller by wire, and the label printer is connected to the disc playback system via the remote communication means in a wired manner. According to this construction, since the disc playback system has means for communicating with the remote controller by wire, the remote control capability of the remote controller can be utilized to read out the attribute information to print it on the label. Therefore, the label can be easily made as a beautiful label.

Preferably, the remote control communication means includes a connector terminal that enables the remote controller to be removably connected thereto. According to this construction of a preferred embodiment, since the disc playback system has the connector terminal that enables the remote controller to be removably connected thereto, the label can be easily created, and what is more, as a beautiful label only by connecting the label printer to the connector terminal. That is, this device is suitable for a portable disc playback system.

Preferably, the remote controller is constructed in a manner such that the remote controller is capable of transmitting an attribute information readout request that requests display information, as the attribute information, which is to be displayed on a display block of the remote controller, and the attribute information request means is capable of transmitting an attribute information readout request that requests the same display information that is requested by the remote controller. According to this construction of a preferred embodiment, the remote controller is capable of outputting the attribute information readout request requesting the display information to be displayed on its own display block, and therefore, the remote control communication means, which is responsive to the request, is also capable of outputting the display information as the attribute information in response to the attribute information readout request. Since this label printer is capable of the same attribute information readout request as the remote controller requests, all the attribute information which can be displayed on the remote controller when the remote controller is connected to the system. In other words, it is possible to create, with ease, and what is more, as a beautiful label, the label which has been conventionally created by manually writing therein the information displayed for confirmation on the remote controller.

Preferably, the remote control communication means comprises means for carrying out optical communication with the remote controller, and the label printer is capable of carrying out transmission to and reception from the disc playback system via the remote control communication means by optical communication. According to this construction of a preferred embodiment, since the label printer is capable of communicating with the disc playback system by optical communication, the attribute information can be read by using this capability and printed onto a label, and hence the label can be easily made as a beautiful label.

Preferably, the label printer further includes remote control means having the same capability of operating the disc playback system that the remote controller has. According to this construction of a preferred embodiment, since the label printer includes remote control means having the same capability of operating the disc playback system that the remote controller has, it is not only capable of reading the attribute information to thereby make a beautiful label with ease but also has the capability or function as the remote controller, which dispenses with the trouble of additionally providing a remote controller. That is, this preferred embodiment is suitable for a stationary disc playback system.

Preferably, the external operating means includes a disc-operating block having a disc operation button group arranged on an outer surface of the main unit accommodating the disc playback system, the disc playback system has a display block on which part or all of the attribute information read in response to the attribute information readout request from the disc-operating block as display information, and the attribute information request means has a printing operation button group arranged on the outer surface of the main unit of the system and is constructed in a manner such that the attribute information request means is used in combination with the disc-operating block to make the attribute information readout request requesting the display information, the attribute information request means being accommodated within the main unit of the system together with the print means, the print control means and the disc playback system. According to this construction of a preferred embodiment, an attribute information readout request requesting the display information is made by the attribute information request means which is used in combination with the disc-operating block of the external operating means of the disc playback system, and the display information as the attribute information read by the request is converted (by the print control means) to dot pattern data for printing and printed (by the print means). In this case, since a function is used which the disc playback system originally has for reading information to display the same on the display block, all the attribute information which can be displayed on the display block can be printed without additionally providing a new function. That is, it is possible to create, with ease, and what is more, as a beautiful label, the label which has been conventionally created by manually writing therein the information displayed for confirmation on the remote controller. Further, in this case, the attribute information request means, the print means, and the print control means are received within a main unit of the disc playback system together with the system. Therefore, this preferred embodiment is suitable for a type of the label printer which is incorporated within the main unit of a stationary disc playback system.

Preferably, the print control means is provided by sharing part of functions of the control block of the disc playback system. According to this construction, the print control means of the label printer is provided by making shared use of part of the control block of the disc playback system. That is, assuming that the control block originally provided for the disc playback system is formed e.g. by a system controller which can carry out general data processing according to a control program, the print control means can be provided only by configuring the system controller (e.g. by installing a control program therefor) such that the system also has a capability of print control, in addition to the original disc playback capability. Therefore, in this case, through the shared use of the originally-provided function of the disc playback system, a new disc playback system incorporating the label printer can be made without much increasing the whole size of the system.

Preferably, the attribute information request means has print start-instructing means for instructing the start of processing of printing on the label, and makes the attribute information readout request after the start of printing is instructed. According to this construction of a preferred embodiment, the attribute information readout request is made only when the start of the printing is instructed, and therefore, it is possible to prevent wasteful printing operations from being carried out when the printing on a label is unnecessary.

Preferably, the disc playback system includes storage means for storing, as the attribute information, text data read from the disc or newly produced within the system as to the main information stored in the disc, and reads out the attribute information from the storage means in response to the attribute information readout request. According to this construction of a preferred embodiment, the disc playback system has storage means for storing the attribute information, and hence it is possible to read the attribute information instantly in response to an attribute information readout request. Therefore, in this case, the response to the attribute information readout request made by the attribute information request means of the label printer becomes also swift.

Preferably, the print control means converts the attribute information to a dot pattern for a printing tape formed with a half-die-cut label which is half-cut into a shape of a label. According to this construction, the attribute information is converted to a dot pattern for a printing tape having labels formed in a half-cut form (so-called half-die-cut form). Therefore, a label can be easily formed only by printing the dot pattern on the printing tape, and only by peeling off the resulting label, it can be easily made into one that can be affixed or attached.

Preferably, the label printer further includes label-storing means on which the printing tape can be removably mounted. According to this construction of a preferred embodiment, the printing tape formed with labels in a half-die-cut form can be easily removably mounted on the label printer, whereby each label in the half-die-cut form can be easily printed. Therefore, labels can be easily made one after another while only requiring the replacement of the printing tape.

Preferably, the printing tape includes a plurality of half-die-cut labels continuously formed. According to this construction of a preferred embodiment, printing can be carried out on a printing tape having a plurality of half-die-cut labels formed in series. Therefore, a plurality of labels can be easily made from the printing tape.

Preferably, the printing tape is accommodated in a cassette, and the label-storing means is constructed in a manner such that the cassette can be removably mounted in the label-storing means. According to this construction of a preferred embodiment, the printing tape accommodated in a cassette can be removably mounted in the label printer, and the printing tape has a plurality of labels in a half-die-cut form formed in series. Therefore, it is not only possible to print labels in a number equal to the number of labels formed in the printing tape in succession, but also to repeat the printing only by replacing the cassette, and hence a large number of labels can be easily made.

Preferably, the half-die-cut label of the printing tape includes a plurality of kinds of half-die-cut label which are different from each other in the size of an outer shape. According to this construction of a preferred embodiment, the attribute information is converted to dot patterns for a printing tape formed with a plurality of kinds of labels different from each other in the size of an outer shape, and hence by printing such dot patterns, a plurality of kinds of labels different in the size of an outer shape can be easily made.

Preferably, the plurality of kinds of half-die-cut label include a main label to be affixed to a front face of the disc cartridge, and a side label to be affixed to a side surface of the disc cartridge. According to this construction of a preferred embodiment, the attribute information is converted to dot patterns for a printing tape formed with a plurality of types of half-die-cut label including a main label to be affixed to a front face of the disc cartridge, and a side label to be affixed to a side surface of the disc cartridge. Therefore, it is possible to easily make the main label and the side label at a time.

Preferably, the half-die-cut label of the printing tape includes a plurality of sheets of the side label. According to this construction of a preferred embodiment, it is possible to make the main label and the plurality of sheets of the side label at a time.

Preferably, the label printer further includes a print buffer for storing the dot pattern data therein, and the print control means stores dot pattern data for the main label in the print buffer when the main label is printed, and stores dot pattern data for the side label in the print buffer when the side label is printed. According to this construction of a preferred embodiment, the same print buffer is used both as the print buffer for printing the main label and the print buffer for printing the side label. Therefore, the capacity of memory to be allocated to the print buffer can be minimized.

Preferably, the attribute information includes a disc title of the disc, main information numbers, and main information titles, and the print control means creates dot pattern data of the disc title, the main information numbers, and the main information titles at a location of the main label, and dot pattern data of the disc title at a location of the side label. According to this construction of a preferred embodiment, details of contents of the disc are printed on the main label having a larger area, and the disc title is printed on the side label. Therefore, the disks can be easily discriminated from each other e.g. when they are arranged side by side for storage.

Preferably, the attribute information includes a disc title of the disc, main information numbers and main information titles, the half-die-cut label for the printing tape includes a main label to be affixed to a front face of the disc cartridge, and the print control means creates dot pattern data of the attribute information at a location of the main label. According to this construction of a preferred embodiment, the attribute information is converted to a dot pattern for a printing tape formed with a half-die-cut main label to be affixed to the front face of the disc cartridge. Therefore, only by printing the dot pattern, the main label can be easily made. Further, the main label can have a relatively large area, and hence details of contents of the disc, such as the disc title, the main information numbers and main information titles can be printed.

Preferably, the print control means creates dot pattern data of the disc title for one line on the main label, and when the dot pattern data of the disc title has a length larger than a maximum print width of the main label, creates the remaining dot pattern data for a next line on the main label, the print control means creating in succession dot pattern data of one main information number and main information title corresponding thereto for each identical line of the remaining lines, and when a total length of the dot pattern data of the main information number and the main information title corresponding thereto is larger than the maximum print width of the main label, forming the remaining dot pattern data for a next line on the main label. According to this construction of a preferred embodiment, the disc title is printed on one line of the main label (continuously on the following line if the disc title is long), and the main information numbers and the main information titles are printed on the other lines (continuously on the following line, if a main information title is long). Therefore, the main label can be created in which the details of contents of the disc are printed out in a layout which enables the user to grasp the contents at a glance.

Preferably, the print control means creates dot pattern data of the disc title from a first line on the main label, and creates dot pattern data of the main information numbers and the main information titles corresponding thereto from a next line in order of larger numbers. According to this construction of a preferred embodiment, even if the main label is small in size, it is possible to make a main label which represents the contents of the disc most accurately.

Preferably, the print control means creates dot pattern data of the disc title from a first line on the main label, and creates dot pattern data of the main information numbers and the main information titles corresponding thereto from a next line in order of larger numbers, and when all of the main information numbers and the main information titles corresponding thereto cannot be printed on lines up to a last line determined by the maximum number of lines printable on the main label, a dot pattern notifying a fact of this event is created as a dot pattern of the last line. According to this construction of a preferred embodiment, when all of the main information numbers and the main information titles corresponding thereto cannot be printed on lines up to the last line, a dot pattern notifying a fact of this event is created and printed. This enables the user to know the existence of main information numbers and main information titles which are not printed by viewing the printed information notifying the fact.

Preferably, the fact includes the remaining number of pieces of the main information which remain to be printed. According to this construction of a preferred embodiment, when all of the main information numbers and the main information titles corresponding thereto cannot be printed, this fact is printed as a notice. The printed notice includes the number of the remaining pieces of main information to be printed. Therefore, the user can have the number of the remaining pieces of main information and a total number of pieces of main information recorded in the disc.

Preferably, the attribute information further includes play times respectively corresponding to the main information numbers and a date of each recording, the attribute information request means having print selection means for selecting and instructing a combination of pieces of attribute information to be requested by the attribute information readout request, the selecting instruction concerning the combination of pieces of attribute information which can be given by the printing selecting means including, in addition to a first selecting instruction in which a combination of the disc title, the main information numbers, and the main information titles is selected for designation, a third selecting instruction in which a combination of the play times and dates and times of recording is selected for designation, and the print control means creates, as the dot pattern, dot pattern data of the selected and designated combination of pieces of attribute information out of the attribute information at the location of the main label. According to this construction of a preferred embodiment, in addition to the selecting instruction concerning the combination of the disc title, the main information numbers, and the main information titles (the first selecting instruction), it is possible to select and designate the third selecting instruction in which a combination of the play times and dates and times of recording is selected for designation.

Therefore, it is possible to make main labels richer in diversity. Further, by affixing the labels formed respectively by the first selecting instruction and the third selecting instruction side by side, a label is obtained which generally gives all the necessary information concerning the main information.

Preferably, the selecting instruction concerning the combination of pieces of the attribute information further includes a second selecting instruction in which when all of the main information numbers and main information titles corresponding thereto cannot be printed on lines up to a last line determined by the maximum number of lines printable on the main label even if the first selecting instruction is selected for designation, a combination of the remaining main information numbers and main information titles is selected for designation. According to this construction of a preferred embodiment, even when the first selecting instruction is selected for designating the combination of the disc title, the main information numbers and the main information titles, in case all of them cannot be printed on the lines up to the last line of the main label, it is possible to select and designate the combination of the remaining main information numbers and titles (second selecting instruction). Therefore, it is possible to form main labels which are even richer in diversity, and by affixing the labels made respectively by the first selecting instruction and the second selecting instruction, side by side, a label is obtained which gives all of the main information numbers and the main information titles corresponding thereto.

Preferably, the print control means creates dot pattern data of a play time and a date of recording corresponding to each main information number in a manner coincident with a line of the each main information number in the case of the first selecting instruction being selection for designation, when the third selecting instruction is selected for designation. According to this construction of a preferred embodiment, when the third selecting instruction is selected for designation, a play time and a date of recording corresponding to each main information number are printed in a manner coincident with the line of the main information number printed according to the first selecting instruction (for printing of the disc title, the main information numbers and titles). Therefore, by affixing the labels made respectively by the first selecting instruction and the third selecting instruction, side by side, a label easy to see is obtained on which a main information number, as well as a main information title, a play time, and a date of recording corresponding to the main information number are printed thereon side by side.

Preferably, the attribute information includes a disc title of the disc, the half-die-cut label of the printing tape including a side label to be affixed to a side surface of the disc cartridge, and the print control means creates dot pattern data of the disc title at a location of the side label. According to this construction of a preferred embodiment, since the attribute information is converted to a dot pattern for a printing tape formed with a half-die-cut label for a side label to be affixed to a side surface of the disc cartridge, the side label can be easily made by printing the dot pattern. Further, the disc title usually expresses the features of the disc, whereby the side label enables the disc to be discriminated from other labels.

Preferably, the half-die-cut printing tape includes a plurality of side labels. According to this construction of a preferred embodiment, a plurality of side labels can be easily made.

Preferably, the print control means creates the dot pattern data of the disc title in a manner such that a center of the dot pattern data of the disc title along a length thereof is coincident with a center of the side label along a length thereof. According to this construction of a preferred embodiment, since the dot pattern data is created in a manner such that a center of the dot pattern data of the disc title along a length thereof is coincident with a center of the side label along a length thereof, the disc title can be printed in a so-called centered layout, whereby a side label having a good appearance can be made.

Preferably, the print control means creates dot pattern data of a title comment in a fixed form which indicates that information is a disc title, at a first portion of a printing area of the side label, and then dot pattern data of the disc title at the following printing area. According to this construction of a preferred embodiment, since a title comment in a fixed form which indicates that the information is a disc title is printed at a first portion of the printing area, and the disc title is printed at the following printing area, it is possible to explicitly show that the denotation by the side label is a disc title, and since the heads of the disc titles printed can be arranged in a line when a plurality of disks are placed one upon another, the side labels can be obtained which presents good appearances.

Preferably, pieces of the main information in the disc are numbered main information numbers, respectively, the attribute information including a disc title of the disc, the main information numbers and main information titles corresponding thereto, as well as a date of recording of a piece of the main information which has a smallest one of the main information numbers, the half-die-cut label including a side label to be affixed to a side surface of the disc cartridge, the print control means creating dot pattern data of the disc title at a location of the side label as the dot pattern, when the attribute information read in response to the attribute information readout request by the attribute information request means contains the disc title, creating dot pattern data of the piece of the main information which has the smallest one of the main information numbers in place of the disc title, when the read attribute information does not contain the disc title but contains the main information titles, and creating dot pattern data of the date of the recording, when the read attribute information does not contain the disc title nor the main information titles. According to this construction of a preferred embodiment, the attribute information is converted to a dot pattern for printing tape formed with a half-die-cut label for a side label to be affixed to a side surface of the cartridge, and hence the side label can be easily made merely by printing the dot pattern. Further, the disc title is usually a best expression of the contents of the disc, and the side label having the disc title printed thereon makes it easy to discriminate the disc from others. Further, when the attribute information does not contain the disc title but contains the main information titles, the dot pattern data of a main information title which is smallest in its main formation number is crated and printed, and if there are no main information titles, the date of recording the piece of main information which has the smallest main information number is printed. This makes it possible to make a side label which represents the contents of the disc to a most extent available from the attribute information.

BRIEF DESCRIPTION OF DRAWINGS

FIG. 3 is a detailed diagram of a printing tape formed with two types of half-die-cut labels;

FIG. 9 is a diagram showing the construction of data items of music pieces serially stored in a disc information-storing block;

FIG. 16 is a diagram showing another example of results of printing on a side label;

FIG. 18 is a diagram showing an appearance of an mini disc (MD);

FIG. 31 is a block diagram showing the arrangement of the FIG. 30 system.

BEST MODE OF CARRYING OUT THE INVENTION

The invention will now be described in detail with reference to drawings showing embodiments thereof. Further, a recordable/reproducible disc system of the invention will be described by using an MD system as an embodiment thereof.

Figure 1:
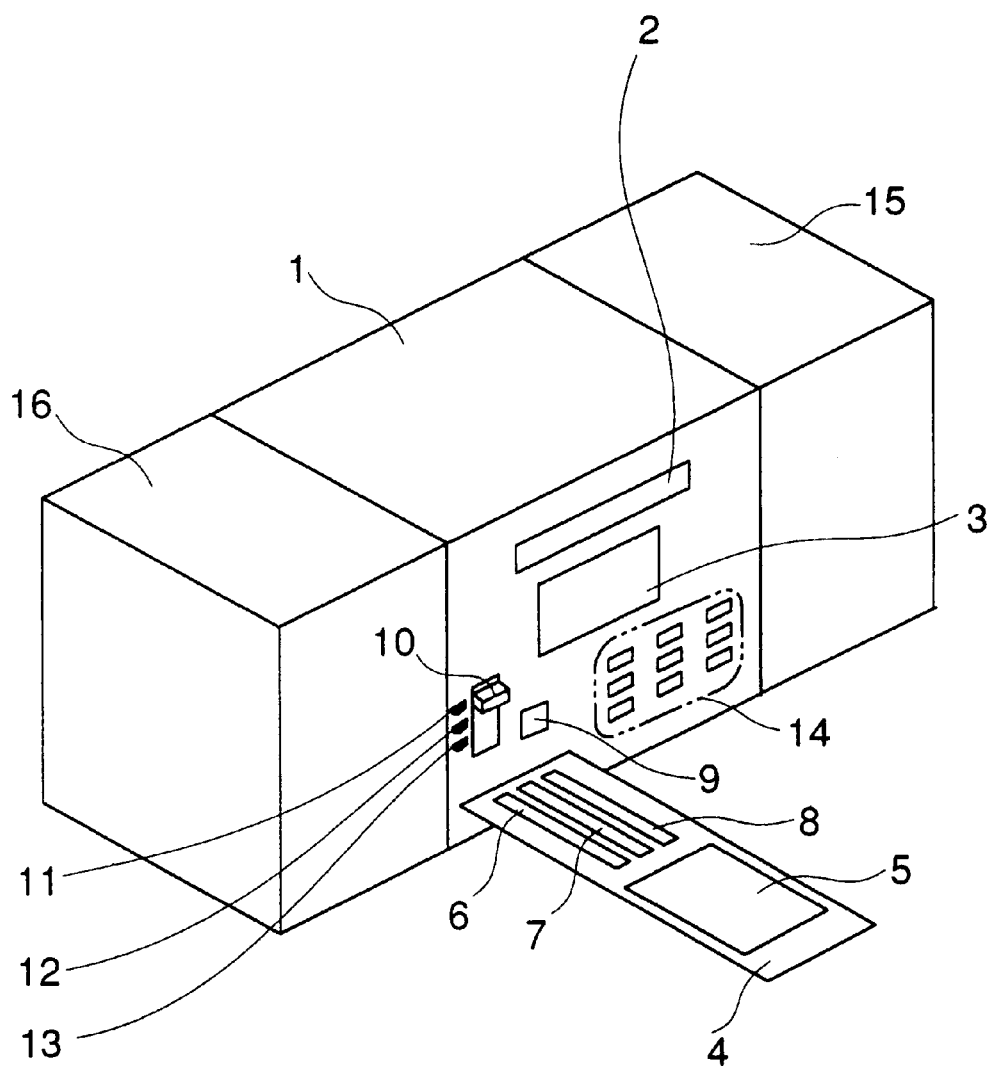
FIG. 1 is a diagram showing an appearance of a stationary MD record/playback system incorporating a label printer according to an embodiment of the invention.

FIG. 1 shows an appearance of a stationary MD recorder/player as the embodiment incorporating a label printer according to the invention. The stationary MD record/playback system 1 includes an MD recorder/player (disc playback system) and the label printer. A printing tape 4 is shown in the figure in a state already printed and delivered out of the system 1.

The printing tape 4 is a laminate of a base tape having a printing surface as a top surface and an adhesive treated surface as an underside surface, and a peel-off paper covering the adhesive treated surface of the base tape. Further, the base tape of the printing tape 4 is formed with a main label 5 and side labels 6, 7 and 8 as half-cut labels to be affixed to an MD cartridge (hereinafter, labels formed as such are referred to as "half-die-cut labels"). According to the label printer, attribute information is converted to a dot pattern for use with a printing tape 4 formed with labels defined by scored lines (formed by so-called half die cutting) and printed on the printing tape 4, whereby labels can be easily formed and further if the rectangular areas are peeled off along the scored lines, it is possible to obtain labels which can be affixed to an MD cartridge with ease.

Reference numeral 9 designates a print start button (print start means), which is operated to start a label-forming operation, as described hereinafter. In the label printer, an attribute information readout request, described hereinbelow, is made after instructing the start of a printing operation, which prevents execution of wasteful operations, such as printing processing carried out only to print on a label when unnecessary.

Reference numeral 10 designates a slide print selection button (print selection means) for selecting combinations of attribute information items required to be printed on the main label 5. More specifically, by setting the slide print selection button 10 at a position designated by reference numeral 11 (first selecting instruction), it is possible to instruct the creation of a main label 5 printed with "disc title and music titles" and by setting the slide print selection button 10 at a position designated by reference numeral 12 (second selecting instruction), it is possible to instruct the creation of a main label printed with "remaining music titles", while by setting the slide print selection button 10 at a position designated by reference numeral 13 (third selecting instruction), it is possible to instruct the creation of a main label having "play time and recording date" printed thereon. In short, any of the above three kinds of combinations of attribute information items for printing can be selected by operating the slide print selection button 10. Reference numeral 14 designates a record/playback operation button group (disc operation button group) operated for the recording and playback of an MD. Reference numerals 15 and 16 designate loudspeakers.

Figure 2:
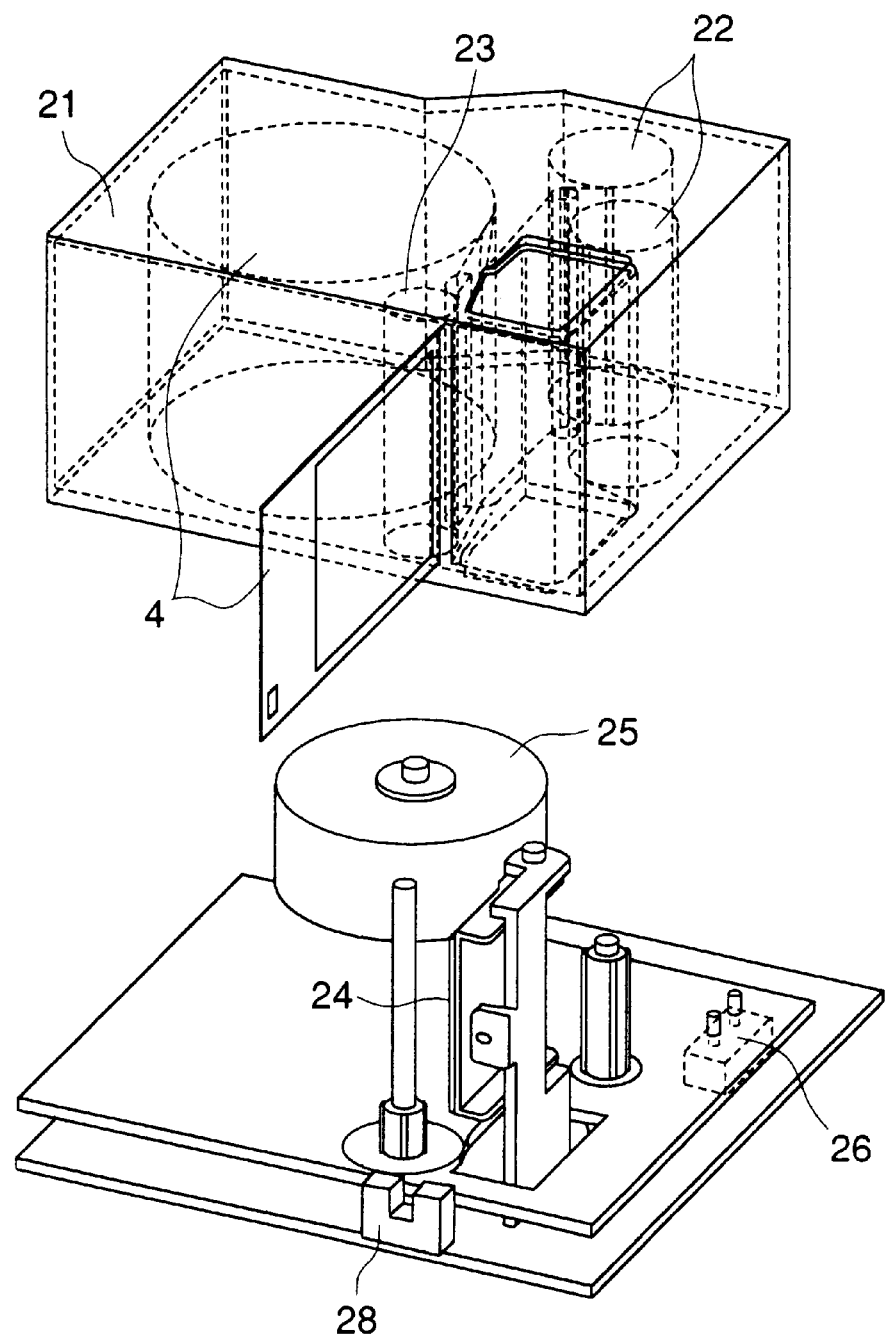
FIG. 2 is a perspective view of a tape printing mechanism as a component block of the label printer according to the invention.

FIG. 2 shows a tape printing mechanism which constitutes the label printer according to the invention. Now, the tape printing mechanism will be briefly described hereinafter. The mechanism includes a printing tape-holding cassette 21 and a printer block 91 (see FIG. 8).

The printing tape-holding cassette (cassette) 21 contains the printing tape 4 in the form of a roll, a thermal transfer ink ribbon 22, which extends between a supply roll and a used ribbon-take-up roll in a manner winding around the two rolls, and a platen roller 23. The printing tape-holding cassette 21 is removably loaded in the printer block (label-storing means) 91. Further, there are provided several kinds of printing tape-holding cassettes 21 according to the shapes of half-die-cut labels formed on the printing tape 4 contained and the combinations of the half-die-cut labels.

The printer block (print means) 91 is comprised of a thermal head 24 which is constituted by 256 heating elements arranged in a line at a pitch of 200 dots/inch in the direction of the width of the printing tape 4, a tape feed motor 25 for driving for rotation the platen roller 23 and the used ribbon-take-up roll for winding the used thermal transfer ink ribbon 22, and a cassette-detecting switch 26 for detecting the type or kind of printing tape-holding cassette 21. The cassette-detecting switch 26 determines whether or not there are holes formed in the printing tape-holding cassettes 21 at locations corresponding to two detecting levers provided on the cassette-detecting switch 26 and detects the kind of printing tape-holding cassette 21, that is, the positions and types of shapes of the half-die-cut labels formed on the printing tape 4.

When labels are produced, a tape printing control system urges the thermal head 24 against the platen roller 23 via the printing tape 4 and the thermal transfer ink ribbon 22. Further, the tape printing control system drives the tape feed motor 25 for rotation to feed the printing tape 4 and detects a printing reference position formed on the printing tape 4 by a printing reference-detecting switch 28 comprised of a photo interrupter or the like. Thereafter, it causes predetermined heating elements of the thermal head 24 to generate heat in a manner timed to each reference feed pitch (200 dots/inch) of the printing tape 4, whereby ink of the thermal transfer ink ribbon 22 is transferred onto the printing tape 4 by a plurality of columns of dots to print characters.

FIG. 3 shows in detail a printing tape as an example of a combination of half-die-cut labels selected in respect of type and number from several types of half-die-cut labels having respective shapes are combined with each other. Reference numeral 4 designates a printing tape, reference numeral 5 a main label and reference numerals 6, 7 and 8 side labels. There are formed three side labels, since they have to be affixed, if required, to side surfaces of an MD cartridge (disc cartridge: see, for instance, the MD cartridge 901 described above with reference to FIG. 18) or a casing of an MD (see e.g. the casing 902 appearing in the figure).

Reference numeral 35 designates a printing reference hole. The printing reference-detecting switch 28 detects this hole to print a disc title, music titles and the like at predetermined locations with reference to the hole.

Reference numeral 36 designates a printing reference hole for a combination label to be printed in the following printing operation. A portion surrounded by two-dot chain lines 31 is the maximum printing area 32 of the main label 5. The maximum printing area 32 has a maximum printing width H of approximately 32.5 mm, which is identical in width to the column of dots of the 256 heating elements constituting the thermal head 24. The maximum printing area 32 has a maximum printing length L of approximately 48 mm, which is constituted by 378 reference feed pitches, while margins having an identical length have been allocated to longitudinal opposite ends of the main label 5. When the height of a character to be printed and a spacing between lines are constituted by 16 reference feed pitches and 2 reference feed pitches respectively, it becomes possible to print maximum 21 lines within the maximum printing length L. A portion surrounded by two-dot chain lines 33 is the maximum printing area 34 of the side labels, which is identical in size to the maximum printing area 32 of the main label. Further, the center line of each label located within the maximum printing area 34 in the direction of the maximum printing length L coincides with that of the side label in the direction of the length thereof. When the side labels are printed, characters are arranged at position where the side labels 6, 7 and 8 overlap the maximum printing area 34 of the side labels are placed.

As described above, according to the label printer, the printing tape 4 formed with half-die-cut labels thereon can be removably loaded for printing on the half-die-cut labels, and hence it is possible to easily produce labels one after another by changing printing tapes 4. More specifically, a printing tape 4 is accommodated in the printing tape-holding cassette (cassette) 21 and the printing tape 4 accommodated in the printing tape-holding cassette 21 can be removably loaded in the label printer, and moreover the printing tape 4 is formed with a plurality of sequential half-die-cut labels. Therefore, it is possible not only to successively create the same number of labels as that of the half-die-cut labels formed on the printing tape 4, but also to easily repeat the creation of labels by changing printing tape-holding cassettes 21, which enables a lot of labels to be produced with ease.

Further, in the case of the label printer, the half-die-cut labels formed on the printing tape 4 include a plurality of types of half-die-cut labels different in outer shape and size from each other. As a result, by converting various kinds of attribute information, described hereinbelow, to a dot pattern for use with a printing tape 4 formed with a plurality of types of half-die-cut labels different in outer shape and size from each other, and printing the same on the printing tape 4, it is possible to easily create a plurality of types of labels different in outer shape and size from each other.

The above plurality of types of half-die-cut labels include a main label 5 (see the main label 903 appearing in FIG. 18) affixed to a top surface of an MD cartridge (disc cartridge: see FIG. 18) 901 and side labels (see the side labels 904 shown in FIG. 18) affixed to side surfaces of the MD cartridge (disc cartridge), so that by converting attribute information to a dot pattern for the printing tape 4 formed with the plurality of types of half-die-cut labels including the main label 5 and the side labels 6 or the like, and printing the same on the printing tape 4, it is possible to produce the main label 5 and the side labels 6 or the like simultaneously with ease.

In the case of the example shown FIG. 3, the printing tape 4 is formed with (includes) three (a plurality of) side labels 6 to 8 as half-die-cut labels, and hence the label printer is capable of creating the main label 5 as well as the three side labels 6, etc. simultaneously with ease.

In the label printer, attribute information required to be printed contains the disc title of an MD disc, a music number (main information number) as well as a music title (main information title), play time and a recording date corresponding to the music number. Further, details of the contents of a disc are printed on a main label 5 having a relatively large area, while a disc title and the like are printed on a side label 6 and the like, which makes it possible to easily distinguish discs from each other, when discs are placed side by side for storage.

In the following, the print format (print dot pattern) of a main label 5 will be described.

Figure 4:
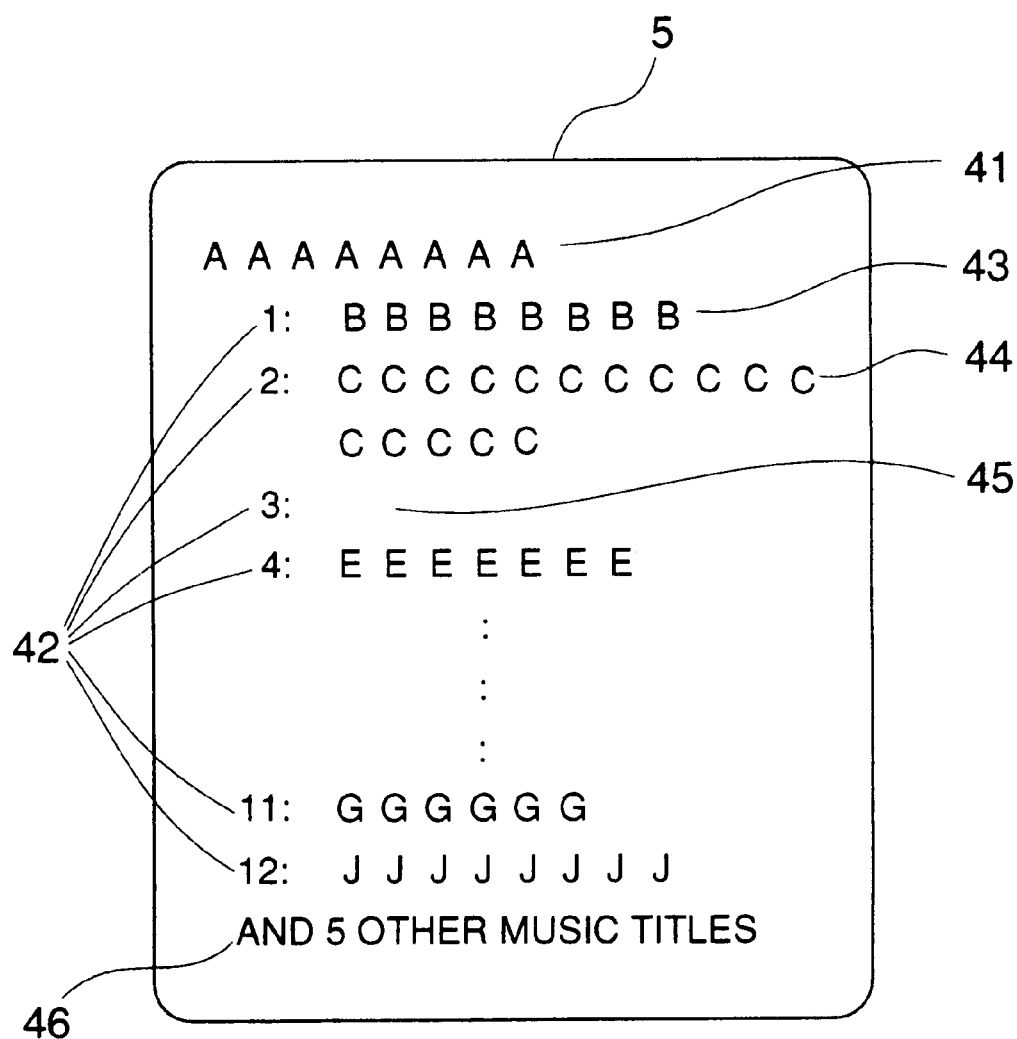
FIG. 4 is a diagram showing an example of results of printing which is carried out on a main label when an instruction "disc title and music titles" is selected by operating a print selection button.

FIG. 4 shows an image representative of the results of printing on a main label 5, which is carried out when the first selecting instruction (11) "disc title and music titles", described above with reference to FIG. 1, is selected by the print selection button (print selection means) 10.

Reference numeral 41 designates a disc title, which is printed from a first column on a first line on the main label 5. Reference numeral 42 designates music numbers (main information numbers). The music numbers are serial numbers starting from music number 1 and printed from a first column. Reference numeral 43 designates the music title (main information title) of music number 1. All the music titles are printed from the same music title-starting column after the respective music numbers and hence music titles have heads thereof aligned with each other. Reference number 44 designates the music title of music number 2, which is printed in a manner automatically extending to a next line, since the music title is too long to be printed on a line. Reference numeral 45 designates a blank generated due to the music title of music number 3 being left not entered. Reference numeral 46 designates the undermost line, i.e. the 21-th line, on which are printed, from a first column, a comment of a predetermined phrase "and other music titles" expressing that there are music numbers left unprinted, and the number of unprinted or remaining music pieces.

As described above, when a music number (main information number) 42 and a music title 43 or the like corresponding thereto are printed side by side on an identical line on the main label 5, the music number is necessarily printed, so that the user can easily recognize whether or not a music title corresponding thereto is recorded.

It should be noted that in the example described above with reference to FIG. 4, a separator ":" is inserted after each music number (before each music title) and hence even if each music number is omitted, it is possible to determine with reference to a separator whether or not a music title is recorded (hereinafter the separator is referred to as a "pre-music title mark (pre-main information title mark), which means a mark placed before a music title"). That is, it is possible to determine with reference to a music number (main information number) and/or a pre-music title mark whether or not a music title is recorded. Further, by using a music number and/or a pre-music title mark, the user can be prevented from being confused in determining to which music a music title belongs, even when a long music title is printed in a manner continued to a next line.

Further, when a lot of pieces of music are recorded in an MD, as shown in the above example, the number of music pieces whose titles are not yet printed is printed on the last line, so that the user can recognize the number of pieces other than pieces whose titles are printed. Furthermore, since the disc title is printed together with the music titles and music numbers, the user can understand all the contents of the MD cassette, if only he (she) views the main label thereof. Although in the above example, the comment "and other music titles" is used, any other comment, such as "unprinted number" or "a total of . . . ", may be employed, which the user can associate with the presence of music pieces whose titles are not printed. Further, any mark (for instance, "·" or ".") other than the separator ":" may be used as a pre-music title mark or a space may be inserted so long as it serves as a mark indicative of separation of a music number from a music title.

Figure 5:
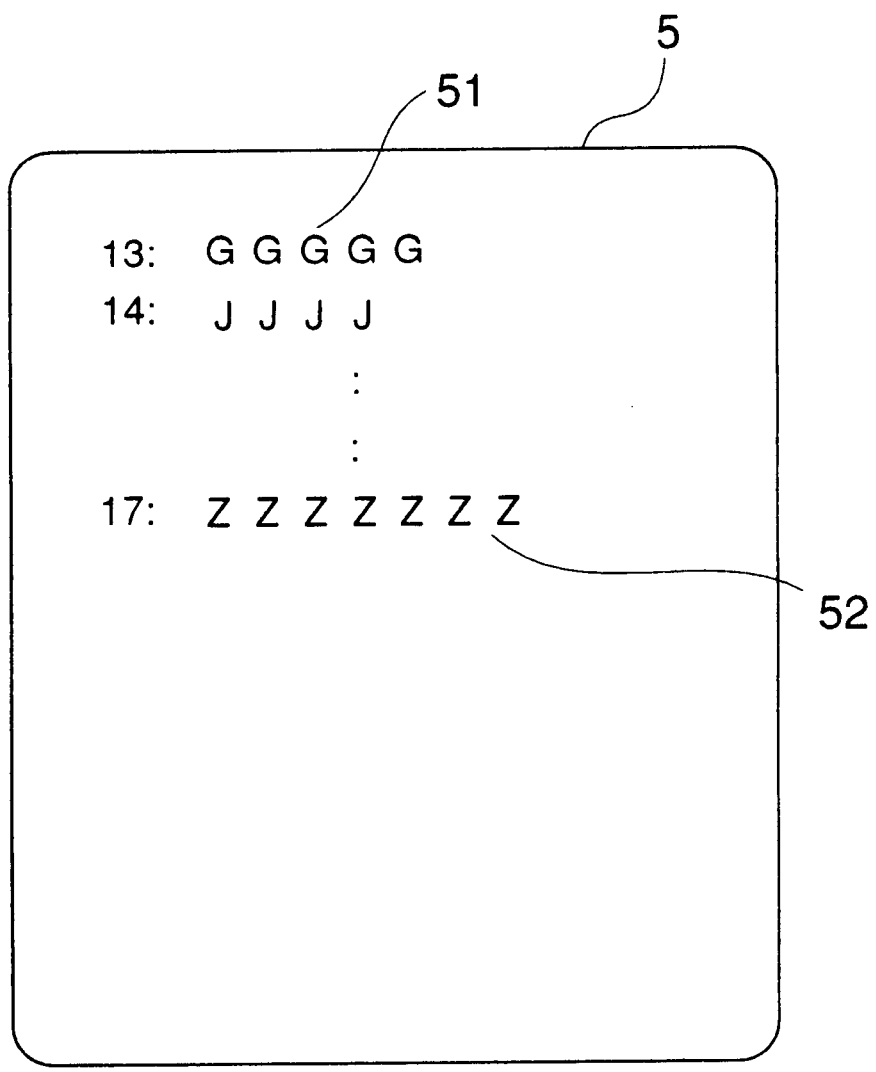
FIG. 5 is a diagram showing an example of results of printing which is carried out on a main label when an instruction "remaining music titles" is selected by operating the print selection button.

FIG. 5 shows an image representative of the results of printing on a main label 5, which is carried out when the second selecting instruction (12) for selecting "remaining music titles", described above with reference to FIG. 1, is selected by the print selection button 10. Reference numeral 51 designates the title of music number 13 as the first music number of music pieces left unprinted, while reference numeral 52 designates the title of the last music number thereof, which shows that a total of seventeen pieces of music are recorded in this MD.

When this main label 5 created when the second selecting instruction (12) for selecting "remaining music titles" is selected and the main label 5 produced when the first selecting instruction for selecting "disc title and music titles" is selected, described hereinabove with reference to FIG. 4, are affixed to the MD case 902 side by side instead of the case label 905 described above with reference to FIG. 18, for instance, the user can obtain a label enabling him (her) to recognize all the music titles recorded.

Figure 6:
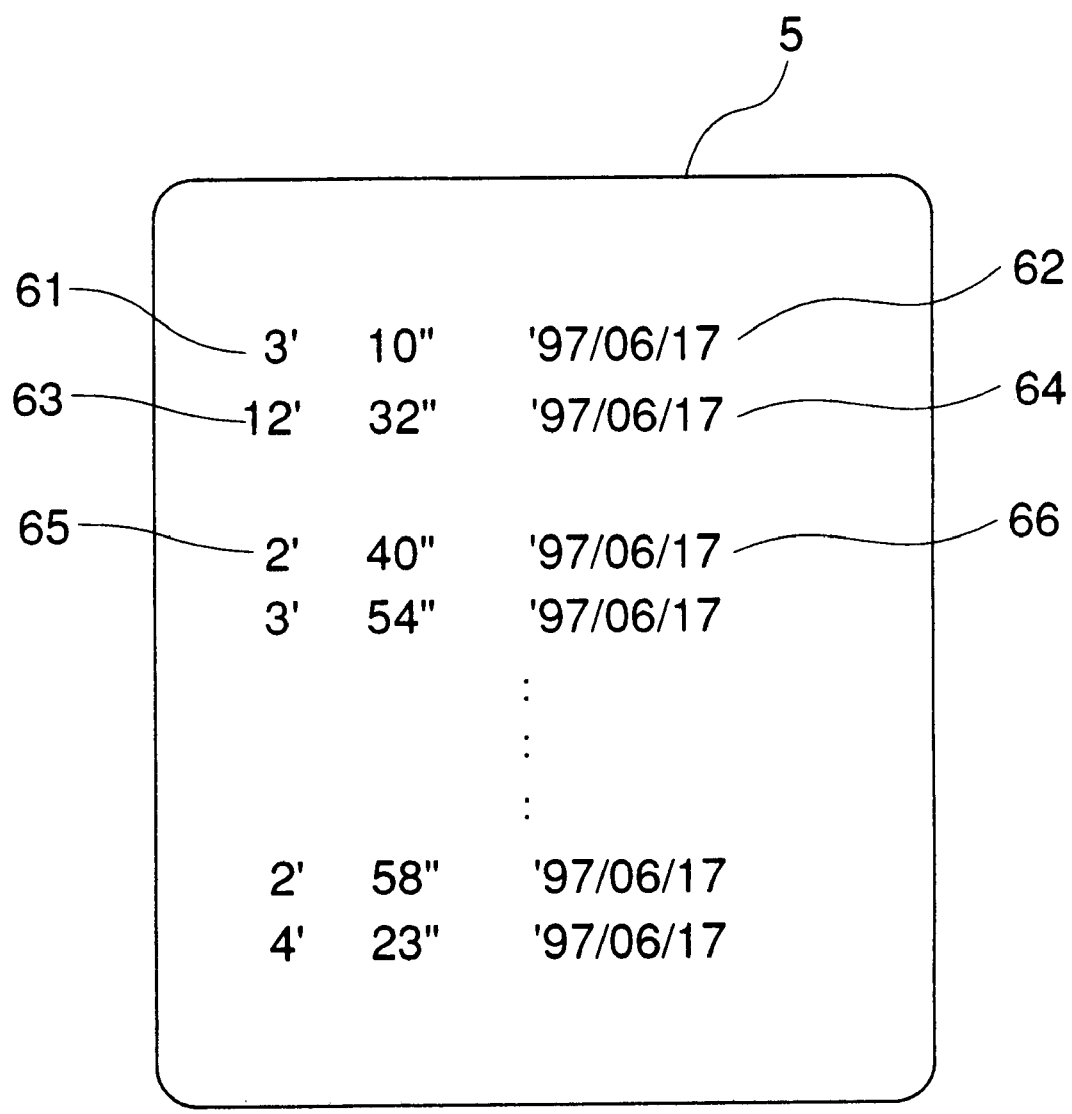
FIG. 6 is a diagram showing an example of results of printing which is carried out on a main label when an instruction "play time and recording date" is selected by operating the print selection button.

FIG. 6 shows an image representative of the results of printing on a main label 5, which is carried out when the third selecting instruction (13) for selecting "play time and recording date", described above with reference to FIG. 1, is selected by the print selection button 10. Reference numeral 61 designates the play time of music number 1 and reference numeral 62 designates the recording date of music number 1. Reference numeral 63 and reference numeral 64, printed on a second line designate the play time and recording date of music number 2, respectively. Reference numeral 65 and reference numeral 66 designate the play time and recording date of music number 3, respectively. There is generated a blank line immediately thereabove, since the music title 44 of music number 2 is printed on two lines. As described above, the play time and recording date of each music number is printed on the same line as the line on the main label 5 printed with each music number which is produced when the first selecting instruction for selecting "disc title and music titles" shown in FIG. 4 is selected.

When the above main label 5 produced when the third selecting instruction (13) for selecting "play time and recording date" is selected and the main label 5 produced when the first selecting instruction for selecting "disc title and music titles" is selected, as described hereinabove with reference to FIG. 4, are affixed to the MD case 902 side by side instead of e.g. the case label 905 described above with reference to FIG. 18, it is possible to obtain a label printed with all information of each piece of music, that is, information of the number, title, play time and recording date of each piece of music on the same line. Although in the illustrated example, no information is printed on the line having the disc title printed thereon, the total play time of the disc and the date of recording the disc title may be printed side by side on the line after the disc title.

As described above, according to the label printer, attribute information is converted to a dot pattern for use with a printing tape 4, which is formed with half-die-cut labels thereon so as to produce a main label 5 to be affixed to a top surface of the MD cartridge (disc cartridge: see FIG. 18) 901, and printed on the half-die-cut labels, whereby it is possible to easily create a main label 5. Further, since the main label 5 can have a relatively large area, the same can be printed with details of the contents of a disc, such as a disc title, music numbers (main information numbers), music titles (main information titles), etc.

Further, the first selecting instruction for selecting "disc title and music titles" is selected by operating the print selection button (print selection means) 10, whereby a disc title is printed on a line of a main label 5 (if the disc title is long, it is printed on the following line in a continued manner), while music numbers (main information numbers) and music titles (main information titles) are printed on the other lines (if there is a music piece having a long title, the title is printed on the following line in a continued manner), so that it is possible to produce a main label 5 with a print layout which enables the user to easily understand details of the contents of a disc.

Additionally, when it is impossible to print all the music numbers (main information numbers) and music titles (main information titles) corresponding thereto, on the lines up to the last one of the main label 5, a dot pattern for informing the user of the above situation is created and printed, so that the user can view the information to recognize that there are music numbers (main information numbers) and music titles (main information titles), not yet printed. Since information of the number of music pieces (the number of pieces of main information) left unprinted is included in the above information, the user can grasp not only the music titles (main information titles) printed but also the number of music pieces (the number of pieces of main information) not yet printed and the total number of music pieces (main information) recorded in the MD (disc)by viewing the printed information.

Further, according to the label printer, it is possible to select a combination of a play time and a recording date (the third selecting instruction) in addition to a combination of a disc title, music numbers (main information numbers) and music titles (main information titles) (the first selecting instruction), which makes it possible to form main labels 5 richer in variety. Moreover, by affixing labels separately produced according to the first selecting instruction and the third selecting instruction side by side, it is possible to obtain a label enabling the user to grasp all the information generally required of each music piece (main information).

Furthermore, when the third selecting instruction is selected, dot pattern data of a play time and a recording date corresponding to each music number (each main information number) is created and printing is carried out such that the play time and recording date are printed on the same line as that printed with each music number (each main information number) when the first selecting instruction (for printing a disc title, main information numbers and main information titles) is selected. Therefore, by affixing labels separately produced according to the first selecting instruction and the third selecting instruction side by side, a label is obtained which has each music number (main information number) as well as a music title (main information title), a play time and a recording date corresponding to the each music number printed side by side on an identical line thereon, thereby enabling the user to easily view or recognize the same.

Still further, in the label printer, even when the combination of a disc title, music numbers (main information numbers) and music titles (main information titles) are selected according to the first selecting instruction, if it is impossible to print all the information items required to be printed on the lines up to the last one on a main label 5, a combination of music numbers (main information numbers) and music titles (main information titles), both of which are left unprinted, can be selected and instructed (by the second selecting instruction). Hence, it is possible to create main labels 5 richer in variety, and by affixing labels separately produced according to the first selecting instruction and the third selecting instruction side by side, a label is formed which enables the user to recognize all the music numbers (main information numbers) and music titles (main information titles) respectively corresponding thereto.

Next, the print format (print dot pattern) of side labels 6, 7 and 8 (side label 6 or the like) will be described.

Figure 7:
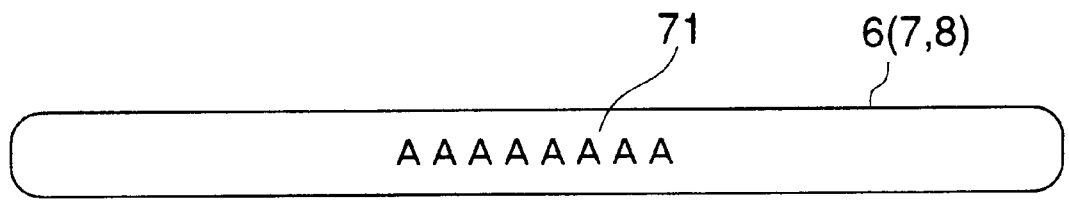
FIG. 7 is a diagram showing an example of results of printing on a side label.

FIG. 7 is an example of the side label 6 or the like printed with an attribute information item. Reference numeral 71 designates a disc title printed on the side label 6 or the like. In the present embodiment, the side label 6 or the like is enabled to be printed with a disc title. Further, when there is no disc title recorded in an MD, a music title having the smallest music number of all the recorded ones is printed on the side label 6 or the like. Furthermore, if there is no music title recorded in the MD, a recording date of music number 1 is printed. In addition, the disc title is automatically laid out and printed at the center of the side label.

As described hereinabove, the side label 6 or the like printed with the disc title is affixed to a side surface of the MD cartridge 901 or the MD case 902, described above with reference to FIG. 8, whereby even if a lot of MDs are placed one up on another, a desired MD can be found out very easily. Further, since the user generally tends to record music pieces in order of decreasing impression, if the disc title is not recorded in the MD, a music title having the smallest music number of all the recorded titles is printed. Furthermore, if there are no recorded music titles, a recording date of music number 1 recorded in the MD is necessarily recorded for the above reason.

As described above, according to the label printer, attribute information is converted to a dot pattern for use with a printing tape 4, which is formed with half-die-cut labels thereon so as to produce a side label 6 or the like to be affixed to a side surface of the MD cartridge (disc cartridge) 901 or the MD case (MD cartridge or the like) 902, and printed on the half-die-cut labels, whereby it is possible to easily create a side label 6 or the like. In addition, the disc title of the MD disc provides a best representation of features of the MD (disc), so that a side label 6 or the like enables the user to easily distinguish discs from each other.

Further, when attribute information read out has not a disc title but music titles (main information titles), a dot pattern data of the music title corresponding to the smallest music number (main information number) of all is created instead of the disc title and printing is carried out. If there are not contained any music titles (main information titles) in the attribute information read out, the recording date of a music piece having the smallest music number (smallest main information number: e.g. main information number 1) is printed. Hence, even when the attribute information read out does not include any music titles, it is possible to produce a side label 6 or the like which is best at representing contents of a disc.

Furthermore, a dot pattern data is created in a manner such that the center of the dot pattern data length of attribute information (for instance, a disc title, the music title of a music piece having the smallest music number or the recording date of music number 1) required to be printed is caused to coincide with the longitudinal center line of a side label 6 or the like, so that the disc title or like can be printed by a so-called center alignment method, which makes it possible to create a side label 6 or the like with excellent appearance.

Figure 8:
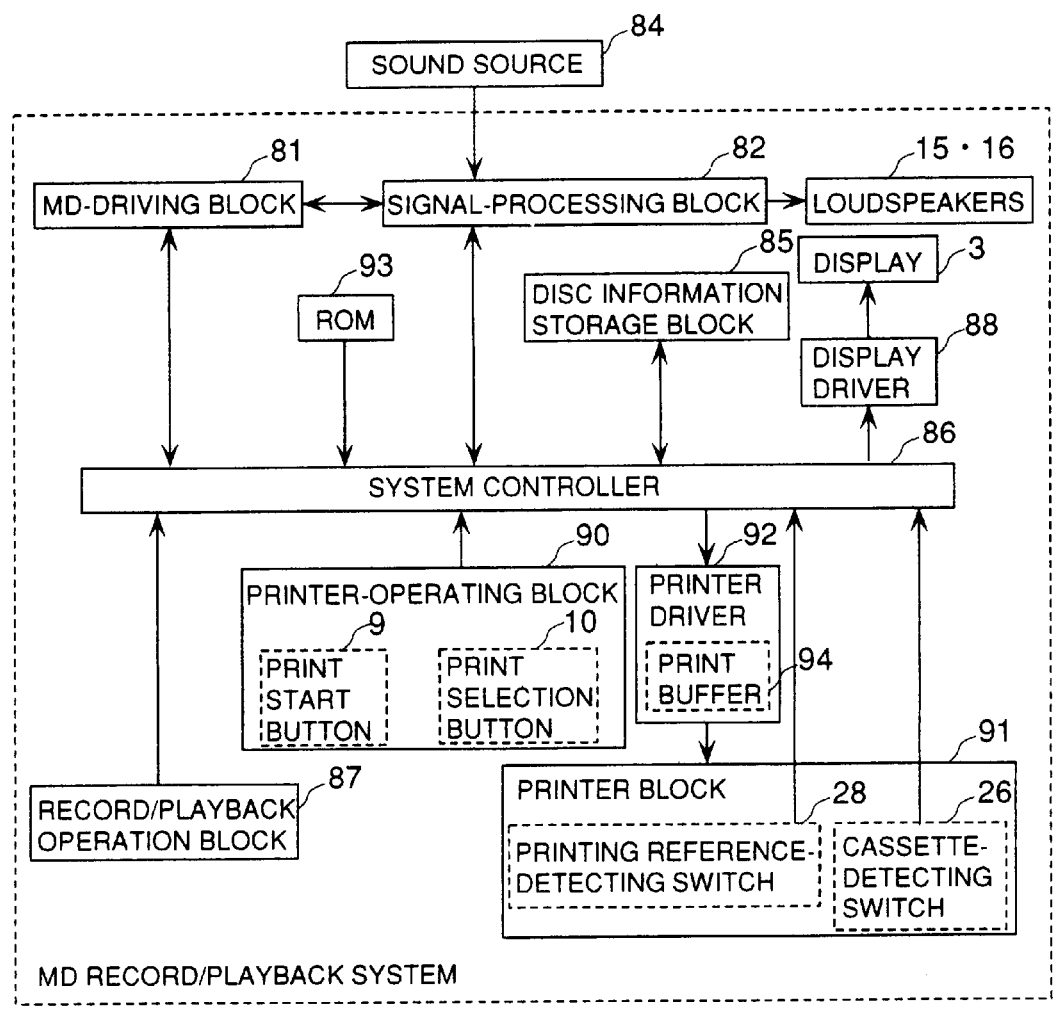
FIG. 8 is a block diagram showing the arrangement of the FIG. 1 stationary MD record/playback system, which incorporates the label printer according to the invention.

Next, FIG. 8 is a block diagram showing the arrangement of the stationary MD record/playback system 1, described above with reference to FIG. 1, which incorporates the label printer according to the invention.

The MD record/playback system 1 is comprised of a section relating to the recording and playback of MDs (MD recorder/player block: disc playback system) and a section relating to the printing of labels (tape printing mechanism: label printer). First of all, the section relating to the recording and playback of MDs (disc playback system) will be described.

Reference numeral 81 designates an MD-driving block. During playback, the MD-driving block 8 reads out main information (music information data) and attribute information (management information data and text information data) comprised of text data (text cord data), both of which are digitally recorded on the MD, whereas during recording, it records music information and management information on the MD as digital data. Reference numeral 82 designates a signal-processing block, which, during playback, temporarily stores management information data and text information data read out from the MD-driving block 81 and converts compressed digital music data into analog music signals for driving the loudspeakers 15 and 16. During recording, the signal-processing block 82 converts analog music signals sent from an external sound source 84 into compressed digital music data for transferring the digital music data and the management information data to the MD-driving block 81.

Reference numeral 85 designates a disc information storage block (storage means) comprised of the RAM, which stores data of a disc title, music numbers, music titles, the play time and recording date of each music piece, the total number of music pieces, the recording date of the disc title and the total play time of the disc, as information (attribute information) stored in a disc. The disc information is processed for storage by operating a system controller 86 (control block of the disc playback system, print control means, attribute information request means) based on the management information data and text information data which is temporarily stored in the signal-processing block 82 when a playback process is started (in response to a main information readout request).

Among the above disc information (attribute information) items, data items of the disc title, music titles, the recording date of each music piece, and the recording date of the disc title are stored as they are, while data items of the music numbers, the play times, the total number of music pieces and the total play time of the disc are calculated from the starting and terminating addresses of the management information for storage in the disc information storage block 85.

Reference numeral 87 designates a record/playback operation block (external operating means, disc-operating block) comprised of the record/playback operation button group (disc operation button group) 14, which includes a playback button, a stop button, a music selection button, a display switch button and a disc title display button for use in playback (for a main information readout request and an attribute information readout request) as well as a title button, a character selection button, a character-determining button and the like for use in entering text information.

Reference numeral 88 designates a display driver, which receives character codes (attribute information, display information) constituting each data item stored in the disc information storage block 85 and develops the same into a display dot pattern for displaying display characters on a display 3 comprised of a liquid crystal panel. The liquid crystal panel of the display 3 includes a music number display area and a music title display area for displaying music numbers and music titles during selection of music numbers or during playback. Whenever the display switch button of the record/playback operation block 87 is operated (for making an attribute information readout request), a music title display block displays attribute information items of each music piece cyclically in the order of a music title, a play time and a recording date thereof.

Further, when the title button is operated during playback, the display 3 is switched to a text entry screen and hence while viewing the display 3, the user repeatedly operates the character selection button to select each character and determine the same for entry by using the character-determining button, whereby he (she) can create a disc title or a music title. After completion of the entry of text information, when the title button is pushed again, the text information is stored in the MD.

Next, the section relating to the label printer will be described hereinafter. Reference numeral 90 designates a printer-operating block (attribute information request means, printing operation button group), which includes the print start button (print start means) 9 and the print selection button (print selection means) 10.

Reference numeral 92 designates a printer driver including a print buffer 94 and the like. The print buffer 94 is implemented by a RAM having a capacity corresponding to the maximum printing area 32 (or 34) of a main label (or a side label 6 or the like), that is, 256×378 memory cells and used as a print buffer not only when a main label 5 is created but also when a side label 6 or the like is created, as described hereinbelow.

Reference numeral 91 designates the printer block (print means) described above with reference to FIG. 2, which includes the thermal head 24, the cassette-detecting switch 26, and the printing reference-detecting switch 28. Among the heating elements of the thermal head 24, heating elements located at respective positions corresponding to cells each storing one dot of a print dot pattern stored in the print buffer 94 is energized for carrying out printing.

Reference numeral 93 designates a ROM, which stores a control program for controlling the MD recorder/player block, a print control program for controlling the tape printing mechanism, printing dot pattern data corresponding to character codes, information of shapes of labels corresponding to the type of a printing tape-holding cassette 21, and information of the position of the maximum printing area 32 (or 34), described above with reference to FIG. 3.

FIG. 9 is a diagram showing the arrangement of data items (attribute information) of music pieces serially stored in the disc information storage block 85. Reference numeral 101 designates the total number of music pieces indicative of the number of all music pieces stored in a disc, reference numeral 102 a disc title, reference numeral 103 a total play time indicative of a play time required for playing all the music pieces stored, reference numeral 104 a recording date when the disc title was recorded. Reference numeral 105 designates music number 1 of a first music piece, reference numeral 106 the music title 1 of music number 1, reference numeral 107 the play time 1 of music number 1, reference numeral 108 the recording date 1 of music number 1. Further, reference numeral 109 designates music number 2, reference numeral 110 the music title 2 of music number 2, reference numeral 111 the play time 2 of music number 2 and reference numeral 112 the recording date 2 of music number 2. As described above, various data items (attribute information, display information) of each of all music pieces displayed on the display 3 are serially stored in the disc information storage block 85.

During printing on labels, when the print start button (print start means) 9, which belongs to the printing operation button group of the printer-operating block (attribute information request means) 90, is operated, a label-forming process (see FIG. 10) is started. The system controller (the control block and print control means of the disc playback system) 86 reads out character codes (attribute information, display information) for the disc information storage block 85 according to the control program (for use in the label-forming process) of the tape printing mechanism and stores print dot pattern data corresponding to the character codes at predetermined locations in the print buffer 94. Thereafter, the system controller 86 causes the printer block (print means) 91 to print dot patterns, thereby forming desired labels (a main label 5, a side label 6 or the like).

As described above, according to the label printer of the present embodiment, the printer-operating block (attribute information request means) 90, which is used in combination with the record/playback operation block 87 as external operating means of the section relating to the recording and playback of MDs (disc playback system), makes an attribute information readout request for requesting display information. Then, the display information as disc information (attribute information) read out in response to the request is converted into print dot pattern data by the system controller (print control means) 86, to thereby cause the printer block (print means) 91 to carry out printing.

In the above case, a capability which the section relating to the recording and playback of MDs (disc playback system) originally has as a readout capability of reading out information to be displayed on the display 3, is used, so that it is possible to print all the disc information items (attribute information) displayable on the display 3 without additionally providing a new capability. In other words, labels conventionally produced by confirming or viewing disc information displayed on the display 3 and writing the same by hand can be created easily and beautifully by the label printer.

Further, in the above case, the printer-operating block (attribute information request means) 90, the printer block (print means) 91 and the system controller (print control means) 86 are arranged within a main unit of the MD record/playback system with the section relating to the recording and playback of MDs (disc playback system), which is suitable for a case where a label printer is integrally incorporated e.g. in a main unit of a stationary disc playback system, as shown in this embodiment.

Furthermore, in this embodiment, the control block of the section originally relating to the recording and playback of MDs (disc playback system) in the MD record/playback system 1 is the system controller 86 capable of effecting general data processing according to a control program, so that this section can perform not only its original function as a disc playback system but also a function of print control by installing a control program to serve as a label printer, thereby incorporating print control means therein. Therefore, according to the embodiment, through the shared use of the functions, it is possible to make an MD record/playback system (disc playback system) 1 incorporating a label printer, without increasing the size of the whole apparatus.

In addition, in the present embodiment, since the disc playback system has a disc information storage block (storage means) 85 for storing disc information (attribute information), display information (attribute information) can be read out instantly in response to the operation (attribute information readout request) by the display switch button of the record/playback operation block (external operating means, disc-operating block) 87. Therefore, it is possible to respond more quickly to an attribute information readout request from the printer-operating block (attribute information request means) 90 in the label printer.

It should be noted that in the MD record/playback system 1, basically, a task interrupt (for making a main information readout request or an attribute information readout request) is generated to a main (control) program routine where the system controller 86 is in key entry wait state, by operating the record/playback operation block (external operating means, disc-operating block) 87, whereupon the control program routine for executing various interrupt handling operations relating to the recording and playback of MDs is started to carry out the interrupt handling operations.

Further, in each interrupt handling routine, each kind of control subroutine (hereinafter referred to as an "attribute information readout subroutine") for reading out character codes (attribute information, display information) from the disc information storage block (storage means) 85 in response to the main information readout request or the attribute information readout request is started to obtain attribute information items corresponding to the main information readout request or the attribute information readout request.

The attribute information readout subroutines in the embodiment can be realized by carrying out interrupt handling (sub)routines (or predefined function routines), such as a program for retrieving and reading out desired data (attribute information) stored in the disc information storage block 85 by using the title of the requested attribute information or a storage address thereof as a parameter (argument).

Now, the system controller 86 during execution of a main control program routine, during execution of the control program routine for recording and reproducing MDs, and during execution of the attribute information readout subroutines performs an original function that the system controller 86 has as a disc playback system, so that the system controller 86 in the above state is described as a control system of the disc playback system.

On the other hand, during the key entry wait state of the system controller 86, a task interrupt for carrying out the label-forming process is generated when the printer-operating block (attribute information request means) 90 is operated, whereby a print control program routine for carrying out an interrupt handling operation (label-forming process) relating to the printing of labels, described hereinafter with reference to FIG. 10, etc., is started to execute the interrupt handling routine. That is, the system controller 86 in this state serves as a label printer, and hence it is described as print control means.

Further, the system controller 86 serving as print control means activates the above attribute information readout subroutines (steps 402 and 403 in FIG. 12, step 604 in FIG. 14, or steps 702, 708 and 711 in FIG. 15) in the print control program routine, described hereinbelow, so that the system controller 86 also has a capability of making an attribute information readout request, that is, performs a function of attribute information request means.

Therefore, according to the label printer in the MD record/playback system 1, when the print start button (print start means) 9, which belongs to the printing operation button group of the printer-operating block (attribute information request means) 90, is operated during printing on labels, the system controller 86 as the control block of the disc playback system starts a print control program routine for carrying out the label-forming process, described hereinafter (see FIG. 10), to pass the control to the system controller 86 as the print control means.

The system controller 86 as the print control means activates the attribute information readout subroutines at a time point attribute information is required, according to the control program (print control program routine) stored in the ROM 93 and provided for executing the label-forming process of the tape printing mechanism, and passes the control to the system controller 86 as the control block of the disc playback system.

The system controller 86 as the control block of the disc playback system carries out the attribute information readout subroutines to read out character codes (attribute information, display information) from the disc information storage block 85 and returns to the original print control program routine for passing the control to the system controller 86 as the print control means.

The system controller 86 as the print control means repeats the same procedures as described above and obtains required attribute information to thereby carry out the label-forming process according to the print control program routine. Then, the system controller 86 stores print dot pattern data items corresponding to the character codes at a predetermined location in the print buffer 94 and prints print dot patterns by using the printer block (print means) 91 for forming desired labels (a main label 5 as well as side labels 6 or the like).

It goes without saying that although the above processing operations are basically carried out by task interrupt handling routines, the same can also be effected by multitask processing or the like.

Further, the system controller 86 as the control block of the disc playback system and the system controller 86 as the print control means may be separately implemented by respective controllers.

In such a case, it is preferred that storage means is provided which reads out attribute information required for forming a label from the disc information storage block (storage means) 85 at a time for storing the same, at time point the print start button (print start means) 9 of the printer-operating block (attribute information request means) 90 is operated to start the print control program routine, since in this case, it is possible to prevent frequent communication (interface) between the control block of the disc playback system and the print control means implemented by the respective separate controllers, and enable the control block and the print control means to carry out these processing operations independently of and in parallel with each other except during the interfacing time period, leading to an increased processing speed of the system.

In the above case, it is more preferable to store control programs for actuating the respective controllers, in separate storage means. In this case, it is possible to avoid contention between the control block and the print control means for reading out the control programs.

Although in the above label printer, an attribute information readout request for requesting display information is made by the printer-operating block (attribute information request means) 90, which is used in combination with the record/playback operation block 87 as external operating means of the section relating to the recording and playback of MDs (disc playback system), this is not limitative, but if there is provided external operating means, such as a remote controller, the label printer can be configured such that the printer-operating block 90 makes an attribute information readout request in place of the remote controller (external operating means).

In any of the above cases, the label printer to which the invention is applied makes an attribute information readout request to the control block of the disc playback system having the capability of reading out attribute information in response to the attribute information readout request by the external operating means, in place of or in combination with external operating means, and converts the attribute information read out in response to the request into print dot pattern data for printing.

In any of the above cases, the readout capability which the disc playback system originally has is employed, and hence it possible to read out attribute information without additionally providing a new function. Further, since the attribute information read out is converted into print dot pattern data for printing on a label, there is no need to write the attribute information by hand on a label. Therefore, according to the label printer, an attractive label for use in affixation to a disc cartridge can be produced in a simplified manner.

The above variations of the first embodiment are partly presented in the description of a second embodiment (see FIG. 20), and next, the print control program routine (for controlling the label-forming process) of the tape printing mechanism, executed by the label printer according to the invention will be described with respect to a FIG. 10 flowchart.

First, when the print start button 9 is operated, the control program routine for controlling the tape printing mechanism is activated and started.

Figure 10:
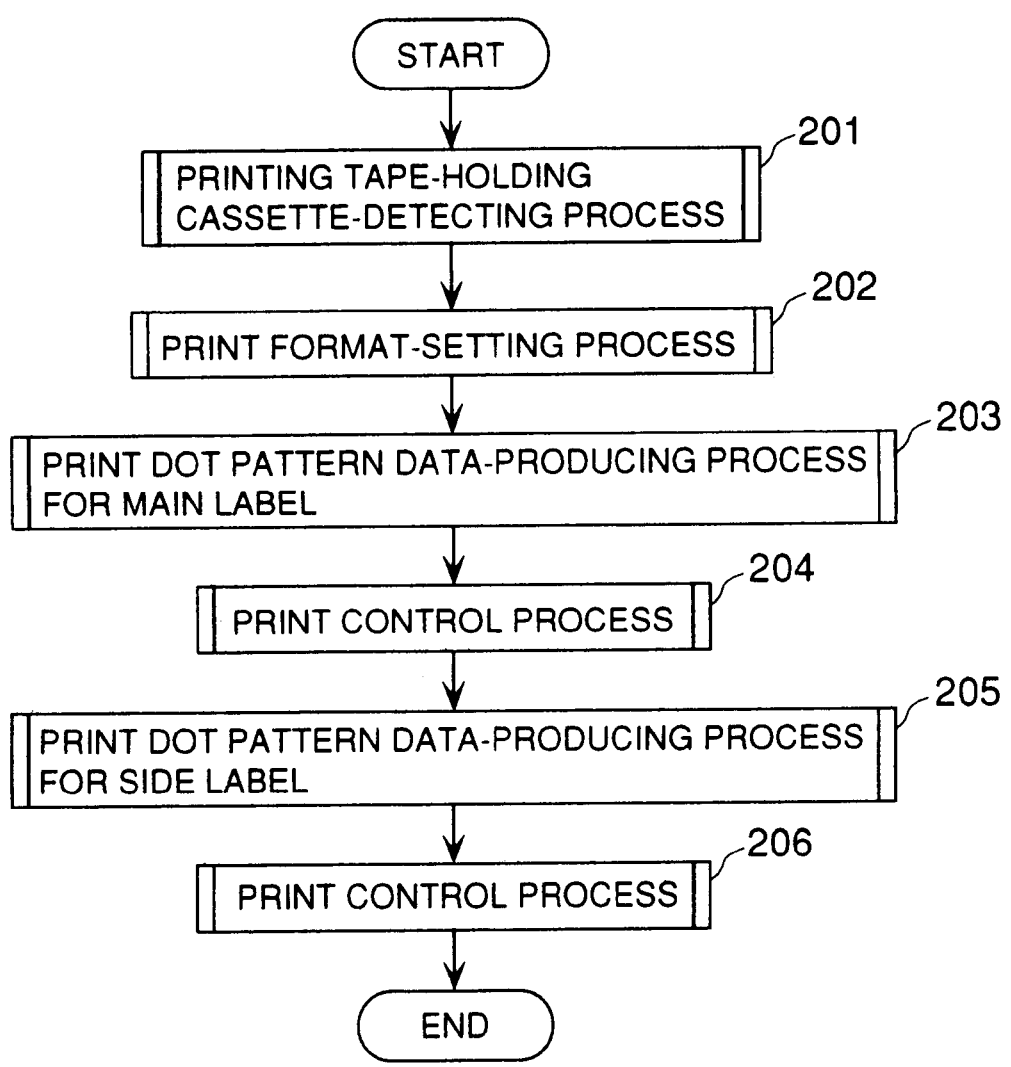
FIG. 10 is a flowchart showing a print control program for controlling the tape printing mechanism, which is executed by the label printer according to the invention.

As shown in FIG. 10, first, a printing tape-holding cassette-detecting process is carried out, and the system controller 86 reads in data of the cassette-detecting switch 26 of the printer block 91. As a result, information of the shapes of half-die-cut labels and that of the position of the maximum printing area corresponding to the type of a printing tape-holding cassette 21, stored in the ROM 93 in advance, are determined (step 201).

Figure 11:
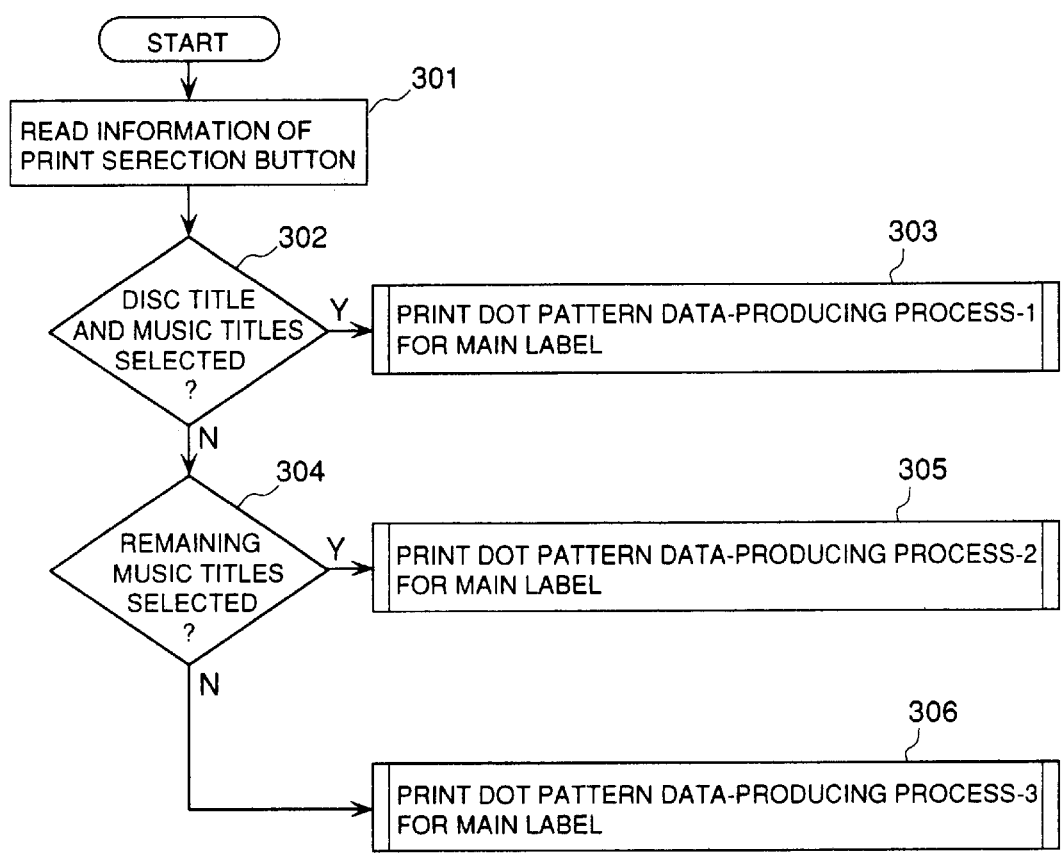
FIG. 11 is a flowchart showing a print format-setting process.

Next, a print format-setting process shown in detail in FIG. 11 is executed. Here, the system controller 86 reads the state of the print selection button 10 (i.e. whether any of the first to third selecting instructions is designated), whereby a print dot pattern data-producing program corresponding to one of three types of print formats (see FIGS. 4, 5 and 6) for printing a main label 5 is selected (step 202).

Figure 12:
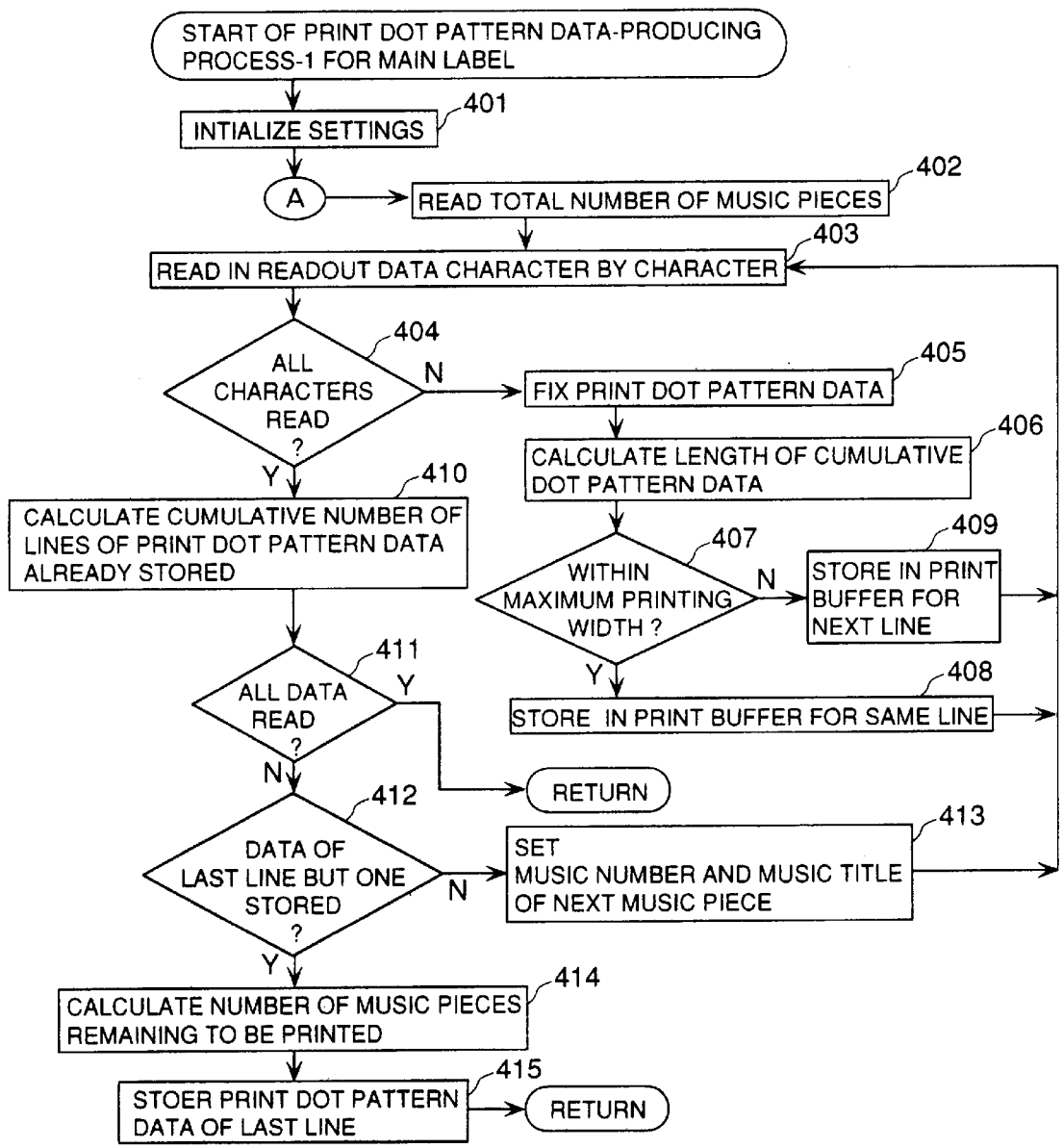
FIG. 12 is a flowchart showing a print dot pattern data-producing process-1 for forming a main label.
Figure 13:
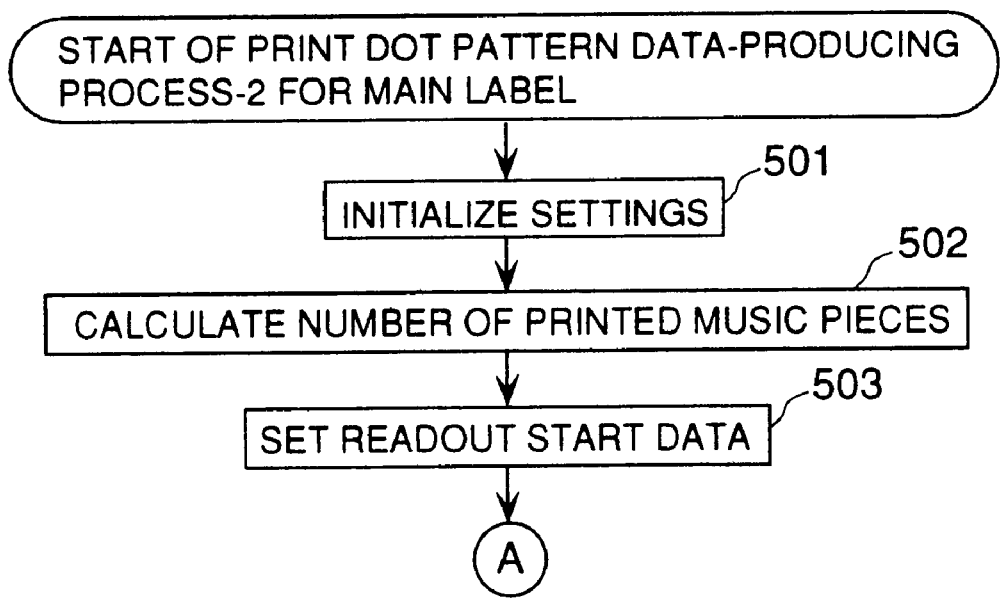
FIG. 13 is a flowchart showing a print dot pattern data-producing process-2 for forming a main label.
Figure 14:
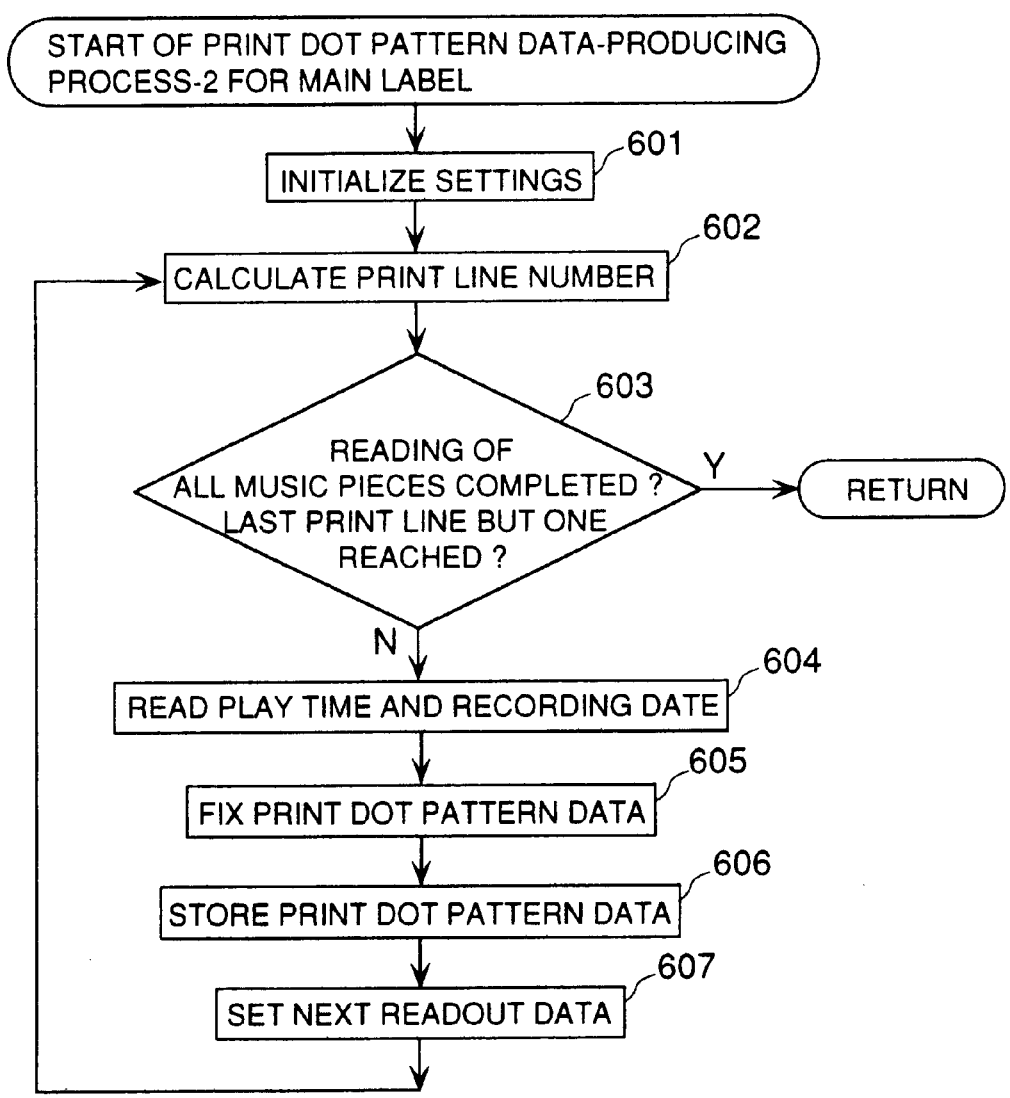
FIG. 14 is a flowchart showing a print dot pattern data-producing process-3 for forming a main label.

Then, a print dot pattern data-producing process for printing a main label, shown in detail in FIGS. 12 to 14, is carried out, whereby the system controller 86 stores print dot pattern data (stored in the ROM 93) corresponding to character codes stored in the disc information storage block 85 at the predetermined location of the print buffer 94 (step 203).

Thereafter, a print control process is started, whereby the system controller 86 drives the tape feed motor 25 for rotation to feed a printing tape 4 (see FIG. 2) and detects printing reference holes 35, 36 and the like formed in the printing tape 4 (see FIG. 3) by using the printing reference-detecting switch 28. Next, by using the detected printing reference holes 35, 36 and the like as reference positions, the system controller 86 controls ON/OFF of the heating elements of the thermal head 24 of the printer block 91 in accordance with the print dot pattern data for printing a main label stored in the print buffer 94, and transfers ink of the thermal transfer ink ribbon 22 onto the printing tape 4 to print on the main label 5 (step 204).

Next, a print dot pattern data-producing process for forming side labels is carried out, whereby the system controller 86 stores print dot pattern data (stored in the ROM 93) corresponding to a character code for a disc title stored in the disc information storage block 85 at the predetermined location of the print buffer 94 (step 205).

Then, the print control process described above in the process for forming characters to be printed on a main label 5 is started to print on side labels 6, 7 and 8 (step 206).

As a result, music titles, a disc title and the like are printed on a plurality of half-die-cut labels formed on the printing tape 4, followed by terminating the control program routine for the tape printing mechanism.

Next, the print format-setting process (step 202) is described in detail based on a flowchart showing a subroutine for carrying out the FIG. 11 print format-setting process.

Referring to FIG. 11, when the print format-setting process is started, the system controller 86 reads in data concerning the state of the print selection button 10 (i.e. whether or not any of the first to third selecting instructions is designated) (step 301).

Then, it is determined from the read data whether or not the print selection button 10 is in a state where it selects the first selecting instruction for printing "disc title and music titles". If it is determined that the print selection button 10 selects printing of "disc title and music titles" (Yes), the program proceeds to a print dot pattern data-producing process-1 for forming a main label, which will be described in detail with reference FIG. 12 (step 303). On the other hand, if it is determined that the first selecting instruction for printing "disc title and music titles" is not selected (No), the program proceeds to a step 304 for determining from the read data whether or not the print selection button 10 read in is in a state where it selects printing of "remaining music titles" (step 302).

If this determination as to whether or not the print selection button 10 read in is in the state where it selects the first selecting instruction for printing "remaining music titles" shows selection of "remaining music titles" (Yes), the program proceeds to a step 305 for carrying out a print dot pattern data-producing process-2 for forming a main label, which will be described in detail with reference to FIG. 13. If "remaining music titles" is not to be printed (No), the program proceeds to a step 306 for carrying out a print dot pattern data-producing process-3 for forming a main label, which will be described in detail with reference to FIG. 14.

Now, the print dot pattern data-producing processes for forming a main label will be described in detail with reference to FIGS. 12 to 14 flowcharts.

FIG. 12 is a flowchart showing a subroutine for the print dot pattern data-producing process-1 for forming a main label, which is executed when the first selecting instruction is selected.

As shown in the figure, when the process-1 is started, the system controller 86 carries out initialization to set a first storage location for storing print dot pattern data of a first column on a first line in the print buffer 94 so as to print a disc title from the first column on the first line of the main label 5 (step 401).

Then, the system controller 86 sets the total number of music pieces as first data (attribute information) to be read from the disc information storage block 85 (for instance, by setting a label (title) of "total number of music pieces" or a pointer (storage address) designating the label to a parameter), and activates the attribute information readout subroutines (for retrieving the attribute information by using the parameter) (i.e. makes an attribute information readout request), whereby the system controller 86 obtains the total number of the music pieces (see FIG. 9: attribute information, display information) stored in the MD from the disc information storage block 85. In short, the system controller 86 sets the total number of music pieces as required attribute information, and makes an attribute information readout request to thereby read the total number of the music pieces (attribute information, display information) (step 402).

Thereafter, the system controller 86 (similarly makes an attribute information readout request and) reads in a character code (see FIGS. 4 to 5 and FIG. 9) of each character (hereinafter, a loop from the step 403 to steps 408 or 409 is executed) from a first character of the set readout data (disc title as well as music numbers and music titles), one by one (step 403).

Next, it is determined whether or not all characters of the set or determined read data (the disc title as well as the music number and the music title) have been read in (step 404).

As results of the determination, if the reading of the data is not yet completed (No), the print dot pattern data stored in the ROM 93 and corresponding to the character code read in at the step 403 is fixed (step 405).

Then, based on the lengths of dots of the fixed print dot pattern data, the cumulative length of dots of print dot pattern data stored for an identical line is calculated (step 406).

Thereafter, it is determined whether or not the cumulative length of dots calculated at the immediately preceding step can be received within the maximum printing width H of the main label. That is, it is determined whether or not the disc title or the music number plus the music title printed on one line can be received within the width of the main label (step 407).

If the system controller is reading in the disc title or the pair of the music number plus the music title and at the same time the cumulative length of dots of characters read in at the step 403 is within a range of the maximum printing width H (Yes), the system controller 86 continues to store the print dot pattern data fixed at the step 405 at a location for the identical line in the print buffer 94 (step 408).

If the reading of the disc title or the pair of the music number plus the music title is completed and a first character of a next pair of a disc number and a disc title is read in (the next pair of the disc number and the disc title are not printed in the maximum printing width of the preceding characters), or alternatively if the disc title or the pair of the music number and the music title are being read in and at the same time the cumulative length of dots of the characters already read in exceeds the range of the maximum printing width H (No), the print dot pattern data fixed at the step 405 is stored at a location for the following line in the print buffer 94 (step 409).

As described above, when print dot pattern data of one character has been stored in the print buffer 94, the program returns to the step 403 to read in a character code for a next character in the readout data.

On the other hand, when it is determined at the step 404 that all the characters of the set readout data (the disc title as well as the music numbers and the music titles) have already been read in (Yes), the system controller 86 calculates the cumulative number of lines of the print dot pattern data already stored in the print buffer 94 (step 410).

Next, the program proceeds comparison of the number of the data already read in with the total number of the music pieces read at the step 402 to determine whether or not all the required data (the disc title as well as the music numbers and the music titles) in the disc information storage block 85 has been read (step 411).

If it is determined that all the data has already been read (Yes), the print dot pattern data-producing process-1 for forming a main label is terminated, and the program proceeds to a next process.

If there remains data which is not yet read in (No), the program proceeds determination, by using the cumulative number of lines of the print dot pattern data calculated at the step 410, as to whether or not the print dot pattern data is developed and stored in the print buffer 94 up to a line immediately before the last line for printing (step S412).

If there remains room to store print dot pattern data at the step 412 (No), the music number and the music title of a next music number are set as next readout data (step 413), followed by returning to the step 403 to read the character codes of the readout data set at the step 413 from the first character.

If the print dot pattern data except for that of the last line has been stored in the print buffer 94 (Yes), the number of remaining music pieces whose print dot pattern data is not yet stored is calculated based on the total number of the music pieces read in at the step 402 (step 414).

Next, print dot pattern data stored in the ROM 93 and representative of a comment "and other music titles" to be printed on the last line, and print dot pattern data corresponding to the number of the remaining music pieces are stored in the print buffer 94 (step 415).

After execution of the step 415, the print dot pattern data-producing process-1 is terminated and the program proceeds to a next process. As a result, print dot pattern data corresponding to the music number and the music title of each music piece is developed and stored in the print buffer 94 (see FIGS. 3 and 4).

Further, according to the flowchart, even if the main label is small in size, it becomes possible to store the print dot pattern data of a disc title and music numbers and music titles, to the maximum extent dependent on the size of the main label.

FIG. 13 is a flowchart showing a subroutine for the print dot pattern data-producing process-2 for forming a main label, which is executed when the second selecting instruction is selected.

As shown in the figure, when the process-2 is started, the system controller 86 carries out initialization to set a first storage position for storing print dot pattern data at a first column on a first line in the print buffer, so as to print a music number and a music title from the first column on the first line of the main label (step 501).

Next, although detailed description is omitted, the number of music pieces already printed is calculated according to substantially the same flowchart as the FIG. 12 flowchart showing the subroutine for carrying out the print dot pattern data-producing process-1 for forming a main label (step 502). In this case, if the FIG. 12 print dot pattern data-producing process-1 is first carried out according to the first selecting instruction, the number of music pieces already printed during the process-1 may be stored.

Then, a music piece having a music number next to the last one of the music numbers already calculated (or stored) at the step 502 is set as first data (music number and music title) to start a reading procedure (step 503).

After completion of the above settings, print dot pattern data corresponding to the music numbers and music titles of remaining pieces is developed and stored in the print buffer 94 according to part of the flowchart identical to A et seq. in the print dot pattern data-producing process-1 for forming a main label, described above with reference to FIG. 12 (see FIGS. 3 and 5).

FIG. 14 is a flowchart showing a subroutine for the print dot pattern data-producing process-3 for forming a main label, which is executed when the third selecting instruction is selected.

As shown in the figure, when the process-3 is started, the system controller 86 carries out initialization to set the play time and recording date of music number 1 (see FIGS. 6 and 9: attribute information, display information) as first data (attribute information) to be read from the disc information storage block 85 (step 601).

Then, to print the play time and the recording date on the same line as that having a music number and a music title printed thereon, the line printed with the music number and the music title corresponding to the set readout data (play time and recording date) is calculated according to approximately the same flowchart (whose detailed description is omitted now) as that showing the subroutine for carrying out the print dot pattern data-producing process-1 for forming a main label, and a print dot pattern data-storing line in the print buffer 94 is set (step 602).

Although each line having a music number and a music title printed thereon is calculated whenever a loop (602 to 607) is executed, to set a print dot pattern data-storing line in the print buffer 94, as described hereinbelow, this is not limitative, but if the print dot pattern data-producing process-1 described above with reference to FIG. 12 has been first carried out according to the first selecting instruction, or if the print dot pattern data-producing process-2 described above with reference to FIG. 13 has been carried out according to the second selecting instruction, the line printed with a music number and a music title determined in the process-1 or the process-2 (or the line for storing print dot pattern data of the music number and the music title) may be stored to set a line for storing the print dot pattern data of a play time and a recording date corresponding to the music number and the music title.

Then, it is determined whether or not data (of the play times and recording dates) of all the music pieces stored in the disc information storage block 85 has been read in, or whether or not printing has been carried out up to a line immediately before the last line of the data stored in the print buffer 94 (step 603).

If reading of the data of all the music pieces has been completed or if the printing has been carried out up to the line immediately before the last line in the print buffer 94 (Yes), the print dot pattern data-producing process-3 for forming a main label is terminated, followed by the program proceeding to a next process.

If not (No), the system controller 86 reads the play times and recording dates as the set readout data (attribute information) by making attribute information readout requests, similarly to the FIG. 13 subroutine (step 604).

Next, print dot pattern data stored in the ROM 93 and corresponding to data codes read in at the step 604 is fixed (step 605).

Then, the fixed print dot pattern data is stored in the print buffer 94 at the location for the print dot pattern data-storing line set at the step 602 (step 606).

Next, the play time and recording date of a music piece of a next music number are set as readout data (step 607).

Thereafter, the program returns to the step 602 to repeat the steps described above, and print dot pattern data corresponding to the determined play time and recording date is developed and stored in the print buffer 94 (see FIGS. 3 and 6).

Next, a print dot pattern data-producing process for forming side labels will be described in detail with reference to a flowchart shown in FIG. 15.

When the print dot pattern data-producing process for forming side labels is started, as shown in the figure, the system controller 86 clears the print dot pattern data developed and stored in the print buffer 94 for use in forming a main label, as initialization (step 701).

Then, the system controller 86 reads a disc title from the disc information storage block 85 (by making an attribute information readout request which sets a disc title as requested attribute information) (step 702).

Next, after carrying out a disc title-reading operation, it is determined whether or not there is a disc title (step 703).

When there is a disc title (Yes), a line of print dot pattern data stored in the ROM 93 and corresponding to the disc title is fixed (step 704).

Then the length of the fixed line of print dot pattern data is calculated (step 705).

Thereafter, to arrange the print dot pattern data at a center of each of the side labels 6 or the like, storage positions in the print buffer 94 are calculated based on position information of each side label fixed by the printing tape-holding cassette-detecting process (201), described above with reference to FIG. 10, and the length of the print dot pattern data calculated at the step 705, and then, the print dot pattern data fixed at the step 704 is developed and stored at three positions corresponding to the three of the side labels 6, etc. (see FIGS. 3 and 7) (step 706). As a result, print dot pattern data corresponding to the disc title is developed and stored at predetermined positions in the print buffer 94.

If there is no disc title at the step 703 (No), music titles are read in increasing order of music numbers (according to attribute information readout requests in which music numbers and music titles are set as requested attribute information in increasing order of music numbers) (step 708).

Then, it is determined whether or not there is a music title read at the step 708 (step 709). If there is a music title read (Yes), the program returns to the step 704 and print dot pattern data corresponding to the music title is developed and stored at a predetermined position in the print buffer 94 according to the steps described above.

If there was no music title at the step 709 (No), the program proceeds to determination of where it is determined whether or not all the music titles have been read (step 710). If all the music titles have not read (No), the program returns to the step 708 to read the music title of a next music number (according to an attribute information readout request).

If all the music titles have been read (Yes), the recording date of music number 1 is read in (according to an attribute information readout request in which the recording date of music number 1 is set as requested attribute information) (step 711). Thereafter, the program returns to the step 704 and print dot pattern data corresponding to the recording date of music number 1 is developed and stored at a predetermined position in the print buffer 94 according to the steps described above.

When print dot pattern data is thus developed and stored in the print buffer 94, as described above, the print dot pattern data-producing process for forming side labels is terminated, and the program proceeds to a next process.

As described above in the print dot pattern data-producing processes for forming a main label 5 and side labels 6, etc., the print buffer 94 is commonly used both when the main label is formed and when the side labels are produced, whereby it is possible to reduce the memory capacity of the print buffer 94.

It should be noted that FIG. 16 illustrates another example of a side label. Reference numeral 75 designates a predetermined comment "disc title:", which indicates that a print following the comment is a disc title. The comment is printed at a head of the side label. Reference numeral 76 designates the disc title, which is printed after the comment 75. Further, any term, such as "Title" or the like, which can be associated with a disc title may be used in place of the comment.

Figure 15:
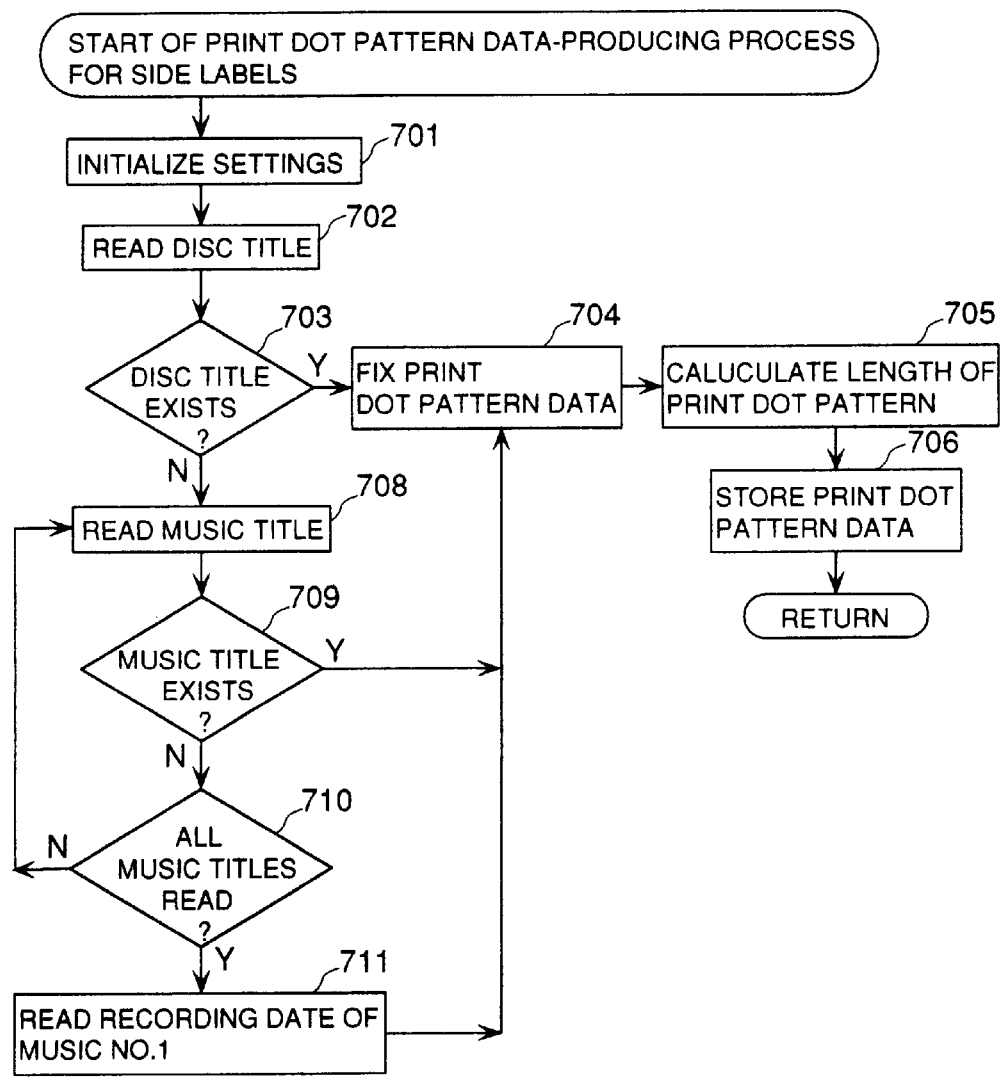
FIG. 15 is a flowchart showing a print dot pattern data-producing process for forming a side label.
Figure 17:
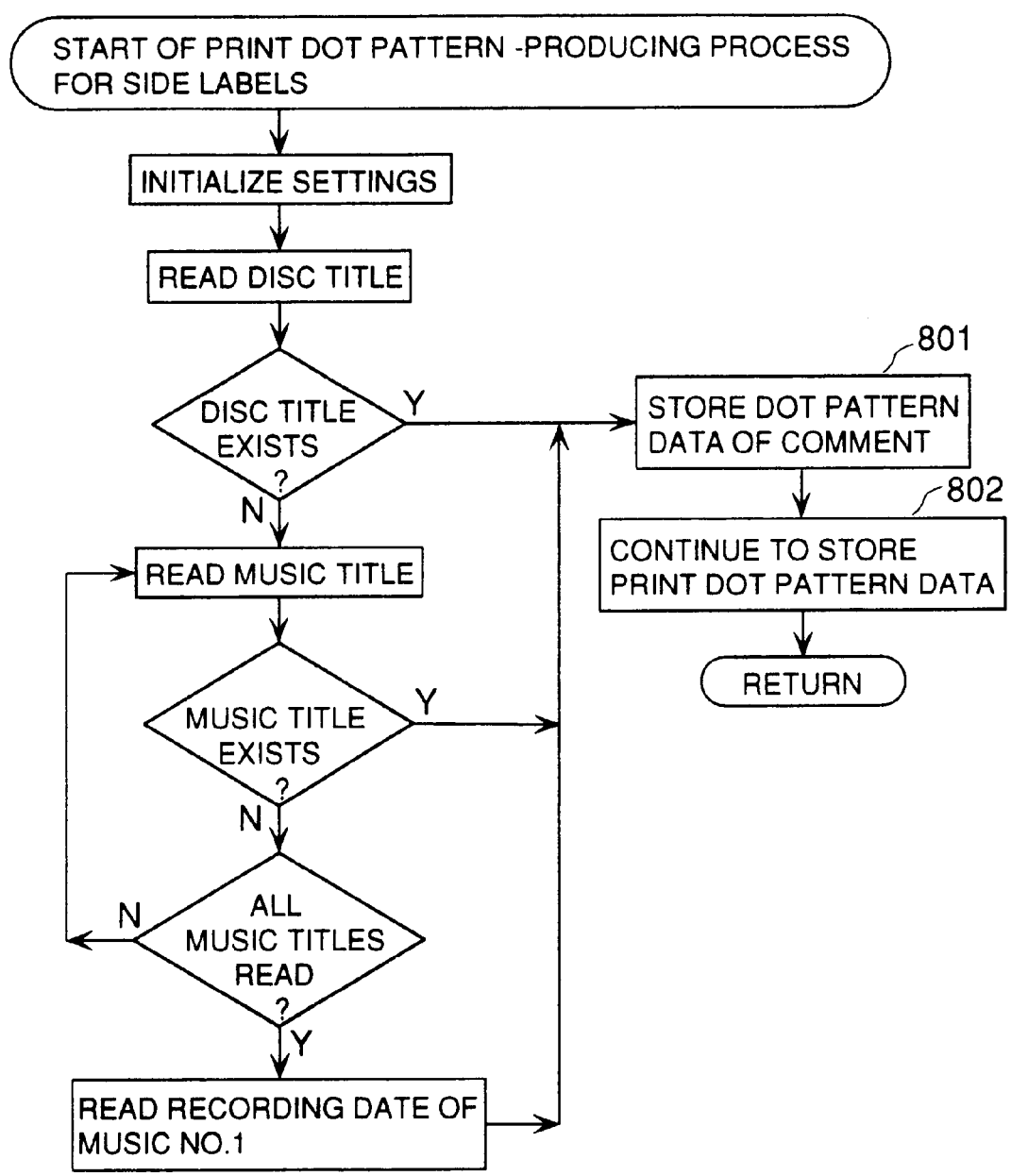
FIG. 17 is a flowchart showing a print dot pattern data-producing process for forming a side label, which is executed to obtain the FIG. 16 example.

FIG. 17 is a flowchart showing a subroutine for carrying out a print dot pattern data-producing process for obtaining the FIG. 16 example as side labels, which is distinguished from the FIG. 15 flowchart for the print dot pattern data-producing process for forming side labels according to the first embodiment, only in steps indicated at respective step numbers.

In this embodiment, the system controller 86 reads out print dot pattern data representative of "disc title:" from the ROM 93 at a step 801 to store the same in the print buffer 94 at a position corresponding to a head of each side label. At a next step 802, the system controller 86 stores print dot pattern data corresponding to data read out from the disc information storage block 85, immediately after the print dot pattern data representative of "disc title:".

In the above case, the label printer prints a comment in a predetermined format, which tells that a print following the comment is a disc title, is printed at a head of each of a side label 6 or the like, and the disc title is printed immediately after that, so that it is possible to clearly show that the side label 6 or the like displays a disc title as well as align heads of printed disc titles. This makes it possible to obtain attractive side labels 6, etc. which have heads of their printed portions accurately aligned, when a lot of MD cartridges (disc cartridges) 901 and MD cases 902 (MD cartridges, etc.) are placed one upon another.

As described hereinabove as to the first embodiment, information items having respective different contents are printed on half-die-cut labels formed on a printing tape 4 but different in shape from each other, whereby a plurality of types of labels printed with suitable contents for affixing places can be produced at a time.

Figure 19:
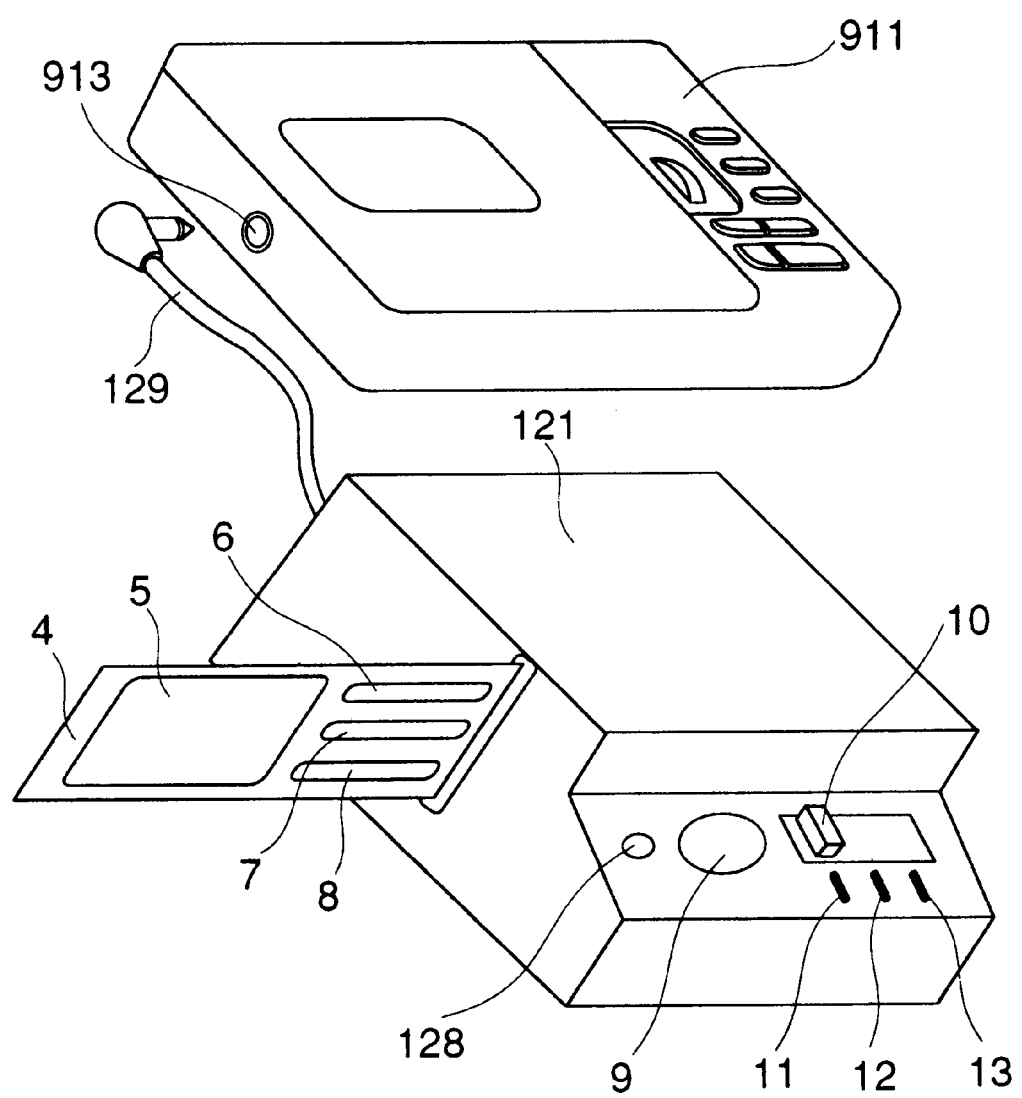
FIG. 19 is a diagram showing an appearance of a system comprised of a label printer according to a second embodiment of the invention and a conventional portable MD recorder/player connected to the label printer.
Figure 20:
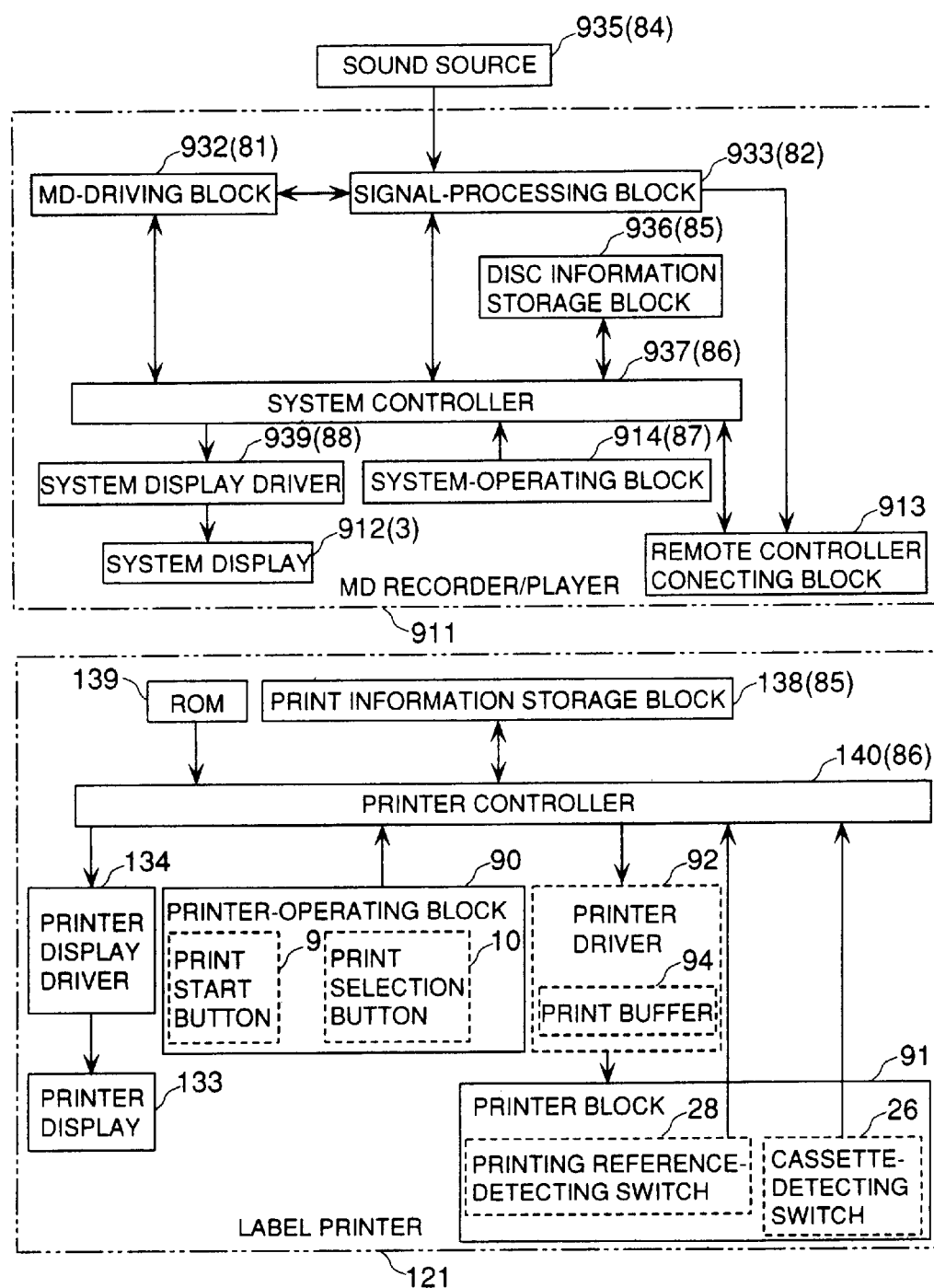
FIG. 20 is a block diagram showing the arrangement of the FIG. 19 system.

Next, a label printer according to a second embodiment of the invention will be described. FIG. 19 shows an appearance of a system comprised of a label printer according to the second embodiment of the invention and a conventional portable MD recorder/player having the label printer connected thereto. FIG. 20 is a block diagram corresponding to the FIG. 19 label printer.

The MD recorder/player 911 and the label printer 121, shown in the figures, correspond in basic configuration to the disc playback system and the label printer of the MD record/playback system 1, described above with reference to FIG. 8, respectively. In FIG. 20, corresponding component parts and elements appearing in FIG. 8 are indicated by parenthesized reference numerals.

On the other hand, in the present embodiment, the system controller 86 as the control block of the disc playback system and the system controller 86 as the print control means described with reference to FIG. 8 are implemented by separate controllers, that is, a system controller 937 and a printer controller 140, respectively.

Further, there is provided a print information storage block (storage means) 138 (85) for simultaneously reading attribute information required for forming a label from a disc information storage block (storage means) 936 (85) at a time for storage therein, to reduce the frequency of communication (interfacing) between the control block of the disc playback system and the print control means, and further control programs for operating the respective controllers are also stored in separate storage means (only a ROM 139 of the label printer 121 is shown) to avoid contention for reading out the control programs, whereby the processes are carried out independently and concurrently except during interfacing time periods, to attain an increased processing speed of the system.

Further, the label printer 121 is configured such that in a case where external operating means, such as a remote controller, is provided, the label printer is capable of making an attribute information readout request in place of the remote controller (provided as external operating means by remote control).

In the present embodiment, the label printer 121 is constructed as described above, whereby it is possible to use the portable MD recorder/player 911 as a disc playback system of which the label printer 121 requests attribute information.

First, description is made of the portable MD recorder/player 911 having a conventional construction.

Figure 30:
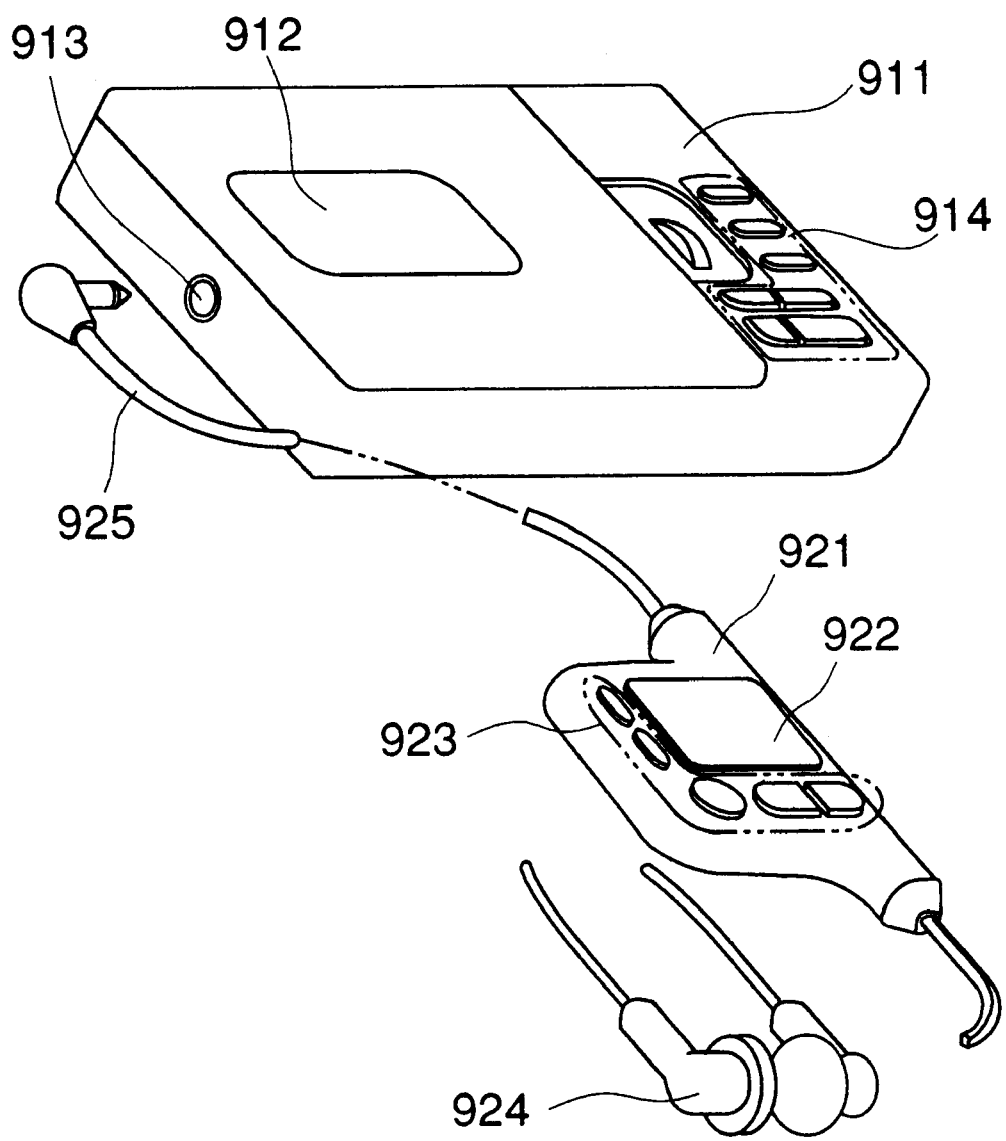
FIG. 30 is a diagram showing an appearance of the system of the conventional portable MD recorder/player.

FIGS. 30 and 31 are a perspective view of an appearance of the portable MD recorder/player 911 and a conventional remote controller 921 which can be connected thereto, and a block diagram showing the arrangement of the portable MD recorder/player 911 and the remote controller 921, respectively.

As shown in the figures, the MD recorder/player 911 includes a system display 912 (3), a system-operating block 914 (87: external operating means, disc-operating block), an MD-driving block 932 (81), a signal-processing block 933 (82), a sound source 935 (84), a disc information storage block 936 (85: storage means), a system display driver 939 (88) and so forth, which correspond to component parts and elements of the disc playback system for the FIG. 8 MD record/playback system 1.

However, the MD recorder/player 911 further includes a remote controller-connecting block 913 having a connector terminal for use with the remote controller, which is connected to the remote controller 921 by a remote control connection cable 925. Further, in the FIG. 8 MD record/playback system 1, analog music signals obtained by conversion by the signal-processing block 82 are supplied to the loudspeakers 15 and 16 to drive the same, while in the MD recorder/player 911, analog music signals by obtained by conversion by the signal-processing block 933 are supplied via the remote controller-connecting block 913 to earphones 924 to drive the same.

On the other hand, the remote controller 921 is comprised of a remote controller display 922 for displaying the music number and music title of a music piece being reproduced, a remote controller-operating block 923 formed of a playback button group for playing back MDs, the earphones 924, the remote control connection cable 925, a remote controller display driver 926, and a remote control controller 927. When an MD is played back, the remote control connection cable 925 is connected to the remote controller 921 to allow connector terminal 913 to control the playback.

The remote controller-operating block 923 has the same arrangement as that of buttons used for playback by the system-operating block 914. The remote controller display driver 926 receives character codes (attribute information, display information) constituting each data item stored in the disc information storage block 936 (85) and develops the same into a display dot pattern for displaying display characters on the remote controller display 922 comprised of a liquid crystal panel or the like.

The remote controller display 922 has a music number display area and a music title display area, similarly to the system display 912. Whenever the display switch button of the remote controller-operating block 923 is operated (for making an attribute information readout request), the music title display area displays attribute information items of each music piece cyclically in the order of a music title, a play time and a recording date.

The remote control controller 927 causes the system controller 937 of the portable MD recorder/player 911 to operate in response to a signal from the remote controller-operating block 923 to play back an MD, or receives each character code from the disc information storage block 936 to store the same in the remote controller display driver 926. During playback, the signal-processing block 933 converts digital music data into analog music signals, and the analog music signals are supplied via the remote controller-connecting block 913 through the remote controller 921 to the earphones 924 to drive the same.

Next, operation of the remote controller 921 will be described in detail. When the music selection button of the remote controller-operating block 923 is operated (for making an attribute information readout request) to select a music number n, the remote control controller 927 reads out character codes (attribute information, display information) constituting data of a music number m of a music piece next to one reproduced from the disc information storage block 936 the last time and the music title m of the music number m to store the character codes in the remote controller display driver 926. As a result, the number m is displayed on the music number display area of the remote controller display 922, and the music title m is displayed on the music title display area of the same.

When the music selection button is further operated, the remote control controller 927 reads out character codes constituting data of a music number m+1 and a music title m+1 from the disc information storage block 936 to store the same in the remote controller display driver 926. As a result, the music number m+1 and the music title m+1 are displayed on the remote controller display 922.

The user repeats the above operations until a desired music number n is displayed. When the playback button is operated (for making a main information readout request) in the state of the music number n and the music title n being displayed, the remote control controller 927 causes the system controller 937 to operate to play back the music number n. It should be noted that if the music selection button is operated in the state of the music number and music title of the last music piece being displayed, music number 1 and the music title thereof is displayed. As described above, whenever the music selection button of the remote controller-operating block 923 is operated, music numbers are sequentially selected in a cyclic manner.

Further, when the display switch button of the remote controller-operating block 923 is operated in the state of the music number n and the music title n being displayed, the remote control controller 927 reads out information (character) codes constituting data of the play time n of the music number n from the disc information storage block 936 to store the same in the remote controller display driver 926. As a result, the play time n is displayed on the music title display area of the remote controller display 922.

When the display switch button is further operated, the remote control controller 927 reads out character codes constituting data of the recording date n of the music number n from the disc information storage block 936 to store the same in the remote controller display driver 926. As a result, the recording date n is displayed on the music title display area of the remote controller display 922.

When the display switch button of the remote controller-operating block 923 is further operated (for making an attribute information readout request), the remote control controller 927 reads out character codes (attribute information, display information) constituting data of the music title n from the disc information-recording block 936 to store the same in the remote controller display driver 926. As a result, the music title n is again displayed on the music title display area of the remote controller display 922. As described above, whenever the display switch button of the remote controller-operating block 923 is operated, the above operations are cyclically repeated.

Furthermore, irrespective of a displaying state of the remote controller display 922, when the disc title display button of the remote controller-operating block 923 is operated (for making an attribute information readout request), the remote control controller 927 reads out character codes (see FIG. 9: attribute information, display information) constituting data of the total number of recorded music pieces and the disc title thereof from the disc information storage block 936 to store the character codes in the remote controller display driver 926. As a result, the total number of the music pieces is displayed on the music number display area of the remote controller display 922, while the disc title of the music pieces is displayed on the music title display area of the remote controller display 922.

In this state, when the display switch button is operated, the remote control controller 927 reads out character codes constituting data of the total play time of the disc from the disc information storage block 936 to store the same in the remote controller display driver 926. As a result, the total play time of the disc is displayed on the music title display area of the remote controller display 922.

When the display switch button is further operated, the remote control controller 927 reads out character codes constituting data of the recording date of the disc title from the disc information storage block 936 to store the same in the remote controller display driver 926. As a result, the recording date of the disc title is displayed on the music title display area of the remote controller display 922.

If the playback of the music piece n is desired to be stopped, by operating a stop button of the remote controller-operating block 923, the remote control controller 927 causes the system controller 937 to operate to stop the playback of the music piece n.

As mentioned hereinabove, FIG. 19 is a perspective view of the appearance of the system to which the label printer 121 is connected in place of the above remote controller 921. FIG. 20 is a block diagram showing the arrangement of the system.

As shown in the figures, the MD recorder/player 911 is identical to one described above with reference to FIGS. 30 and 31, and hence description thereof will be omitted.

The label printer 121 is constructed as described hereinafter. Reference numeral 128 designates a light-emitting diode, which is flickered in one of frequencies dependent on three kinds of states, i.e. a state where the power of the label printer 121 is turned on, a state where data is being read in, and a state where printing is being carried out. Further, the flickering of the light-emitting diode is continuously changed according to the remaining printing time period. Reference numeral 129 designates a printer connection cable, which is connected to the connector terminal of the remote controller-connecting block 913 of the portable MD recorder/player 911 for inputting or outputting (receiving or sending) of data items.

Reference numeral 133 designates a printer display, which is formed of the light-emitting diode 128. Reference numeral 134 designates a display driver, which is comprised of transistors and the like for driving the light-emitting diode 128.

Reference numeral 139 designates a ROM that stores, similarly to the ROM 93 in FIG. 8, a data read control program, a print control program for controlling a tape printing mechanism, print dot pattern data corresponding to character codes, information of shapes of labels and information of the position of the maximum printing area corresponding to the type of a printing tape-holding cassette 21.

Reference numeral 138 designates a print information storage block for storing data sent from the disc information storage block 936 and converted into a predetermined format by the data read control program stored in the ROM 139. The printer controller 140 is connected to the system controller 937 by the printer connection cable 128 via the connector terminal of the remote controller-connecting block 913 to thereby input or output (receive or send) data items. Except for them, the component parts and elements of the label printer 121 are similar to those of the FIG. 8 label printer according to the first embodiment.

If constructed as above, the label printer 121 is connected to the conventional portable MD recorder/player 911 and uses data items stored in a recordable/reproducible MD (disc), whereby it is possible to form a beautiful label to be affixed to an MD cartridge by a simple operation.

More specifically, when the print start button 9 is operated, the control program routine for controlling the tape printing mechanism, described above with reference to FIG. 10, is activated to form a main label 5 and side labels 6, etc., as described hereinbefore with reference to FIGS. 10 to 17.

However, in the present embodiment, the printer controller 140 sets all attribute information (see FIG. 9) required for forming labels, as requested attribute information according to the control program for controlling the tape printing mechanism, stored in the ROM 139. This setting is carried out at the steps 401, 501 and 601 for initialization, described above with reference to FIGS. 12 to 14, respectively. Then, the printer controller 140 makes an attribute information readout request and reads out the attribute information from the disc information storage block (storage means) 936 (85) via the remote controller-connecting block 913 at a time, to store the same in the print information storage block (storage means) 138 (85).

Therefore, although in the first embodiment, other processes are carried out according to the attribute information readout subroutines (for making attribute information readout requests) (402 and 403 in FIG. 12, 604 in FIG. 14, and 702, 708 and 711 in FIG. 15), in this embodiment, they are executed simply as a readout process for reading out data from the print information storage block 138.

As described above, the label printer 121 requests attribute information of the portable MD recorder/player 911 as the disc playback system, and has the remote controller-connecting block (remote control communication means) 913 for outputting attribute information responsive to an attribute information readout request from the remote controller 921. Therefore, the label printer 121 sends an attribute information readout request and receives attribute information responsive to the request, via the remote controller-connecting block (remote control communication means) 913.

That is, since the label printer uses the remote controller-connecting block (remote control communication means) 913 originally incorporated in the MD recorder/player (disc playback system) 911, attribute information can be read out for printing on labels without additionally providing a new readout function, and it is possible to form beautiful labels for use in affixation to an MD cartridge (disc cartridge) 901 and an MD case 902 (an MD cartridge, etc.) by a simple operation.

Further, the remote control communication realized in this embodiment is wired communication, and the remote controller-connecting block (remote control communication means) 913 of the MD recorder/player (disc playback system) 911 has a connector terminal for use in remote control which is removably connected to the remote controller 921. Therefore, simply by connecting the printer connection cable 128 to the connector terminal, attribute information can be read out by making use of the function of the remote controller 921 to printing on labels, whereby it is possible to form beautiful labels, and what is more, by a simple operation.

In short, the label printer 121 is suitable for requesting attribute information of a portable disc playback system, for instance.

Further, in the above embodiment, the remote controller 921 is capable of making or outputting an attribute information readout request for requesting display information to be displayed on the remote controller display 922 thereof, so that the remote controller-connecting block (remote control communication means) 913, which is capable of responding to the request, can also output display information as attribute information to the remote controller 921 in response to the attribute information readout request.

Since the label printer 121 is capable of sending the same attribute information readout request as that sent by the remote controller 921, it is possible to print all attribute information which can be displayed on the remote controller display 922 of the remote controller 921, when the label printer 12 is connected to the remote controller 921. In short, labels conventionally produced by confirming or viewing disc information displayed on a display and writing the same by hand can be created as beautifully labels, and what is more, by a simple operation, by the label printer 121.

Further, the label printer 121 includes the printer display 133 for notifying the user of the state of internal processing, which enables the user to operate the label printer in an assured manner as well as comprehend the present situation (e.g. a situation in which printing is about to be completed) during printing before confirming current results of printing. This makes the user to feel assured of the printing being reliably carried out.

Although in the description made with reference to FIGS. 10 to 17, it is assumed that various data items (attribute information) of music pieces are stored in the disc information storage block 85 (corresponding to the disc information storage block 936 of the present embodiment), as described above with reference to FIG. 9, that is, various data items are serially stored from music number 1, this is not limitative, but data items can also be stored in a manner arranged starting from a desired music number m (such as the music number of a music piece next to one reproduced the last time, which is referred to in the description of the remote controller 921). Further, it is also possible to assign separator codes so as to enable separators of respective data items to be easily recognized.

Figure 21:
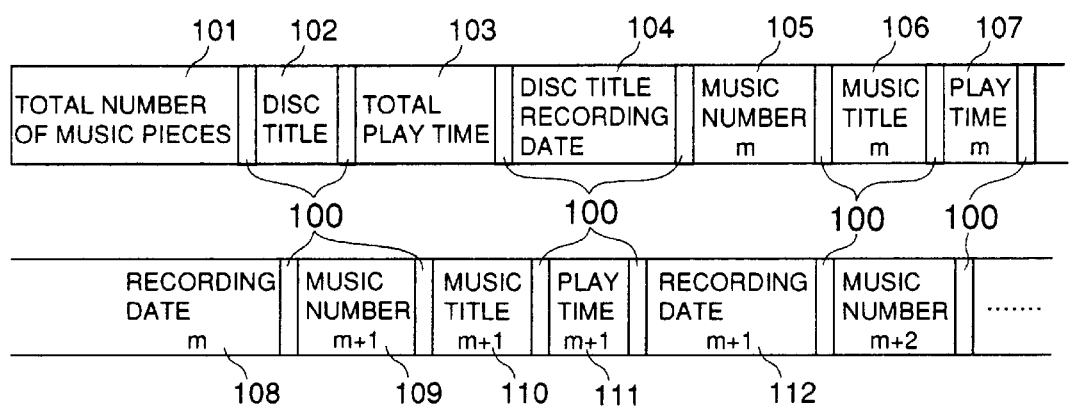
FIG. 21 is a diagram similar to FIG. 9, which illustrates another example of the arrangement.

For instance, when a music number m is caused to correspond to the music number 1 in FIG. 9, i.e. the music number m=1 is set, and at the same time a separator code 100 is added to show (store) attribute information of music pieces, the attribute information is presented as shown in FIG. 21. In this case, the arrangement of attribute information is the same as that shown in FIG. 9, and data is processed substantially in the same manner as processed by the FIG. 9 routine (the music number m may be handled as music number 1, and similarly, music numbers m+1, m+2, . . . maybe handled as the music numbers 2, 3 . . . ). This enables labels to be easily formed by processing similar to the subroutines shown in FIGS. 10 to 17.

Further, although in the above description, the attribute information readout subroutines (for making an attribute information readout request) are not activated separately at the respective corresponding steps (402 and 403 in FIG. 12, 604 in FIG. 14, 702, 708 and 711 in FIG. 15) mentioned above in the description of the first embodiment but they are activated collectively at each of the steps 401, 501 and 601 at which initialization is carried out, this is not limitative, but if collectively activated, a starting process thereof may be activated before effecting the print dot pattern data-producing process for forming a main label (203) shown in FIG. 10, or before carrying out the print format-setting process (202) executed before the step 203. In this case, one process is required as a corresponding one, thereby enhancing program-processing efficiency.

Furthermore, the label printer 121 according to the present embodiment is separated from the disc playback system, and hence (for instance, when it is operated for playback by itself or together with the remote controller 921) even if the MD recorder/player 911 as the disc playback system is being operated, there is no need to keep the power ON, when a label is printed. Therefore, the print start button 9 may be caused to serve as a power button, as well. Further, similarly, there is no need to keep the power ON when the printing on labels is completed, and hence the power may be turned off upon completion of the printing.

Figure 22:
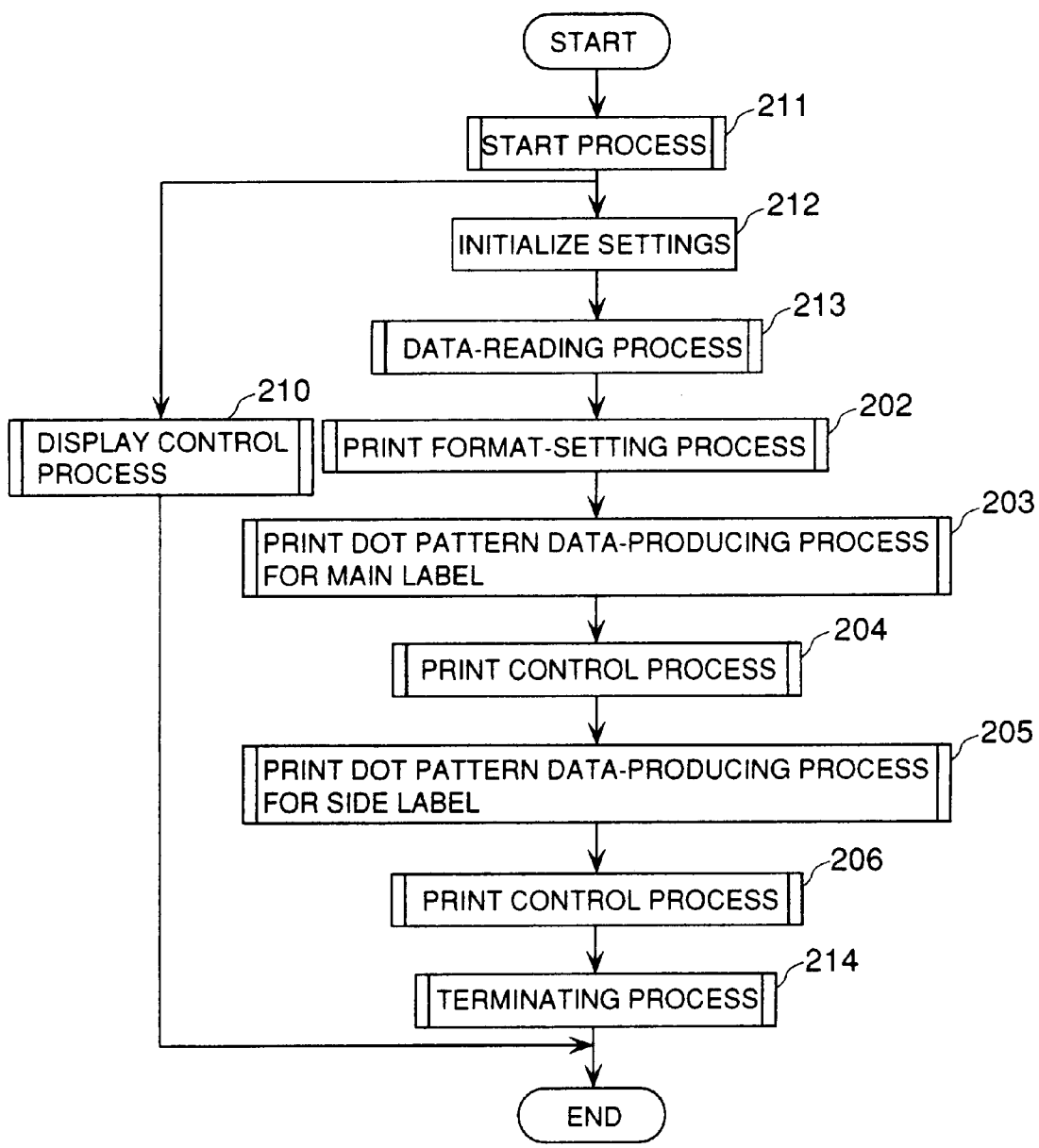
FIG. 22 is a flowchart similar to FIG. 10, which shows another example of the print control.

In the following, for precautionary purposes, a print control program routine for controlling a label-forming process including the above mentioned details of processing will be described with reference to a flowchart shown in FIG. 22.

When the print start button 9 is operated, the power of the label printer 121 is turned on to activate the following print control program routine, whereby the label-forming process is started (step 211).

Next, initialization of the system including the printing tape-holding cassette-detecting process described hereinabove with reference to FIG. 10, clearing of a RAM as the print information storage block 138, and setting of addresses for storing initial data items is carried out (step 212).

Then, a data-reading process is started, and display information (attribute information) of an MD stored in the disc information storage block 936 of the MD recorder/player 911 is read out for storing the same in the print information storage block 138 (step 213).

In other words, all attribute information required for forming labels (see FIG. 9 or FIG. 21) is set as requested attribute information, and an attribute information readout request is made for reading out the attribute information from the disc information storage block 936 via the remote controller-connecting block 913 at a time. The attribute information read out is stored in the print information storage block 138.

Next, the print format-setting process (step 202) to the print control process (step 206), described above with reference to FIG. 10, are carried out to form a main label 5 and side labels 6, etc.

After completion of printing on labels, the print control program routine is terminated to effect a termination process for turning off the power (step 214).

Further, when the start process is started, a display control process is started concurrently with printing processes and controls the printer display driver 84 in accordance with the state of each printing processing at (step 210).

In the above description, it assumed that in the initialization (step 401) or the like and the disc-reading process (step 213), attribute information is read out from the disc information storage block 936 of the MD recorder/player 911 at a time, by using an attribute information readout request. However, it is also possible to assume such a case where attribute information can not be read out at a time. e.g. for the following reasons: data items (pieces of attribute information) stored in the disc information storage block 936 are not configured or formed (in order of arrangement or in data format) as shown in FIG. 9 or FIG. 21; data items are split for storage; or data items are different in data format from each other.

Figure 23:
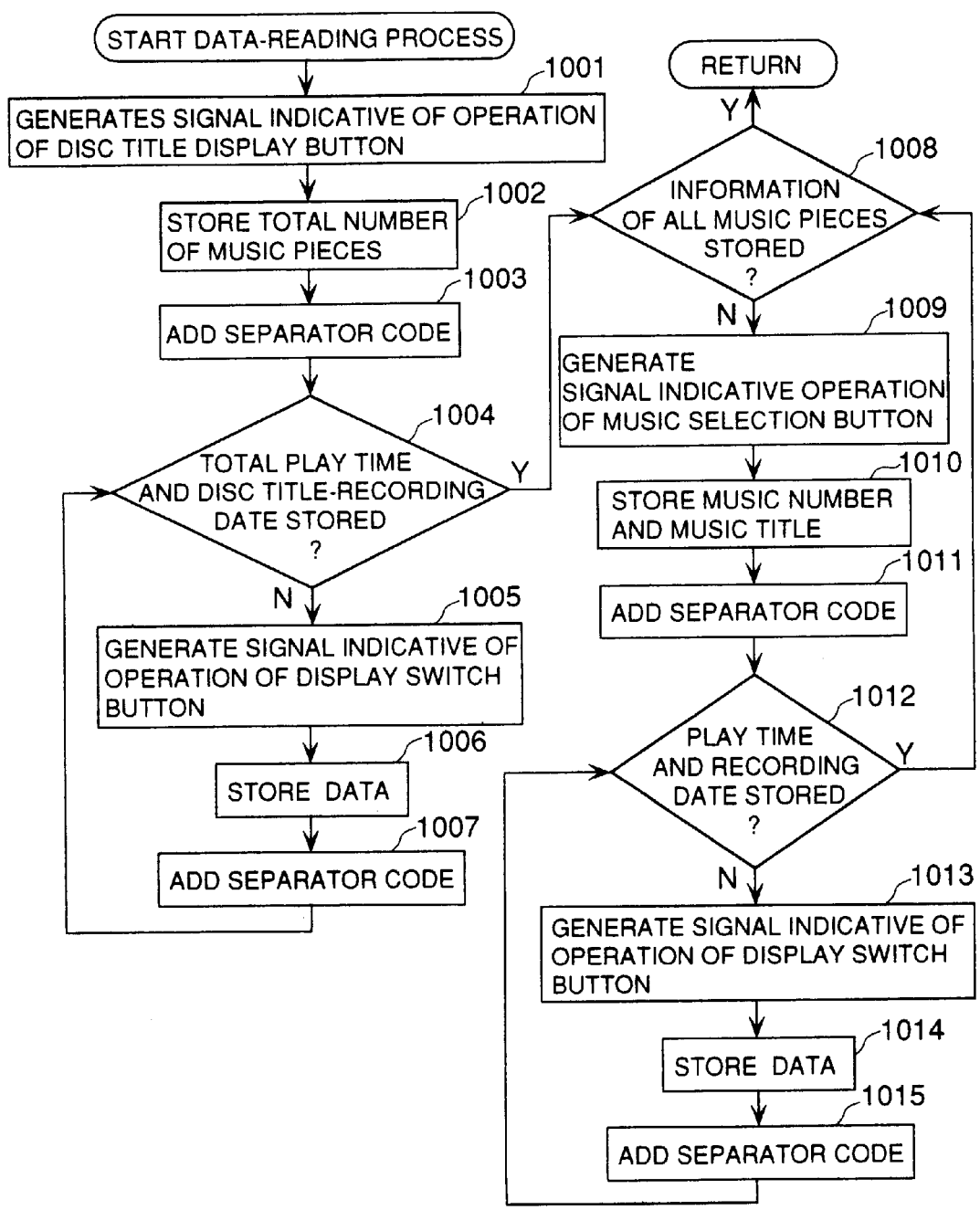
FIG. 23 is a flowchart showing another example of a data-reading process appearing in FIG. 22.

Hence, in preparation for the above case, an example of a data-reading process will be described with reference to a flowchart shown in FIG. 23, in which data items (pieces of attribute information) are separately read out (by making respective attribute information readout requests), formed (in order of arrangement or in data format) as shown in FIG. 9 or FIG. 21, and stored in the print information storage block 138.

As shown in the figure, when the data-reading process is started, the printer controller 140 generates the same signal as that generated when the disc title display button of the remote controller is operated, and sends the signal to the system controller 937 (for making an attribute information readout request) via the remote controller-connecting block 913 (step 1001).

As a result, the system controller 937 sends character codes (see FIG. 21, for instance: attribute information, display information) representative of the total number of music pieces and a disc title stored in the disc information storage block 936 to the printer controller 140, so that the printer controller 140 stores the information (attribute information, display information) at predetermined addresses within the print information storage block 138 (step 1002).

Further, separator codes 100 are additionally provided after the total number of music pieces and after the disc title to carry out storage operation again (step 1003).

Next, it is determined whether or not the total play time of the disc and the recording date of the disc title have been stored (step 1004).

If the total play time of the disc and the recording date of the disc title have not been stored yet (No), first, the printer controller 140 generates the same signal as that generated when the display switch button of the remote controller is operated, and sends the signal to the system controller 937 (for making an attribute information readout request) (step 1005).

As a result, the system controller 937 sends character codes (attribute information, display information) representative of the total play time stored in the disc information storage block 936 to the printer controller 140, and hence, the printer controller 140 stores the data in addresses continued from the above predetermined addresses within the print information storage block 138 (1006).

Further, a separator code 100 indicative of separation of data items is stored in a continued manner (step 1007).

Then, the program returns to determination again as to whether or not the total play time of the disc and the recording date of the disc title have been stored (step 1004).

If the total play time of the disc and the recording date of the disc title have not been stored yet (No), the same operations as carried out at the steps 1005, 1006 and 1007 are repeated to thereby store the recording date of the disc title and a separator code 100 therefor in addresses continued from the addresses having the total play time stored therein, within the print information storage block 138.

When the total play time of the disc and the recording date of the disc title have been stored (Yes), the program proceeds determination as to whether or not data items of all the music pieces have been stored (step 1008).

If the storage have not been completed yet (No), the printer controller 140 generates the same signal as that generated when the music selection button of the remote controller is operated, and sends the signal to the system controller 937 (for making an attribute information readout request) via the remote controller-connecting block 913 (step 1009).

As a result, the system controller 937 sends character codes (attribute information, display information) representative of the music number m (e.g. music number 1: m=1) of a music piece next to one which is stored in the disc information storage block 936 and was reproduced the last time, and the music title m of the music piece, to the printer controller 140, and hence, the printer controller 140 stores the information in addresses continued from the addresses having the recording date of the disc title stored therein, within the print information storage block 138 (step 1010).

Further, separator codes 100 are added after the music number m and after the music title m to carry out storage operation again (step 1011).

Then, the program proceeds to determination as to whether or not the play time m and recording date m of the music number m have been stored (step 1012).

If the play time m and recording date m of the music number m have not been stored yet (No), first, the printer controller 140 generates the same signal as that generated when the display switch button of the remote controller is operated, and sends the signal to the system controller 937 (for making an attribute information readout request) (step 1013).

As a result, the system controller 937 sends character codes (attribute information, display information) representative of the play time m of the music number m stored in the disc information storage block 936 to the printer controller 140, and hence, the printer controller 140 stores the data at addresses continued from the addresses in the print information storage block 138 at which the music number m and the music title m are stored (step 1014).

Further, a separator code 100 indicative of separation of data items is in a continued manner (step 1015).

Then, the program returns to determination again as to whether or not the play time m and recording date m of the music number m have been stored (step 1012).

If the play time m and recording date m of the music number m have not been stored yet (No), the same operations as carried out at the steps 1013, 1014 and 1015 are repeated to thereby store the recording date m of the music number m and a separator code 100 for dividing information items in the print information storage block 138.

If the play time m and recording date m of the music number m have been completely stored (Yes), the program returns to the step 1008 to determine whether or not data items of all the music pieces have been stored.

If the data items of all the music pieces have not been stored (No), the same operations as carried out at the steps 1009 to 1015 are repeated.

If the data items of all the music pieces have been completely stored (Yes), the data-reading process is terminated. As a result, serial data shown in FIG. 21 is stored in the print information storage block 138.

As described above, the printer controller 140 controls the system controller 937 in the MD recorder/player (disk playback system) 911 according to the operating procedure of the remote controller, whereby it is possible to read out display data from the disc playback system.

Further, for precautionary purposes, an example will be described hereinafter, which will show a mode of sending and receiving data between a remote controller (for instance, the above remote controller 921) and the MD recorder/player 911 by operating the remote controller.

Figure 24:
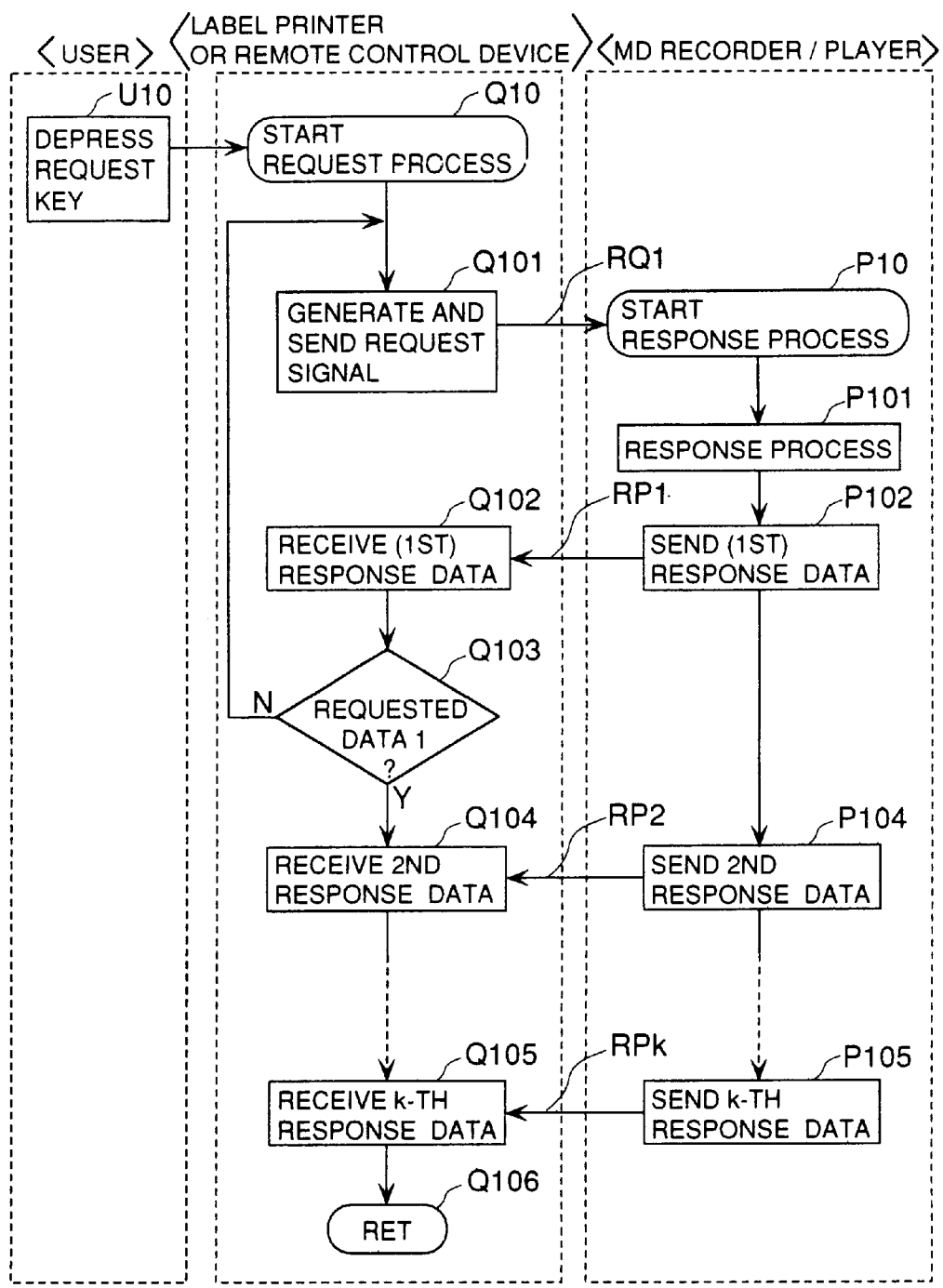
FIG. 24 is a diagram which illustrates an example of a manner of sending and receiving signals and data between the label printer or a remote controller and the MD recorder/player during operation of the remote controller.

For instance, as shown in FIG. 24, when the user operates a key for requesting desired attribute information (hereinafter, operating this key is provisionally described as depressing the "request key"), a request process (Q10) as an interrupt handling routine is activated and started by the remote controller 921. First, a request signal RQ1 is generated to send the same (Q101).

When the MD recorder/player 911 receives the request signal RQ1, a response process responsive to the request is activated and started by the MD recorder/player 911 to carry out the response process (P10 and P101: in the following descriptions and figures, the process is described to be started for simplicity(e.g. P10, etc. are omitted), and response data RP1 for answering the request RQ1 is sent (P102) (although the response is sometimes made only by control signals, here, "response data" is used to mean such control signals as well).

When the response data RP1 is received (Q102), it is determined by the remote controller 921 (Q103) whether or not the received response data RP1 is data requested, i.e. desired response data responsive to the request signal RQ1. In this case, there is provided identification data (of one bite, for instance) at a head of one sending/receiving unit (e.g. a packet) of the response data, and the received response data RP1 is identified by using the identification data, whereby it is determined whether or not the received response data RP1 is data requested.

When the response data RP1 is different from the data requested (No to Q103), another response data RP1 is requested (Q101). On the other hand, when the received response data RP1 is the data requested (Yes to Q103), the request process is terminated (Q106), followed by the program proceeding to next processes in which received data is stored in a predetermined area or displayed. Of course, these processes (the storage process and the display process) may be included in the preset process to carry out before terminating the request process.

However, in the above case, in the MD recorder/player 911, if there are response data items to be sent successively, the response data RP1 is set to a first response data RP1, for instance, and then a second response data RP2, a third response data RP3 . . . , and a k-th (k=1, 2, and so forth) response data RPk are sent (P104 and P105).

In the above example, for instance, when the user depresses the disc title display button (disc title request key), the above process is carried out, and character codes (attribute information, display information) representative of the total number of music pieces and a disc title are sent as a first response data RP1 and a second response data RP2 respectively.

On the other hand, in the remote controller 921, when the first response data RP1 is different from the data requested (No to Q103), the first response data RP1 is set aside for requesting another data (Q101), so that the second response data RP2 is also set aside, whereas when the first response data RP1 is the data requested (Yes to Q103), the second response data RP2, the third response data RP3 . . . , and the k-th response data RPk are received, followed by terminating the request process (Q104 to Q106).

As described above, the remote controller 921 is configured such that request signals can be generated in response to the operated request key to send the same, while the MD recorder/player 911 is constructed such that response data responsive to the request signals can be sent (in reply). Therefore, if the label printer 121 is also provided with an identical request key to that of the remote controller 921 to carry out the same request key process, label printer can effect the same function as that of the remote controller 921.

Further, the invention can be applied to an MD recorder/player different in specification from the MD recorder/player 911 employed in the above example. Furthermore, it is also possible to generate request signals by operating a plurality of request keys thereof and combine the request signals for successively requesting attribute information. This holds true with the FIG. 10 overall control process, the FIG. 22 overall control process, and the FIG. 23 overall control process correspond to this case. An example in which attribute information is successively requested of an MD player remotely controllable but different in specification will be described hereinafter as a fourth embodiment of the invention and so forth.

Furthermore, although the description has been made based on an example of the system in which information is sent from the disc playback system to the label printer by using character codes, this is not limitative, but also in the case of a system in which display data is sent by using dot pattern data, it is possible to read out display data according to the operating procedure of the remote controller.

It should be noted that as described above, the system controller 937 can basically carry out non-printing operations independently of and in parallel with the printer controller 138, but the system controller 937 can also be constructed such that it exchanges information of the state of printing operation with the printer controller 138 during printing on a label so as to display the state of the printing operation (as messages) on the system display 912. This enables the user to more easily recognize the state of operation of the system.

Figure 25:
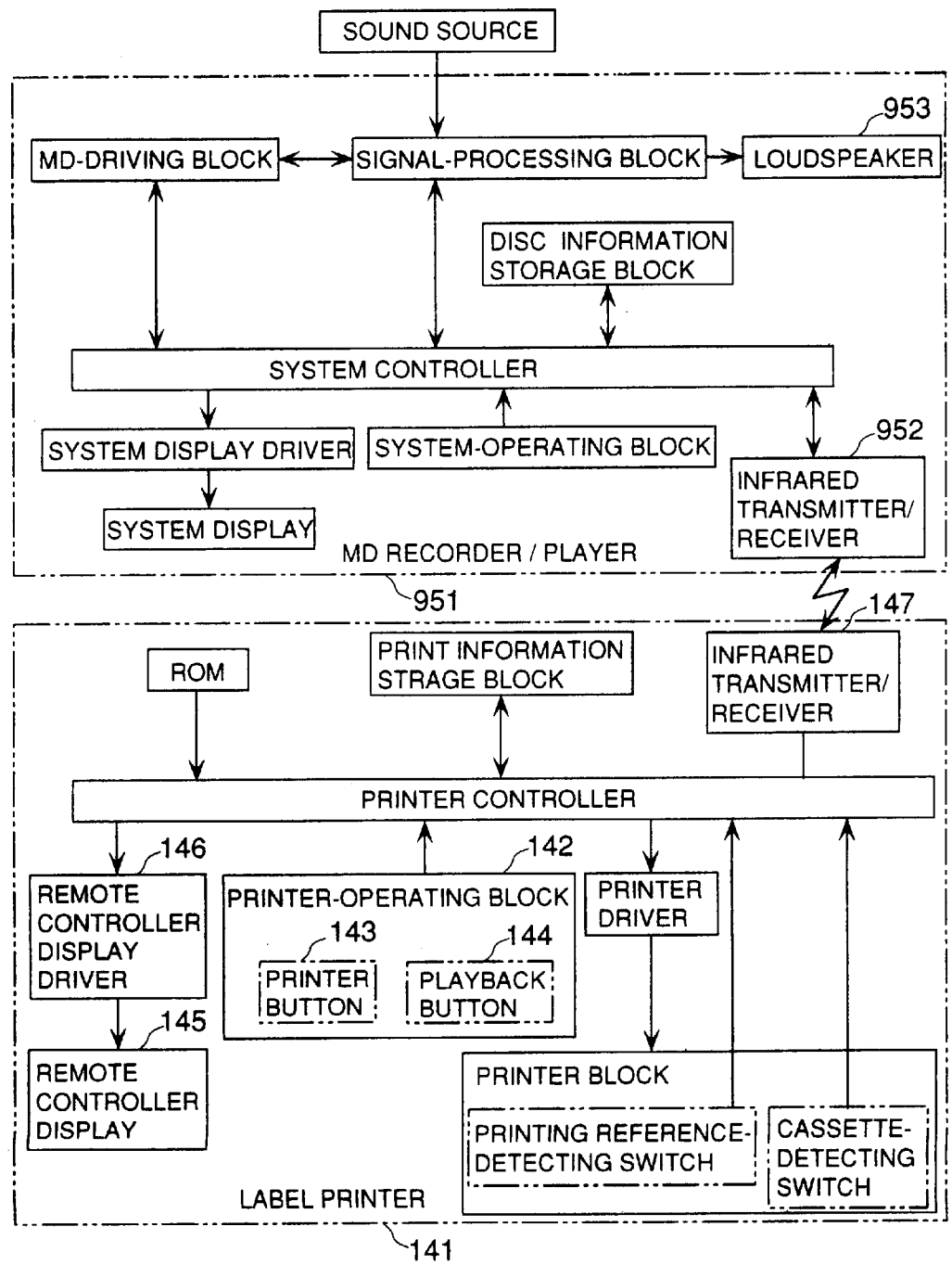
FIG. 25 is a block diagram showing the arrangement of a label printer according to a third embodiment of the invention.

Next, a third embodiment of the invention will be described. FIG. 25 is a block diagram showing the arrangement of a label printer according to the third embodiment of the invention. In the embodiment, infrared (optical) communication is used to input and output data to and from an MD recorder/player and a label printer.

The stationary MD recorder/player 951 includes an infrared transmitter/receiver 952 serving as remote control input/output terminals and a loudspeaker 953. Except for them, the MD record/playback device 951 is constructed similarly to the portable MD recorder/player 911 mentioned above in the description of the second embodiment.

The label printer 141 is constructed as described below. Reference numeral 142 designates a printer-operating block which is comprised of printer buttons 143 including a print start button and a print selection button, and remote control playback buttons 144 including a playback button, a stop button, a music selection button, a display switch button and a disc title display button. Reference numeral 145 designates a remote controller display block formed of a liquid crystal panel. The remote controller display block 145 is driven by a remote controller display driver 146.

Reference numeral 147 designates an infrared transmitter/receiver for inputting and outputting signals to and from the infrared transmitter/receiver 952 of the MD recorder/player 951. Except for the above component parts and elements, the label printer 141 is constructed similarly to the label printer 121 of the second embodiment described above.

In short, the label printer 141 has the capability of the label printer 121 described above with reference to FIG. 20 and at the same time the capability of the remote controller 921 described above with reference to FIG. 31, while exploiting infrared (optical) communication is used as means for remote control communication.

As a result, the label printer 141 is provided with a remote control capability in addition to the capability of the label printer 1 according to the second embodiment, which enables the printer to form labels as well as operate the MD recorder/player 951 from a distant place for playback of a disc.

If the label printer 141 is constructed as above, the conventional stationary MD recorder/player 951 can be used as a disc playback system of which attribute information is requested, and moreover, it is possible to form labels to be affixed to an MD cartridge as beautiful labels, and what is more, by a simple operation.

As described above, since the label printer 141 has the function of sending/receiving data to/from the disc playback system by optical communication, it is possible to use the function for reading out attribute information and printing the same on labels, thereby enabling beautiful labels to be formed by a simple operation. Further, the label printer 141 is provided with the same function as that of operating a remote-controlled disc playback system, which dispenses with the trouble of having and operating a remote controller separately provided. That is, the printer is suitable for requesting attribute information of a stationary disc playback system, for instance.

Although in the above description of the first to third embodiments, a system capable of recording and reproducing data on MDs was used as a disc playback system of which the label printer of the invention requests attribute information, this is not limitative, but a system exclusively provided for playback may be employed.

Further, for instance, the MD record/playback system 1, the MD recorder/player 911, and the MD recorder/player 951 in the above embodiments each have a playback button, a stop button, a music selection button, a display switch button and a disc title display button. When the disc title display button (disc title request button) is depressed, the total number of music pieces and a disc title are read out, and when the display switch button is depressed, attribute information is displayed in a manner switched as follows: music title→playing (playback) time period→recording date→music title. Further, when the music selection button is depressed, music titles are sequentially displayed from the music title (music number m and music title m) of a music piece next to one reproduced the last time. However, the invention can be applied to a disc playback system different in specification from these.

Therefore, in the following, a fourth embodiment of the invention will be described, which can successively request attribute information of an MD player remotely controllable but different in specification.

The MD player contemplated in the fourth embodiment has a capability operable from a remotely located keyboard and uses kinds of (request) keys different from those of the MD recorder/player 911 according to the second embodiment, and that to make the system compact in size, the MD player has only part of (keys having functions equivalent to) keys provided for a remote controller, on an operation block thereof corresponding to the above system-operating block (external operating means) 914. Except for these component parts and elements, the MD player according to the present embodiment is constructed similarly to the MD recorder/player 911 of the second embodiment. Hence, illustration of the arrangement thereof to be shown in a block diagram as well as description thereof will be omitted.

Although in the following, an MD player operable by wired remote control communication is assumed as the MD player of the present embodiment for convenience of description, this is not limitative, but only by using infrared (optical) communication in place of the wired communication, the MD player can be based on the MD recorder/player 951 according to the third embodiment.

Now, the MD player according to the present embodiment is a kind of MD player commercially available, which has, as the above types of request keys, a play key (PLAY key), a rewind key (music piece reinstall key) (REWIND key: hereinafter simply referred to as "the REW key"), a stop key (STOP key), a pause key (PAUSE key), a play-mode key (PLAY-MODE key) (hereinafter simply referred to as "the P-MOD key"), and a display key (DISPLAY key) (hereinafter simply referred to as "the DISP key"). In short, the remote controller has the above request keys, whereby it is capable of causing each function of the MD player to operate.

Further, an MD loaded in this MD player stores information of one music piece per one track with each track number and a music number in agreement with each other. The PLAY key has the function of playing back MDs and further, if it continues to be depressed for a predetermined time period, it can activate the function of a fast forward key (i.e. send a fast forward request signal as a request signal). When playback is requested, the MD player starts a playback process in response thereto and sends the number and title of a requested music piece to the remote controller during playback, whereas when fast forward is requested, the MD player sequentially outputs a track number (music number) and a corresponding music title whenever fast forward is requested. That is, the user can proceed to playback of a next music piece by fast forward without waiting for each information to be reproduced as music information.

The REW key is a request key for requesting character data (attribute information: character data of the track number (music number) and music title) of a music piece being reproduced, or alternatively character data of a music piece reproduced in immediately preceding playback, depending on the state of the MD player at a time point of depressing the REW key. When the REW key is continuously operated, the MD player sequentially outputs track numbers (music numbers) and corresponding music titles similarly to the case of the PLAY key being depressed but in a reverse direction (in a direction of smaller music numbers). The STOP key is a request key for requesting playback to be stopped and the PAUSE key is a request key for requesting pause or temporary stop of playback.

The P-MOD key is a request key for sequentially switching modes (playback modes) during playback to a normal playback mode, a playback mode for repeating all the music pieces, a playback mode for repeating one music piece and a playback mode for playing back music pieces at random. Further, the DISP key is a request key for switching display modes of the display block of the remote controller for selection. The display modes are sequentially switched to a music number display mode for displaying a music title (a music number+a music title), a disc title display mode for displaying a disc title (or the total number of music pieces+a disc title: hereinafter, description is made assuming that this mode is in use), a time point display mode for displaying a time point, and a play time display mode for displaying a play time (performance time).

The MD player is configured such that it can send (in replay) response data in response to each request signal generated by operating each of the above keys, so that if the label printer is provided with the same request keys as those of the remote controller for carrying out similar processes, the label printer is capable of performing the same function as that of the remote controller.

Further, it is also possible to generate request signals by operating a plurality of request keys on the remote controller and combine the request signals to successively request attribute information of the MD player. More specifically, a processing program is changed by operating a newly provided key or an existing one, whereby it is also possible to make a desired combination of requests for attribute information. For instance, it is also possible to provide a request key, such as a "read key", to request music titles of an arbitrary number of music pieces based on a disc title and desired music numbers.

Figure 26:
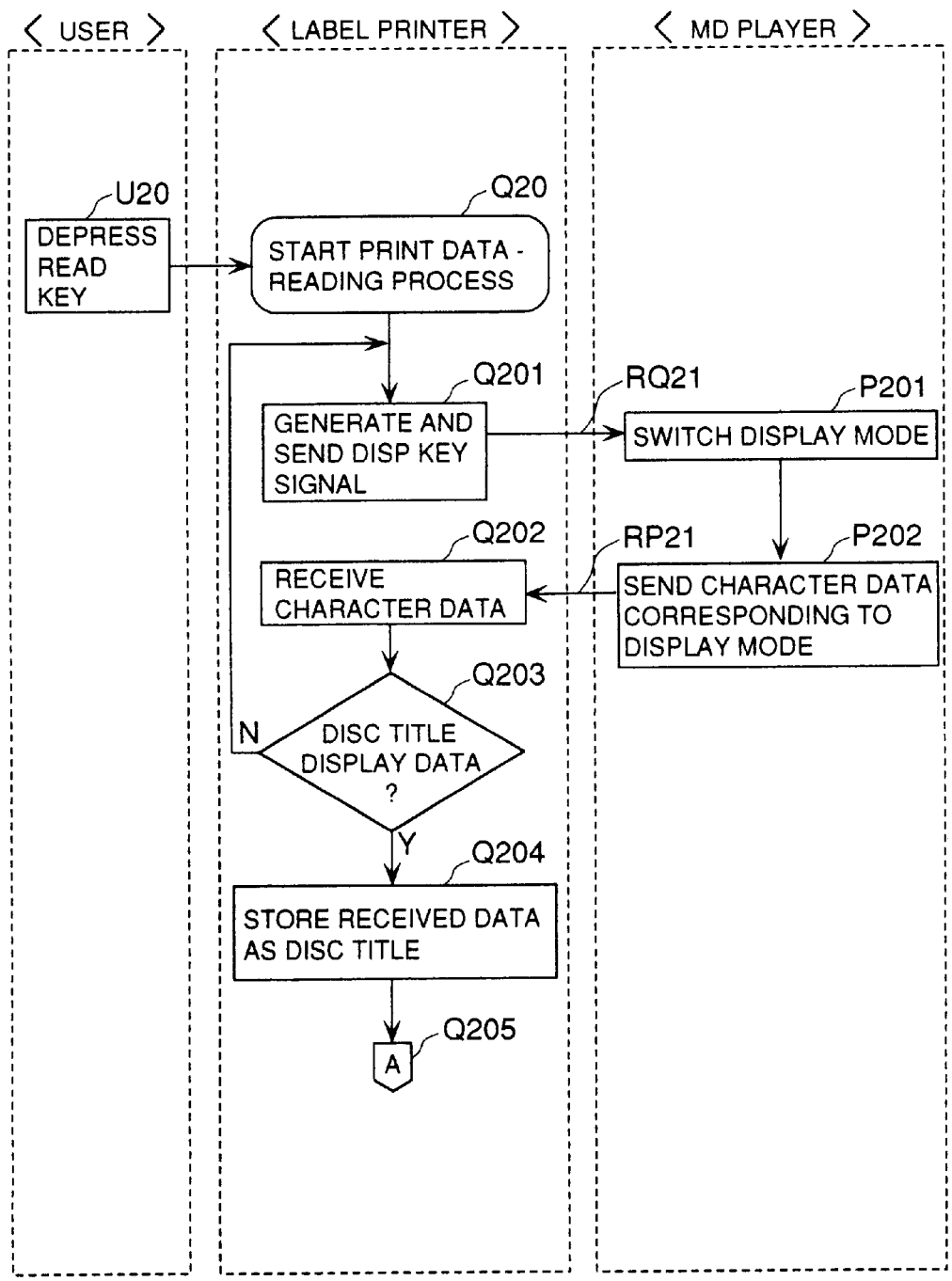
FIG. 26 is a diagram which illustrates an example of a manner of sending and receiving signals and data between a label printer according to a fourth embodiment of the invention and the MD recorder/player, when the label printer is used to combine request signals generated by operating a plurality of request keys on the remote controller and make a series of attribute information requests.

In the above example, as shown in FIG. 26, when the user depresses the read key (which may be a new key or an existing one changed in name to "the read key" be used for a modified processing), similarly to the case of FIG. 24, a print data-reading process (Q20) as an interrupt handling routine is activated and started in the label printer, and first, a DISP key signal is generated as a request signal RQ21 to send the same to the MD player (Q201).

When the request signal RQ21 is received, the display mode of the MD player is changed so as to respond to a request included therein (P201), and character data (attribute information, display information) corresponding to the display mode is sent as response data RP21 (P202).

When the response data RP21 as character data is received (Q202), it is determined by the label printer whether or not the response data RP21 is desired data, i.e. disc title display data (Q203).

For instance, when the request signal RQ21 was sent (Q201), if the MD player was in the disc title display mode, the display mode is changed (P201) to the time point display mode, so that the response data RP21 in this case is character data for displaying a time point. Further, when the request signal RQ21 was sent (Q201), if the MD player was in the time point display mode, the response data RP21 is character data for displaying a play time. Similarly, if the MD player was in the play time display mode, the response data RP21 is character data for displaying a music title (a music number+a music title).

In the above cases, each character data is not a desired disc title display data (character data of the total number of music pieces+a disc title) (No to Q203), attribute information is requested again (Q201). Further, as described above, in the above cases as well, the identification data arranged at the head of the response data RP21 is used to determine whether or not the received response data RP1 is data desired.

On the other hand, when the request signal RQ21 was sent (Q201), if the MD player was in the music title display mode, the display mode is changed (P201) to thereby set the MD player to the disc title display mode, so that the response data RP21 in this case is character data (of the total number of music pieces+a disc title) for displaying a disc title. In this case, the character data is the desired disc title display data (Yes to Q203), so that the received character data is stored in a predetermined area as the character data (of the total number of music pieces+a disc title) for displaying the disc title (Q204), followed by the program proceeding to a next process (Q205).

Figure 27:
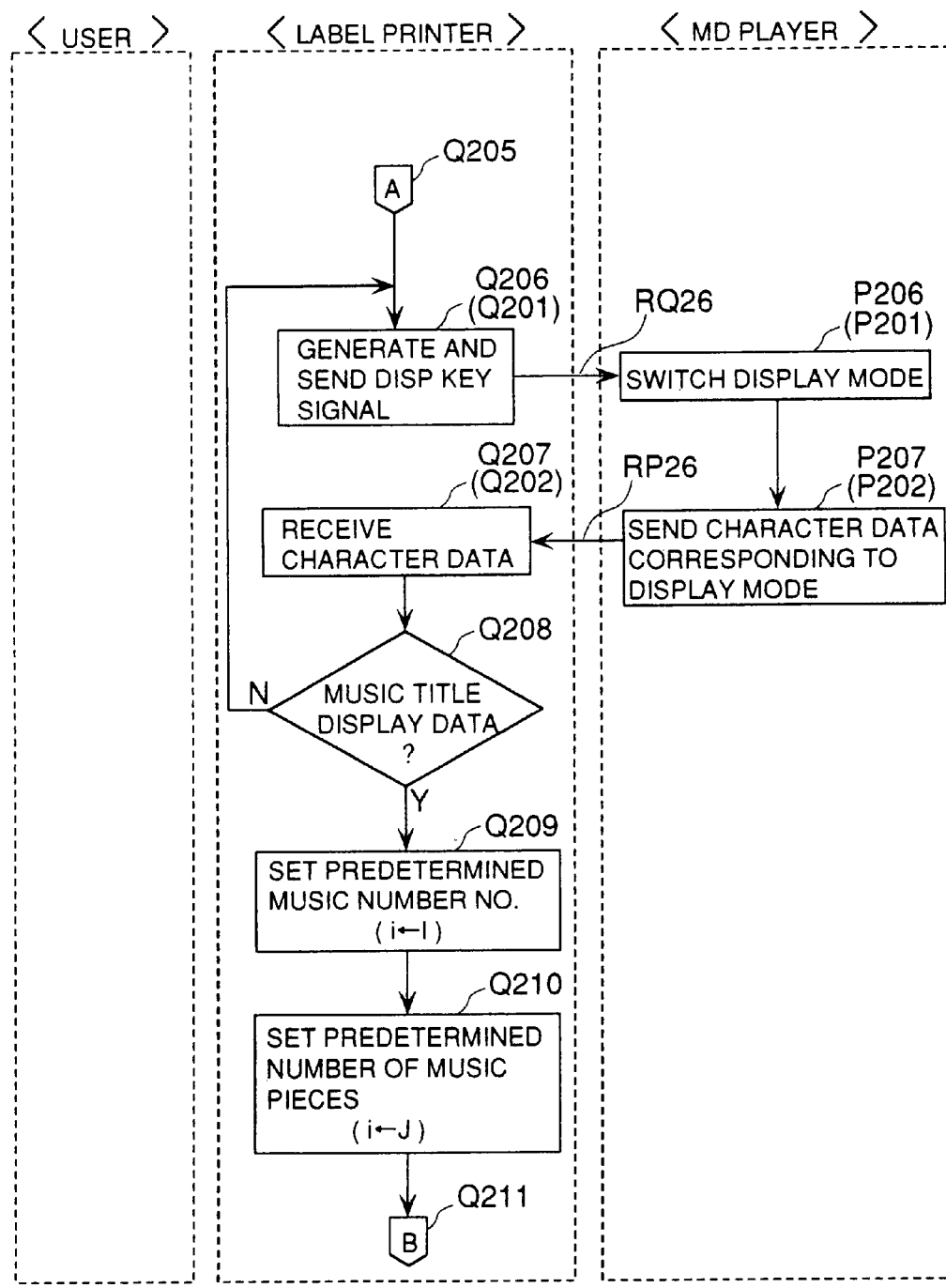
FIG. 27 is a continuation of the FIG. 26 diagram.

After completing storage of the disc title (the total number of music pieces+the disc title)(Q204 and Q205), next, as shown in FIG. 27, a DISP key signal is generated as a request signal RQ26 by the label printer to send the same to the MD player (Q206). Then, the same sending/receiving operations and the same determination operations as described above with reference to FIG. 26 are carried out (Q206, P206, P207, Q207 and Q208). When desired music title display data is received (Yes to Q208), next, a predetermined music number (track number) is set (Q209) to set a predetermined number of music pieces (Q210).

In this case, as the predetermined music number, there may be set a music number which can be automatically detected and set, such as music number 1, the music number of a music piece reproduced the last time and the music number of a music piece next thereto. Or alternatively, the user may set the predetermined music number as desired by providing any setting means for setting the music number through key operation. Further, as the predetermined number of music pieces, there may be set a value which can be automatically set, such as a value of the total number of music pieces obtained together with a disc title, described above with reference to FIG. 26, or a value which the user sets as desired. In the following, a case will be described by way of an example, in which the music numbers of all music pieces (e.g. 20 pieces) are set starting from a music number 1, that is, a predetermined music number I=1 and a predetermined number of music pieces J=20 are set.

Figure 28:
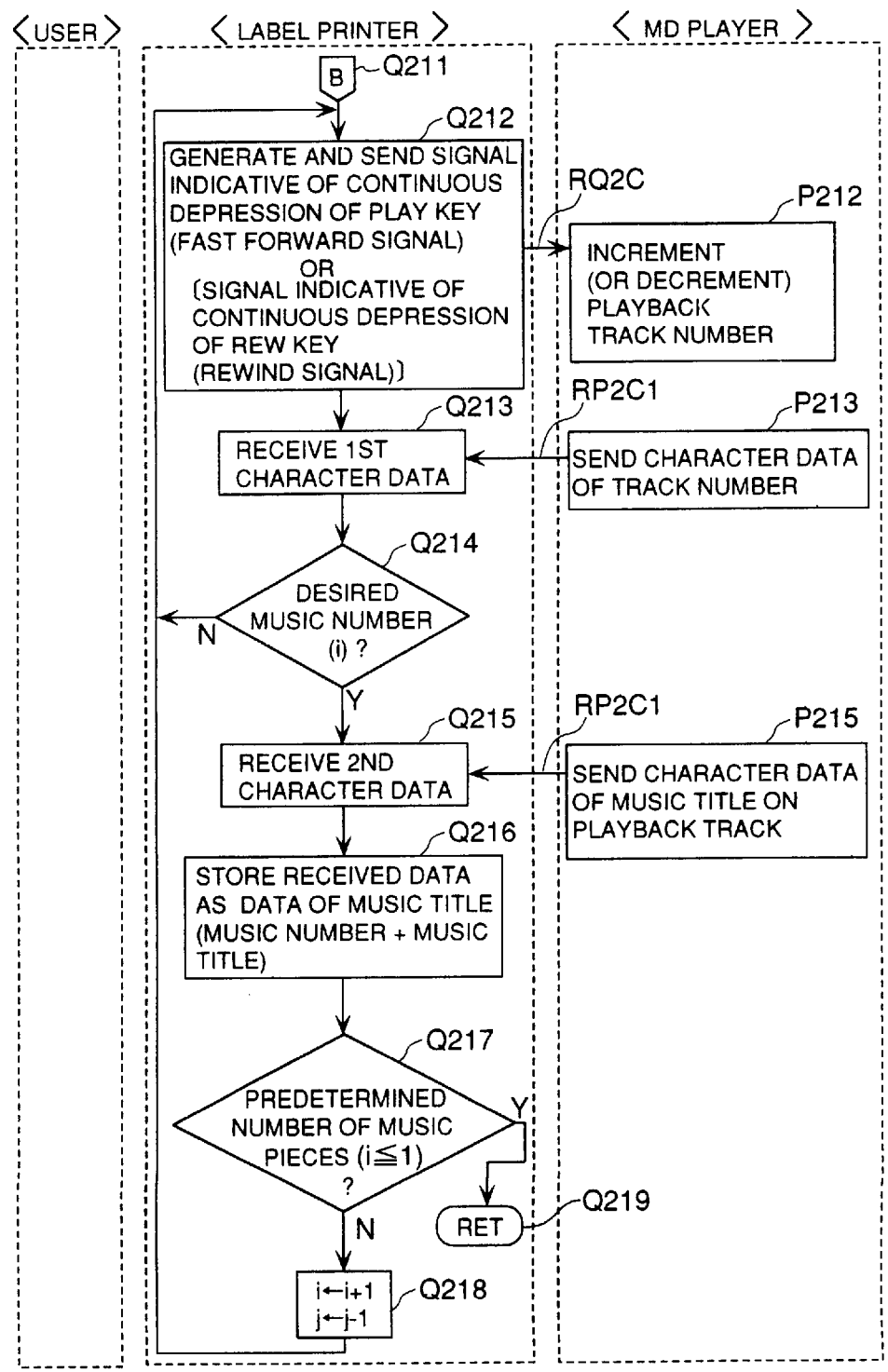
FIG. 28 is a continuation of the FIG. 27 diagram.

When the predetermined music number I=1 and the predetermined number of music pieces J=20 are set to the first music number i=1 (=I) and the number of remaining music pieces and j=20, respectively (Q209 and Q210), the program in the label printer proceeds to a next process (Q211). Then, as shown in FIG. 28, a signal (i.e. a fast forward request signal) for requesting successive depression of the play key is generated as a request signal RQ2C and sent to the MD player (Q212).

When the request signal RQ2C is received, in the MD player, a playback track number (i.e. a music number) is incremented by 1 as response processing responsive to the request (P212), and character data (attribute information, display information) of the track number (the music number) is sent as a first response data RP2C1 (P213), followed by sending character data of a music title stored in the track as a second response data RP2C2 (P215).

When first character data (music number) is received as the first response data RP2C1 (Q213), it is determined by the label printer(Q214) whether or not the received music number is a desired music number i (first, i=1). If it is not the desired music number i (No to Q214), another request is made (Q212), whereas when it is the desired music number i (Yes to Q214), next, second character data (music title) is received as the second response data RP2C2 Q215) to store the first character data and the second character data as data of a music title(a music number+a music title) in a predetermined area (Q216).

When character data of the first music title (music number 1 and a corresponding music title) has been stored (Q216), then, it is determined (Q217) whether or not the predetermined number of music pieces have already been stored. That is, it is determined whether or not the number of remaining music pieces j≦1 holds. At this time point of the present description, only the first music title (of the music number i=1) has been stored (j=20) (No to Q217), so that, then, the music number i is incremented by 1 to set a desired music number i=2 (=1+1), while the number of music pieces j is decremented by 1 to set the number of remaining music pieces j=19 (=20−1) (Q218).

Thereafter, the same processes as described above (Q212, P212, P213, Q213, Q214, P215, Q215 and Q216) are carried out using the desired music number i=2 and the number of remaining music pieces j=19. When character data of a next music title (music number 2 and a corresponding music title)

has been stored (Q216), next, it is determined whether or not the predetermined number of music pieces have been stored (whether or not the number of remaining music pieces j=1 holds). Then, the music number i is incremented by 1 to set a desired music number i=3 (=2+1), while the number of music pieces j is decremented by 1 to set the number of remaining music pieces j=18 (=19−1) (Q218).

In the following, the same processes as described above are carried out as to each desired music number i=3, 4 and so forth (and each number of remaining music pieces j=18, 17, etc.). When character data of the music title (music number 20 and a corresponding music title) of a desired music number i=20 (the number of remaining music pieces j=1) has been stored (Q216), then, it is determined whether or not the predetermined number of music pieces have been stored (whether or not the number of remaining music pieces j≦1 holds). Now, since the number of remaining music pieces j=1 holds (Yes to Q217), all processes are terminated (Q219).

At this time point, character data (attribute information, display information) desired to be obtained, of the disc title (the total number of music pieces+the disc title) and the music titles (the music numbers and music titles) of all the music pieces (20 pieces) from music number 1 has been read in and the character data has been stored in the predetermined areas.

Further, in the above process for obtaining (data of) a desired music number, it is only required that the track number is changed, and hence it is also possible to obtain the data thereof, by using a signal for requesting successive depression of the REW key (i.e. the fast forward request signal), as shown in FIG. 28 (in an area enclosed by square brackets designated by Q212). Further, if the setting of "i←i+1" (Q218) for setting the music number of a next music piece is changed to the setting of "i←i−1", it is possible to store data of music titles (music numbers+music titles) in reverse order (in descending numeric order in contrast to ascending numeric order in the above example).

Figure 29:
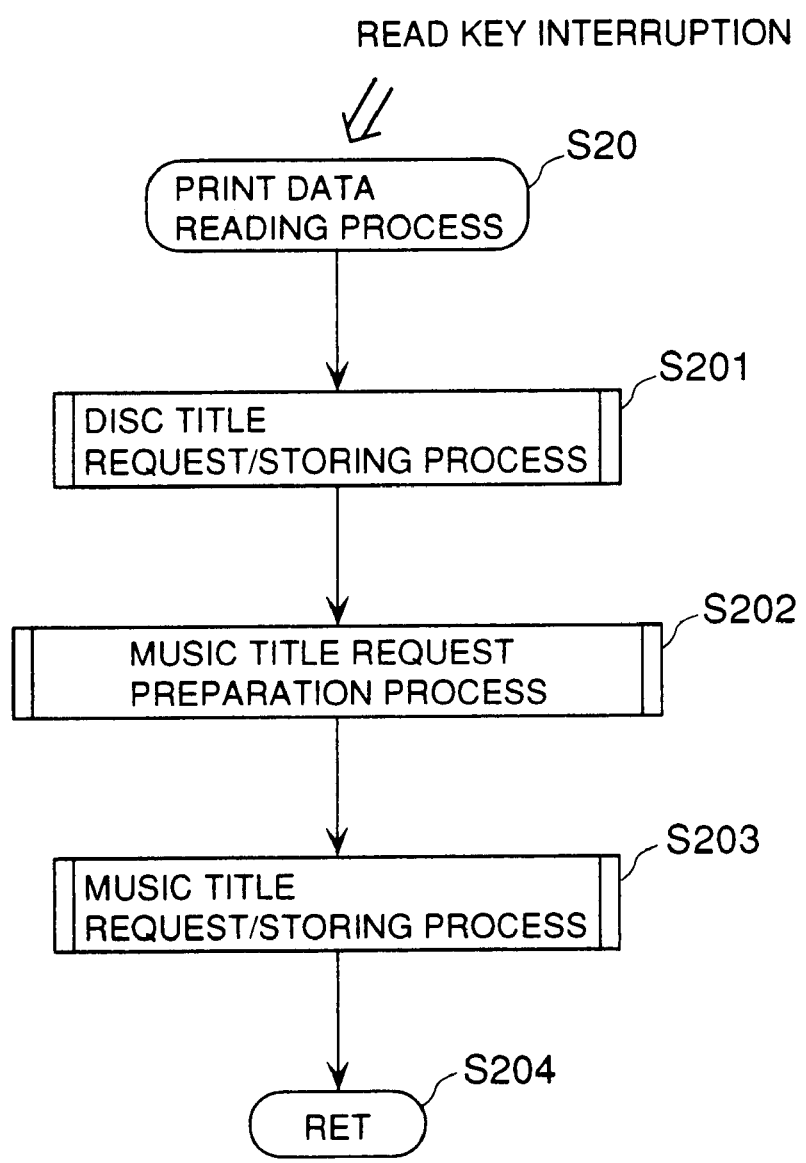
FIG. 29 is a flowchart showing a print data-reading process in which a disc title requesting/storing process corresponding to FIG. 26, a music title-requesting preparation process corresponding to FIG. 27, and a music title requesting/storing process corresponding to FIG. 28 are carried out by respective subroutines which are sequentially activated.

Furthermore, as shown in FIG. 29, a process corresponding to one shown in FIG. 26 may be designed in subroutines (in modules) as a disc title requesting/storing process (S201), a process corresponding to one shown in FIG. 27 as a disc title-requesting preparation process (S202), and a process corresponding to one shown in FIG. 28 as a music title requesting/storing process (S203), and the processes are sequentially activated, whereby the same processing as described above with reference to FIGS. 26 to 28 can be carried out as a print data-reading process (S20). Further, although in the above case, each process shown in FIGS. 26 to 28 was set as an interrupt handling routine activated by depressing the read key (an interrupt input by the read key), this is not limitative, but the overall process (S20) may be further designed in a subroutine such that the process can be activated from a processing routine at the upper level.

As described above, the MD player (disc playback system) according to the fourth embodiment is constructed such that it receives request signals generated through key operation of the remote controller and sends to the remote control character data responsive to the request signals out of character data to be displayed on the display block of the remote controller, so that if the label printer has (request) keys for generating the same request signals as generated by the remote controller to thereby carry out the same processing as by the remote controller, the same character data as obtained by the remote controller can be obtained by the label printer.

On the other hand, according to the label printer of the fourth embodiment, a plurality of request signals are generated simply by depressing the read (request) key (through a single operation of external operating means), and a plurality of successive request signals formed by combining the plurality of request signals are sent to the MD player (disc playback system), so that it is possible to obtain a plurality of character data items responding to the plurality of successive request signals through a single operation of external operating means.

For instance, in the examples described above with reference to FIGS. 26 to 29, character data of a disc title (the total number of music pieces+a disc title) and the music titles (the music numbers and music titles) of all the music pieces (20 pieces) starting from music number 1 was obtained (received, read in). Although to obtain such an amount of character data (display data) by operating the remote controller, at least 22 key operations (Q201×1, Q206×1 and Q212×20) are required, according to the label printer of the fourth embodiment, as described above, it is possible to obtain the amount of character data (display data) by a single operation of the read key.

As a result, part or whole of obtained data can be printed on a label as it is or after editing the same, and hence it is possible to form beautiful labels for use in affixation to an MD (disc) cartridge 901 and an MD (disc) casing 902 (see FIG. 18) by a simple operation.

Further, it is preferred that a request signal for requesting all the character data items to be printed on a label is contained in a plurality of successive request signals.

For instance, in the examples described above with reference to FIGS. 26 to 29, when character data of a disc title (the total number of music pieces+a disc title) and the music titles (the music numbers and music titles) of all the music pieces (20 pieces) from music number 1 is obtained, all the character data items to be printed on the FIG. 4 main label and the FIG. 7 side labels are obtained through a single operation of the read key.

That is, through causing a request signal for requesting all the character data items to be printed e.g. on the FIGS. 4 and 7 labels to be contained in a plurality of successive request signals generated by a single operation of the read key, all the character data items required for printing on a label can be obtained by executing the single operation of the read key, which makes it possible to more easily form the labels shown in the FIGS. 4 and 7, for instance.

It should be noted that the print start button 9 used in the first to third embodiments is external operating means which activates the FIG. 10 process to make a plurality of successive attribute information readout requests, so that the print start button 9 corresponds to (a key having the enhanced function of) the read (request) key.

Although in the first to fourth embodiments, the description was made based on an example of a disc system which uses an MD as a disc to be reproduced by a disc playback system, this is not limitative, but the invention can be applied to other disc systems as well, so long as they are capable of reading out main information stored in a recordable/reproducible disc and attribute information (management information, text information and the like) corresponding thereto.

INDUSTRIAL APPLICABILITY

As described above, the label printer according to the invention is suitable for printing by using data stored in a recordable/reproducible disc and forming labels for use in affixation to various places on the disc at a time through a simple operation. Further, the label printer is suitable for making labels from which the contents of a disc can be easily comprehended, regardless of the amount of the contents of the disc.

What is claimed is:

1. A label printer arrangement comprising:

an attribute information request generator that, to a control block of a disc playback system which reads main information stored in a disc in response to a main information readout request generated by external operating means, and reads attribute information concerning said main information in response to an attribute information readout request generated by said external operating means, said attribute information being formed of text data, read out from said disc and stored in a predetermined area of a main unit of said system, makes said attribute information readout request in place of said external operating means or in combination with said external operating means, the external operating means including a remote controller for externally operating said disc playback system, the disc playback system including remote control communication means for outputting attribute information in response to an attribute information readout request from said remote controller, to said remote controller, the remote control communication means comprising means for communicating with said remote controller by wire, and the attribute information request generator transmitting said attribute information readout request via said remote control communication means;

a printer for printing on a label to be affixed to a disc cartridge accommodating said disc, the printer being connected to said disc playback system via said remote communication means in a wired manner; and a printer controller for causing said attribute information read out in response to said attribute information readout request made by said attribute information request means to be converted to dot pattern data for print and causing said print means to print said dot pattern data, the print controller converting said attribute information received via said remote control communication means to said dot pattern data;

wherein the disc playback system has a remote controller connecting block with a connector terminal for inputting or outputting of data, the printer has a printer cable removably connected to the connector terminal of the remote controller connecting block, and the printer controller is capable of being in communication with the control block of the disc playback system via the printer cable and the connector terminal of the remote controller connecting block.

2. A label printer according to claim 1, wherein said remote control communication means includes a connector terminal that enables said remote controller to be removably connected thereto.

3. A label printer according to claim 2, wherein said remote controller is constructed in a manner such that said remote controller is capable of transmitting an attribute information readout request that requests display information, as said attribute information, which is to be displayed on a display block of said remote controller; and wherein said attribute information request generator is capable of transmitting an attribute information readout request that requests the same display information that is requested by said remote controller.

4. A label printer according to claim 2, wherein said remote control communication means comprises means for carrying out optical communication with said remote controller, and wherein said label printer is capable of carrying out transmission to and reception from said disc playback system via said remote control communication means by optical communication.

5. A label printer according to claim 4, further including remote control means for generating control signals to operate said disc playback system.

6. A label printer according to claim 1, wherein said external operating means includes a disc-operating block having a disc operation button group arranged on an outer surface of said main unit accommodating said disc playback system, wherein said disc playback system has a display block on which part or all of said attribute information read in response to said attribute information readout request from said disc-operating block as display information, and wherein said attribute information request generator has a printing operation button group arranged on said outer surface of said main unit of said system and is constructed in a manner such that said attribute information request generator is used in combination with said disc-operating block to make said attribute information readout request requesting said display information, said attribute information request generator being accommodated within said main unit of said system together with said printer, said print controller and said disc playback system.

7. A label printer according to claim 6, wherein said print controller shares a part of structures of said control block of said disc playback system.

8. A label printer according to claim 1, wherein said attribute information request means has print start-instructing means for instructing the start of processing of printing on said label, and makes said attribute information readout request after the start of printing is instructed.

9. A label printer according to claim 1, wherein said disc playback system includes storage means for storing, as said attribute information, text data read from said disc or newly produced within said system as to said main information stored in said disc, and reads out said attribute information from said storage means in response to said attribute information readout request.

10. A label printer according to claim 1, wherein said print controller is operable to convert said attribute information to a dot pattern for printing, and wherein the printer is adapted to print on a printing tape formed with a half-die-cut label.

11. A label printer according to claim 10, further including label-storing means on which said printing tape can be removably mounted.

12. A label printer according to claim 11, wherein said printing tape includes a plurality of half-die-cut labels continuously formed.

13. A label printer according to claim 12, wherein said printing tape is accommodated in a cassette, and wherein said label-storing means is constructed in a manner such that said cassette can be removably mounted in said label-storing means.

14. A label printer according to claim 10, wherein said half-die-cut label of said printing tape includes a plurality of kinds of half-die-cut label which are different from each other in the size of an outer shape.

15. A label printer according to claim 14, wherein said plurality of types of half-die-cut label include a main label to be affixed to a front face of said disc cartridge, and a side label to be affixed to a side surface of said disc cartridge.

16. A label printer according to claim 15, wherein said half-die-cut label of said printing tape includes a plurality of sheets of said side label.

17. A label printer according to claim 15, further including a print buffer for storing said dot pattern data therein, and
wherein said print controller stores dot pattern data for said main label in said print buffer when said main label is printed, and stores dot pattern data for said side label in said print buffer when said side label is printed.

18. A label printer according to claim 15, wherein said attribute information includes a disc title of said disc, main information numbers, and main information titles, and
wherein said print controller creates dot pattern data of said disc title, said main information numbers, and said main information titles at a location of said main label, and dot pattern data of said disc title at a location of said side label.

19. A label printer according to claim 10, wherein said attribute information includes a disc title of said disc, main information numbers and main information titles,
wherein said half-die-cut label for said printing tape includes a main label to be affixed to a front face of said disc cartridge, and
wherein said print controller creates dot pattern data of said attribute information at a location of said main label.

20. A label printer according to claim 19, wherein said print control means creates dot pattern data of said disc title for one line on said main label, and when said dot pattern data of said disc title has a length larger than a maximum print width of said main label, creates the remaining dot pattern data for a next line on said main label,
said print controller creating in succession dot pattern data of one main information number and main information title corresponding thereto for each identical line of the remaining lines, and when a total length of said dot pattern data of said main information number and said main information title corresponding thereto is larger than said maximum print width of said main label, forming the remaining dot pattern data for a next line on said main label.

21. A label printer according to claim 19, wherein said print controller creates dot pattern data of said disc title from a first line on said main label, and creates dot pattern data of said main information numbers and said main information titles corresponding thereto from a next line in order of larger numbers.

22. A label printer according to claim 20, wherein said print controller creates dot pattern data of said disc title from a first line on said main label, and creates dot pattern data of said main information numbers and said main information titles corresponding thereto from a next line in order of larger numbers, and
wherein when all of said main information numbers and said main information titles corresponding thereto cannot be printed on lines up to a last line determined by the maximum number of lines printable on said main label, a dot pattern notifying a fact of this event is created as a dot pattern of said last line.

23. A label printer according to claim 22, wherein said fact includes the remaining number of pieces of said main information which remain to be printed.

24. A label printer according to claim 23, wherein said attribute information further includes play times respectively corresponding to said main information numbers and a date of each recording,
wherein said attribute information request generator has print selection means for selecting and instructing a combination of pieces of attribute information to be requested by said attribute information readout request,
wherein the selecting instruction concerning said combination of pieces of attribute information which can be given by said printing selecting means includes, in addition to a first selecting instruction in which a combination of said disc title, said main information numbers, and said main information titles is selected for designation, a third selecting instruction in which a combination of said play times and dates of recording is selected for designation, and
wherein said print controller creates, as said dot pattern, dot pattern data of the selected and designated combination of pieces of attribute information out of said attribute information at said location of said main label.

25. A label printer according to claim 24, wherein the selecting instruction concerning said combination of pieces of said attribute information further includes a second selecting instruction in which when all of said main information numbers and main information titles corresponding thereto cannot be printed on lines up to said last line determined by the maximum number of lines printable on said main label even if said first selecting instruction is selected for designation, a combination of the remaining main information numbers and main information titles is selected for designation.

26. A label printer according to claim 24, wherein said print control means creates dot pattern data of a play time and a date of recording corresponding to each main information number in a manner coincident with a line of said each main information number in the case of said first selecting instruction being selected for designation, when said third selecting instruction is selected for designation.

27. A label printer according to claim 10, wherein said attribute information includes a disc title of said disc,
wherein said half-die-cut label of said printing tape includes a side label to be affixed to a side surface of said disc cartridge, and
wherein said print controller creates dot pattern data of said disc title at a location of said side label.

28. A label printer according to claim 27, wherein said half-die-cut printing tape includes a plurality of side labels.

29. A label printer according to claim 27, wherein said print controller creates said dot pattern data of said disc title in a manner such that a center of said dot pattern data of said disc title along a length thereof is coincident with a center of said side label along a length thereof.

30. A label printer according to claim 27, wherein said print controller creates dot pattern data of a title comment in a fixed form which indicates that information is a disc title, at a first portion of a printing area of said side label, and then dot pattern data of said disc title at the following printing area.

31. A label printer according to claim 10, wherein pieces of said main information in said disc are numbered main information numbers, respectively,
wherein said attribute information includes a disc title of said disc, said main information numbers and main information titles corresponding thereto, as well as a date of recording of a piece of said main information which has a smallest one of said main information numbers,
wherein said half-die-cut label includes a side label to be affixed to a side surface of said disc cartridge, and
wherein said print controller creates dot pattern data of said disc title at a location of said side label as said dot pattern, when said attribute information read in response to said attribute information readout request by said attribute information request generator contains said disc title, creates dot pattern data of said piece of said main information which has said smallest one of said main information numbers in place of said disc title, when said read attribute information does not contain said disc title but contains said main information titles, and creates dot pattern data of said date of said recording, when said read attribute information does not contain said disc title nor said main information titles.

32. A label printer adapted to be connected to a disc playback system, the disc playback system being operable to read main information from a disc in response to a main information readout request and read attribute information associated with the main information from the disc in response to an attribute information readout request, the label printer comprising:

an attribute information request generator for generating attribute information readout requests for the disc playback system to read out attribute information from a disc;

a printer for printing on a label to be affixed to a disc or a disc cartridge therefor; and a print controller for processing attribute information read out from the disc by the disc playback system in response to the attribute information readout requests, and for controlling the printer to print the processed attribute information on a label to be affixed to the disc from which the attribute information is read out of the disc cartridge therefor.

33. The label printer of claim 32, wherein the disc playback system has a remote control communication section operable to communicate with a remote controller to receive control signals for operating the disc playback system, to receive attribute information request, and to output attribute information read from a disc to the remote controller, wherein the attribute information request generator is operable to transmit the attribute information requests to the disc playback system via the remote control communication section, and wherein the print controller is operable to receive the attribute information from the disc playback system via the remote control communication section.

34. The label printer of claim 33, wherein the attribute information request generator and the print controller are operable to transmit the attribute information requests to and receive the attribute information from the disc playback system, respectively, via a wired connection to the remote control communication section.

35. The label printer of claim 34, wherein the remote control communication section includes a connector terminal for removably connecting with the remote controller, and wherein the label printer further comprises a connector adapted to removably connect with the connector terminal of the remote control communication section.

36. The label printer of claim 33, where the attribute information request generator and the print controller are operable to transmit the attribute information requests to and receive the attribute information from the disc playback system, respectively, via a wireless connection to the remote control communication section.

37. The label printer of claim 33, further comprising a remote control section operable to generate the control signals for operating the disc playback system.

38. The label printer of claim 32, wherein the attribute information request generator, the printer and the print controller are disposed within a housing of the disc playback system.

39. The label printer of claim 32, further comprising an input device for inputting print-start instructions, wherein the attribute information request generator generates an attribute information readout request in response to a print-start instruction.

40. A disc player having an integrated label printer, comprising:

a disc operating section for generating main information readout requests and attribute information readout requests;

a disc playback section for reading main information from a disc in response to a main information readout request and to read attribute information associated with the main information from the disc in response to an attribute information readout request;

a printer for printing on a label to be affixed to a disc or a disc cartridge;

a printer operating section for generating an attribute information readout request for reading out attribute information from a disc for which a label is to be printed;

a control section for processing attribute information read out from the disc in response to the attribute information readout request generated by the printer operating section, and for controlling the printer to print the processed attribute information on a label to be affixed to the disc from which the attribute information is read out of a disc cartridge therefor; and a housing, wherein the disc operating section, the disc playback section, the printer operating section, the printer, and the control section are disposed within or on the housing.

41. The disc player of claim 40, wherein the disc operating section includes a disc operation button group disposed on the housing, and the printer operating section includes a printer operation button group disposed on the housing.

42. The disc player of claim 40, further comprising a display disposed on the housing for displaying at least part of the attribute information read from the disc as display information.

43. The disc player of claim 40, wherein the control section controls the printer to print the information displayed on the display on the label.

44. The disc player of claim 40, wherein the controller further controls the disc playback section.

45. The disc player of claim 40, further comprising a storage device for storing attribute information, wherein the control section generates attribute information based on main information read out from the disc, stores the generated attribute information as well as attribute information directly read out from the disc in the storage device, and reads out the attribute information from the disc in response to attribute information readout requests.

46. A method for printing a label to be affixed to disc or a disc cartridge for the disc, comprising:

generating a request to a disc playback system for reading out attribute information from the disc;

reading out the attribute information from the disc in response to the request using the disc playback system;

processing the attribute information read out from the disc to generate a pattern for printing on a label;

printing the pattern generated from the attribute information on the label; and affixing the label to the disc from which the attribute information is read out.

* * * * *